United States Patent

Ozeki et al.

[11] Patent Number: 5,953,090
[45] Date of Patent: Sep. 14, 1999

[54] REFLECTION TYPE COLOR LIQUID CRYSTAL DISPLAY APPARATUS

[75] Inventors: Masao Ozeki; Haruki Mori; Eiji Shidoji; Toshihiko Suzuki, all of Kanagawa, Japan

[73] Assignee: Asahi Glass Company Ltd., Tokyo, Japan

[21] Appl. No.: 08/776,592

[22] PCT Filed: Jun. 7, 1996

[86] PCT No.: PCT/JP96/01556

§ 371 Date: Feb. 6, 1997

§ 102(e) Date: Feb. 6, 1997

[87] PCT Pub. No.: WO96/41232

PCT Pub. Date: Dec. 19, 1996

[30] Foreign Application Priority Data

Jun. 7, 1995 [JP] Japan ................................ 7-140896
Sep. 25, 1995 [JP] Japan ................................ 7-246346

[51] Int. Cl.$^6$ .................. G02F 1/1347; G02F 1/1335
[52] U.S. Cl. .................. 349/121; 349/76; 349/102
[58] Field of Search .................. 349/76, 102, 121

[56] References Cited

U.S. PATENT DOCUMENTS

| | | | |
|---|---|---|---|
| 5,126,868 | 6/1992 | Kjizaki et al. | 349/76 |
| 5,194,975 | 3/1993 | Akatsuka et al. | 359/73 |
| 5,369,513 | 11/1994 | Akatsuka et al. | 359/73 |
| 5,377,028 | 12/1994 | Yoshida et al. | 349/76 |
| 5,406,396 | 4/1995 | Akatsuka et al. | 359/73 |
| 5,523,867 | 6/1996 | Akatsuka et al. | 359/73 |
| 5,619,356 | 4/1997 | Kozo et al. | 349/99 |
| 5,677,747 | 10/1997 | Ishikawa et al. | 349/76 |

*Primary Examiner*—Tiep H. Nguyen
*Attorney, Agent, or Firm*—Oblon, Spivak, McClelland, Maier & Neustadt, P.C.

[57] ABSTRACT

A reflection type color liquid crystal display apparatus comprising a polarizing plate 1 having an absorbing axis 18, a birefringent plate 3, a liquid crystal layer 6 and a reflection layer 8 wherein the absorbing axis 18, a first orientation 14, a second orientation 15, a first optical anisotropic axis 16 and a second anisotropic axis 17 are set so as to form predetermined crossing angles $\theta_1$, $\theta_2$, $\theta_3$, $\theta_4$, and selected voltage values of at least three values are applied to the liquid crystal layer 6 from a multiplex driving circuit 10.

Without using a color filter, a very bright chromatic color (white or black) is displayed at the time of an OFF waveform even in multiplex driving, and development of colors of very bright red, blue and green can be obtained with a selection voltage or an intermediate voltage between the selection voltage and a non-selection voltage.

12 Claims, 27 Drawing Sheets

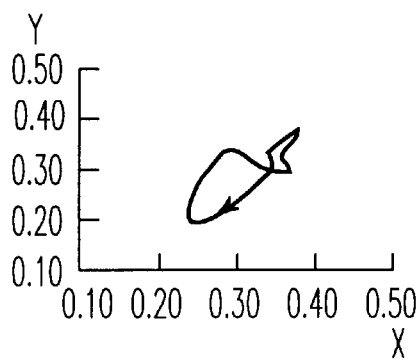 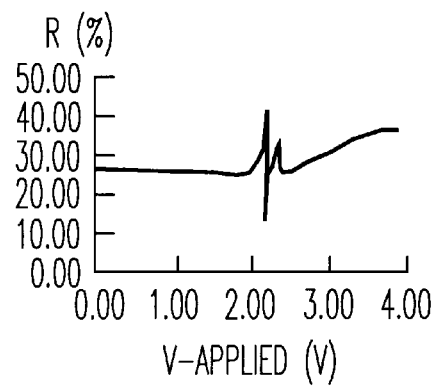
FIG. 14A        FIG. 14B
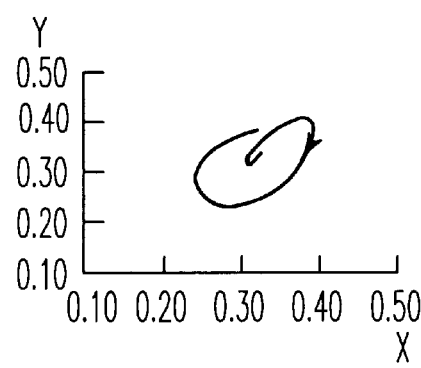 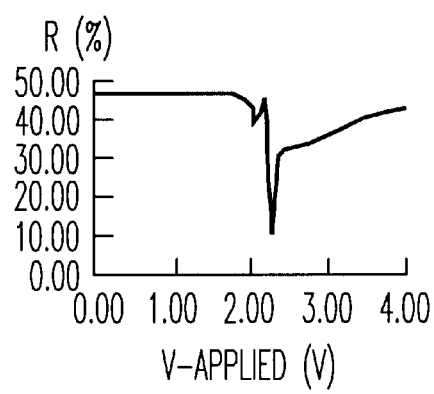
FIG. 15A        FIG. 15B
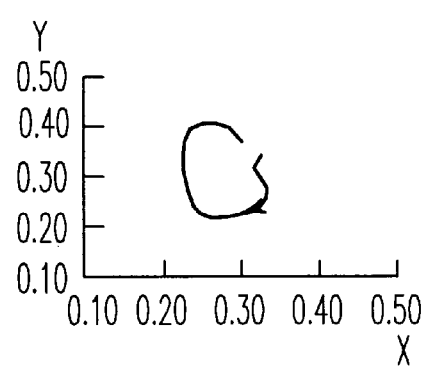 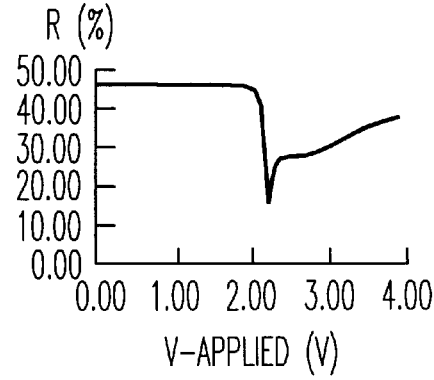
FIG. 16A        FIG. 16B

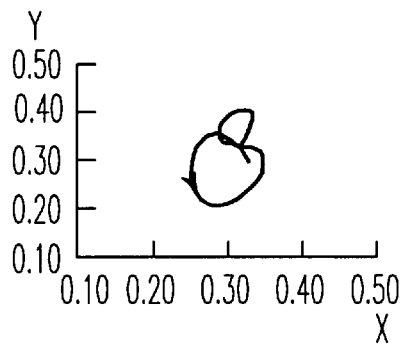
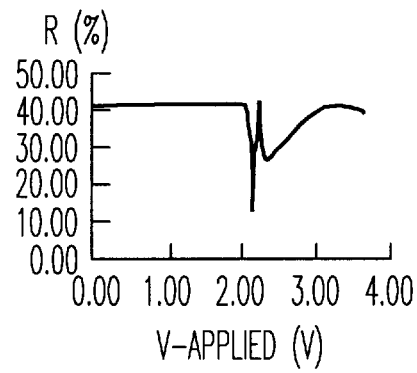
FIG. 17A    FIG. 17B
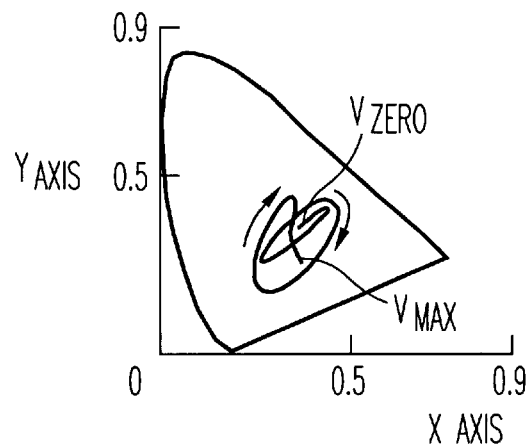
FIG. 18
PRIOR ART
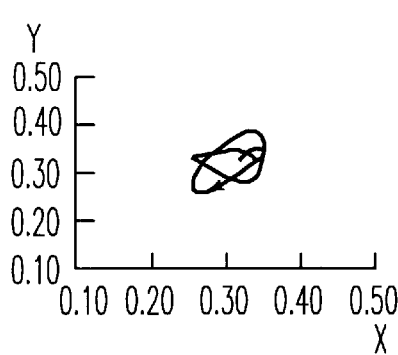
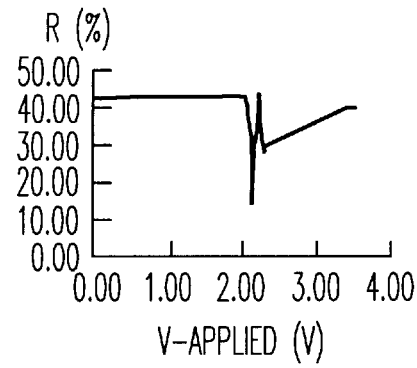
FIG. 19A    FIG. 19B

REFLECTION TYPE COLOR LIQUID CRYSTAL DISPLAY APPARATUS

TECHNICAL FIELD

The present invention relates to a reflection type color liquid crystal display apparatus suitable for displaying an achromatic color by using a liquid crystal display element provided with a single polarizing plate and capable of displaying each color of red, blue and green.

BACKGROUND TECHNIQUE

There has been known a super-twisted element for a method of obtaining a high density dot matrix display by increasing a twist angle of liquid crystal molecules between a pair of electrodes to thereby cause a sharp change of voltage-transmittance characteristics (T. J. Scheffer and J. Nehring, Appl. Phycs. Lett. 45(10)1021–1023(1984)).

In the conventional method, however, the product $\Delta n \cdot d$ of the refractive index $\Delta n$ of liquid crystal in a liquid crystal display element used and the thickness d of a liquid crystal layer was substantially in a range of 0.8 $\mu$m to 1.2 $\mu$m (Japanese Unexamined Patent Publication No. 10720/1985 which is referred to as conventional technique 1). According to the conventional technique, an excellent contrast could be obtained only by a specified combination of colors such as yellowish green and dark blue, bluish purple and pale yellow and so on.

Thus, in the conventional technique using STN liquid crystal display element, a monochrome display could not be effected.

In order to improve the conventional technique, there was proposed a liquid crystal display apparatus capable of displaying a monochrome display and having a high contrast ratio wherein two liquid crystal cells of different helical structures are placed one on another; a voltage is applied to either cell and the other is merely used as an optically compensating plate (Report of Television Association 11 (27), p. 79 (1987) by Okumura et al.).

Also, there was proposed a method of providing a monochrome display by arranging a birefringent plate between the liquid crystal layer and a polarizing plate. Conventionally, a color liquid crystal display apparatus used for OA machines such as personal computers comprised the above-mentioned liquid crystal display element capable of effecting a monochrome display and color filters.

However, the color filters are expensive and have extremely low efficiency of utilization of light since a display is effected with three picture elements of red, blue and green. For instance, three picture elements of red, blue and green are used for displaying white, and even when the three picture elements are turned on, the brightness is ⅓ and accordingly, a bright display can not be obtained. Several techniques have been proposed for color display apparatuses providing a bright display without having color filters. For instance, an electrically controlled birefringence (ECB) effect type liquid crystal display apparatus is known. In this apparatus, when gradation voltages (e.g., voltages for 8 gradations) are applied to a pixel, the orientation of liquid crystal molecules is changed depending on gradation voltages applied whereby $\Delta n \cdot d$ of the liquid crystal cells is changed. And various colors caused by the effect of the birefringence in the liquid crystal cell are used.

In such ECB effect type liquid crystal display apparatus, however, since liquid crystal does not have a twisted structure, a state of liquid crystal to be changed depending on an applied voltage was small, and a display by multiplex driving could not be obtained.

Japanese Unexamined Patent Publication No. 118516/1990 (conventional technique 2) discloses that various colors can be displayed by changing a voltage applied to a liquid crystal cell including twisted liquid crystal molecules. In this conventional technique 2, however, there is a problem that colors which can be developed are yellow, red, purple, bluish purple, bluish green and green, and a display of achromatic color such as black or white is impossible, because it has been known that the visibility in usually used displays is considerably reduced if a display of black or white is not used.

In a display, the background portion generally occupies a broader surface area in comparison with a data portion to be observed. When a color of, for instance, yellow or green is used for that portion as a background color, it is difficult to obtain a non-simulative color. Accordingly, in a display of graphs or the like, achromatic color of black or white is often chosen as the background color.

As the basic of display, there is an expression with a line of black color on a white ground such as a letter or letters in black on a white paper, and such type of display is usually used. It is preferable to provide a display in blue, green and/or red in addition to a white/black display. Accordingly, a display apparatus which can not provide a white/black display lacks visibility.

The conventional technique 2 discloses that two layered structure using a compensation cell can provide a monochrome display. In this conventional technique, however, color development is achieved by applying a voltage to the compensation cell so that the compensation cell does not function in an optical sense. Accordingly, in the display apparatus to be operated by multiplex driving, it is impossible to mix a color of blue or green with white or black.

Japanese Unexamined Patent Publication No. 183220/1990 (conventional technique 3) discloses that pixels are also formed in a compensation cell to provide a display, and when each display of the two layered liquid crystal cells is combined with each other and multiplex driving is conducted, a color of blue or green can be provided along with black or white. However, each of the pixels in the two cells has to be formed in a one to one relation. In this case, the manufacture of the liquid crystal display apparatus is difficult. Further, when the apparatus is watched from an oblique direction, mixing of color is observed due to parallax.

The conventional technique is insufficient to provide a display of quality of practically usable. Further, the liquid crystal display apparatus having a double layered structure increases the weight; it is difficult to control the gap in the liquid crystal cells, and yield of manufacture is further decreased.

Japanese Unexamined Patent Publication No. 175125/1994 (conventional technique 4) discloses that an improvement of color can be obtained by using a birefringent plate. However, this publication does not disclose a display of achromatic color (white or black).

Japanese Unexamined Patent Publication No. 301006/1994 (conventional technique 5) discloses in some embodiments that it is possible to display colors of blue, green, white and red. However, this conventional technique is so adapted that a display of blue color is provided when an applied voltage is low and a white color is developed when the applied voltage is increased. Accordingly, when lattice-like matrix driving is effected and if the color of spaces between driving electrodes are blue, a generally blue display is provided even though the color of pixels is white, and white having good color purity can not be developed. Namely, it is preferable that the spaces are substantially of achromatic color unless the voltage is applied. Further, when an achromatic color is to be presented by applying a voltage of intermediate tone, a slight change of voltage causes a change of color in a display since liquid crystal molecules to which an intermediate voltage is applied show a sudden change with a slight change of voltage. Accordingly, a beautiful display of achromatic color can not be obtained.

The same situation is applicable to a case that colors which are developed by applying intermediate voltages are used in the whole area of picture display. Generally, an achromatic color is used for the background color. In this case, the area of achromatic color occupies a large surface area. When the color occupying such a large surface area is deteriorated, the quality of display is considerably reduced. Accordingly, it is desirable to avoid the development of the achromatic color at an intermediate voltage in order to obtain a uniform color.

In consideration of the above-mentioned problems, it is preferable that a display of the achromatic color can be obtained when no voltage is applied or an OFF waveform (non-selection waveform) is formed in multiplex driving.

In Example 5 of the conventional technique 5, there is description that a display of white, blue and green is possible. However, it also discloses that an applied voltage for developing white is 0.2 V or less, an applied voltage for developing blue is 1.3 V to 2.2 V and an applied voltage for developing green is 3.0 V or more. In the conventional technique 5, it is apparently difficult to effect multiplex driving (time sharing driving). The driving voltages can be used only for a specified purpose of use.

Embodiment 6 in Japanese Unexamined Patent Publication No. 301026/1994 (conventional technique 6) describes that a white display can be obtained with 0.9 V or 1.6 V or less. However, a large duty ratio can not be utilized for multiplex driving when a display of green, red or blue is to be presented.

An embodiment in Japanese Unexamined Patent Publication No. 337397/1994 (conventional technique 7) describes that a white display is obtained when an OFF waveform is formed. However, the conventional technique 7 can not provide a display of red. In the above-mentioned conventional techniques, polarizing plates are provided at both sides of the cell or cells. Accordingly, the transmittance of light is low. Further, when the conventional techniques are used as a reflection type mode, a light quantity is further reduced because there is a loss at the reflection layer, and therefore, a display becomes further dark.

In an embodiment of Japanese Unexamined Patent Publication No. 308483/1994 (conventional technique 8), a color display is provided with use of a single polarizing plate. Conventional technique 8 has the constitution that $\Delta n \cdot d$ value of the liquid crystal cell for color controlling (compensation layer) and $\Delta n \cdot d$ value of the liquid crystal cell for display are substantially same and the direction of their twist angle is reversed.

And the angle formed by the two orientation directions at the opposite surface plane of two liquid crystal cells (display,compensation) which are to be arranged to be opposed each other is set to be about 90°. Further it is described that the polarizing axis of the polarizing plate is favorable to be set at a crossing angle of 45±5°. In that embodiment, there is description that the white color is developed when no voltage is applied, and when an applied voltage is gradually increased, a color change of white→yellow→blue→yellow→blue→green is effected. However, it discloses that when the applied voltage is low (i.e. when a voltage for effecting a color change of white→yellow or white→blue is applied) color development having good color purity can not be obtained, and the color development having good purity can be obtained by increasing the voltage.

Further, in the conventional technique 8, color development of red can not be obtained. Further, the conventional technique is not suitable for multiplex driving since color development having good purity can knot be obtained when an applied voltage is low.

Japanese Unexamined Patent Publication No. 5457/1995 (conventional technique 9) discloses that a twist birefringent plate is used as a compensation cell. However, the construction of the conventional technique 9 is basically the same as that of the conventional technique 8 and it still has a problem of color development.

There was made a PCT application No. PCT/JP96/00101 by the same applicant whose subject is a reflection type color liquid crystal apparatus constitutes one birefringent plate, two polarizing plate, a liquid crystal layer and so on without using color filters.

In this application a RC-LCD which has only one polarizing plate is provided.

It is an object of the present invention to provide a color liquid crystal display apparatus which allows multiplex driving; exhibits a bright white display by applying a non-selection waveform, and develops a color of blue or green or red without using color filters when a selection waveform or an intermediate voltage between the selection waveform and the non-selection waveform is applied.

In other words, the object of the present invention is to provide a reflection type color liquid crystal display apparatus capable of providing a very bright display of substantially achromatic color when no voltage is applied or an applied voltage is low, and capable of realizing a color display by applying a voltage.

Hereinafter in this description the sign plus (+) means for the direction of clockwise and the sign minus (−) means for the direction of counterclockwise. This feature is shown in FIG. 1 and so on. In this application, a research was conducted by a computer simulation in viewpoint of a relation between a optical characteristic and the constitutional element of a reflection type color liquid crystal display apparatus such as $\Delta n_1 \cdot d_1$, $\Delta n_2 \cdot d_2$, crossing angle conditions by $\theta_1$ and so on. Thus the constitutional elements for desirable color development has been substantially known.

The inventors of this application actually manufactured some embodiments of the liquid crystal display apparatus of the present invention, for instance, examples No. B8, B9, B10 mentioned later and they confirmed the achievement of the present invention by using a simulator of liquid crystal device, which is widely used for calculating the optical characteristics of liquid crystal and which is called the 4×4 matrix method by Berreman. In this method of calculation, first, a state of orientation of liquid crystal to which a voltage is applied is obtained by calculation. Then, optical members such as liquid crystal, compensation films, polarizing plates and so on are divided into a plurality of layers of appropriate thickness, and the local propagation matrix is calculated for each of the divided layers.

Then, the values of the local propagation matrix of each of the layers are multiplied to obtain the propagation matrix of the all optical members. Thereafter, the reflection light and the transmitting light of incident light are calculated by using the propagation matrix.

The transmittance and the reflectance of lights of various wavelengths can be calculated by using the 4×4 matrix method by Berreman. By using this method, the luminous transmittance and the luminous reflectance could be calculated, and x values and y values of chromaticity coordinates for the color liquid crystal display apparatus of the present invention could be calculated quickly and accurately.

The 4×4 matrix method by Berreman is known as a technique capable of beautifully reproducing experimental results by numerical calculations. The inventors compared the experimental results of examples of the present invention with values obtained by numerical calculations, and confirmed that the experimental results and the values obtained by numerical calculations substantially agreed in the range of effective precision.

An actually used LCD has an ITO, a glass substrate or a spacer for a gap control which has a finite transmittance and wavelength characteristics. In consideration of influence by these elements, the transmittance vs applied voltage characteristics obtained by calculations well reproduced the experimental results.

Further, a result of calculation of the chromaticity substantially corresponds to the experimental results. Accordingly, calculations by the Berreman's 4×4 matrix method can be used for actual experiments.

In the basic construction of the present invention, a single birefringent plate in which there are optical anisotropic axes at its both surfaces and one of the optical anisotropic axes is in a relation of rotation with respect to the other optical anisotropic axis, and a liquid crystal layer in which the orientations of liquid crystal molecules at its both surfaces show a twist angle, are interposed between a single polarizing plate having the absorbing axis and a reflection layer, wherein the positions of the birefringent plate and the liquid crystal layer are interchangeable, and light is passed from the polarizing plate through the birefringent plate and the liquid crystal layer or through the liquid crystal layer and the birefringent plate, and reflected at the reflection layer to be propagated in the opposite direction and emitting through the polarizing plate.

In this case, effective driving voltages of three values or more are applied to the liquid crystal layer whereby a color display including an achromatic color can be obtained.

Claim 1 concerns a reflection type liquid crystal display apparatus comprising:
a polarizing plate,
a birefringent plate having a twist angle,
a liquid crystal layer of a nematic liquid crystal having positive dielectric anisotropy and including a chiral material, which is interposed between two substrates disposed to each other, each provided with an electrode, and
a reflection layer; wherein
said liquid crystal layer has
a twist angle $\theta_1$ from the first orientation direction at its first plane of said liquid crystal layer to the second orientation direction at its second plane of the same;
said birefringent plate has a twist angle $\theta_2$ from the first slow axis of optical anisotropic axes in a plane at the side for the polarizing plate to the second slow axis of optical anisotropic axes in opposite plane in a direction from the first slow axis to the second slow axis, and the product of $\Delta n_1 \cdot d_1$ of the refractive index anisotropy $\Delta n_1$ of the liquid crystal in the liquid crystal layer and the thickness $d_1$ of the liquid crystal layer is 0.30 to 2.00 μm;

the product of $\Delta n_2 \cdot d_2$ of the refractive index anisotropy $\Delta n_2$ of the birefringent plate and the thickness $d_2$ of the birefringent plate is 0.30 to 2.00 an angle $\theta_3$ is formed from said first orientation direction of the liquid crystal layer to the second slow axis of said birefringent plate;

an angle $\theta_4$ is formed from said first slow axis of said birefringent plate to the absorbing axis of said polarizing plate;

the angles $\theta_1$, $\theta_2$, $\theta_3$ and $\theta_4$ in a clockwise (+) or in counterclockwise (−) direction have such a relation that {$\theta_1$ is −160° to −300°,
$\theta_2$ is +160° to +300°,
$\theta_3$ is (+90°+[−10° to +40°]) and
$\theta_4$ is (+45°+[−30° to +25°] or +135°+[−30° to +25°])}; or
{$\theta_1$ is +160° to +300°,
$\theta_2$ is −160° to −300°,
$\theta_3$ is (−90°+[+10° to −40°]) and
$\theta_4$ is (−45°+[+30° to −25°] or −135°+[+30° to −25°])};
and voltage values of at least 3 values are selected to be applied to said liquid crystal layer.

Claim 2 concerns the reflection type color liquid crystal apparatus according to claim 1, wherein
|$\theta_1$| is 230° to 250°,
|$\theta_2$| is 230° to 250°,
$0.8 \leq \Delta n_1 \cdot d_1 \leq 1.5$ and
$\Delta n_1 \cdot d_1 - 0.15 \leq \Delta n_2 \cdot d_2 \leq \Delta n_1 \cdot d_1 + 0.15$.

Claim 3 concerns the reflection type color liquid crystal apparatus according to claim 1, wherein
{$\theta_1$ is −230° to −250°,
$\theta_2$ is +230° to +250°,
$\theta_3$ is (+90°+[−10° to +10°]) and
$\theta_4$ is (+45°+[−20° to −10°] or +135°+[−20° to −10°])}; or
{$\theta_1$ is +230° to +250°,
$\theta_2$ is −230° to −250°,
$\theta_3$ is (−90°+[+10° to −10°]) and
$\theta_4$ is (−45°+[+20° to +10°] or −135°+[+20° to +10°])};
$1.25 \leq \Delta n_1 \cdot d_1 \leq 1.35$ and
$1.25 \leq \Delta n_2 \cdot d_2 \leq 1.35$.

Claim 4 concerns the reflection type color liquid crystal apparatus according to claim 1, wherein
{−230° to −250°,
$\theta_2$ is +230° to +250°,
$\theta_3$ is (+90°+[+10° to +30°]) and
$\theta_4$ is (+45°+[+5° to +25°] or +135°+[+5° to +25°])}; or
{$\theta_1$ is +230° to +250°,
$\theta_2$ is −230° to −250°,
$\theta_3$ is (−90°+[−10° to −30°]) and
$\theta_4$ is (−45°+[−5° to −25°] or −135°+[−5° to −25°])};
$0.80 \leq \Delta n_1 \cdot d_1 \leq 0.90$ and
$0.80 \leq \Delta n_2 \cdot d_2 \leq 0.90$.

Claim 5 concerns the reflection type color liquid crystal apparatus according to claim 1, wherein
{$\theta_1$ is −230° to −250°,
$\theta_2$ is +230° to +250°,
$\theta_3$ is (+90°+[−10° to +10°]) and
$\theta_4$ is (+45°+[−30° to −10°] or +135+[−30° to −10°])}; or {$\theta_1$ is +230° to +250°,
$\theta_2$ is −230° to −250°,
$\theta_3$ is (−90°+[+10° to −10°]) and
$\theta_4$ is (−45°+[+30° to +10°] or −135°+[+30° to +10°])};
$1.2 \leq \Delta n_1 \cdot d_1 \leq 1.30$ and
$1.30 \leq \Delta n_2 \cdot d_2 \leq 1.40$.

Claim 6 concerns the reflection type color liquid crystal apparatus according to claim 1, wherein
{$\theta_1$ is −230° to −250°,
$\theta_2$ is +230° to +250°,
$\theta_3$ is (+90°+[−10° to +40°]) and
$\theta_4$ is (+45°+[−30° to +25°] or +135°+[−30° to +25°])}; or
{$\theta_1$ is +230° to +250°,
$\theta_2$ is −230° to −250°,
$\theta_3$ is (−90°+[+10° to −40°]) and
$\theta_4$ is (−45°+[+30° to −25°] or −135°+[ +30° to −25°])};
$1.20 \leq \Delta n_1 \cdot d_1 \leq 1.50$ and
$0.70 \leq \Delta n_2 \cdot d_2 < 0.90$.

Claim 7 concerns the reflection type color liquid crystal apparatus according to claim 1, wherein
{$\theta_1$ is −170° to −190°,
$\theta_2$ is +170° to +190°,
$\theta_3$ is (+90°+[−10° to +40°]) and
$\theta_4$ is (+45°+[−30° to +25°] or +135°+[−30° to +25°])}; or
{$\theta_1$ is +170° to +190°,
$\theta_2$ is −170° to −190,
$\theta_3$ is (−90°+[+10° to −40°]) and
$\theta_4$ is (−45°+[+30° to −25°] or −135°+[+30° to −25])};
$0.30 \leq \Delta n_1 \cdot d_1 \leq 2.00$, and
$0.30 \leq \Delta n_2 \cdot d_2 \leq 2.00$.

Claim 8 concerns the reflection type color liquid crystal apparatus according to claim 1, wherein
{$\theta_1$ is −170° to −190°,
$\theta_2$ is +170° to +190°,
$\theta_3$ is (+90°+[−10° to +40°]) and
$\theta_4$ is (+45°+[−30° to +25° ] or +135°+[−30° to +25°])}; or
{$\theta_1$ is +170° to +190°,
$\theta_2$ is −170° to −190°,
$\theta_3$ is (−90°+[+10° to −40°]) and
$\theta_4$ is (−45°+[+30° to −25°] or −135°+[+30° to −25°])};
$0.90 \leq \Delta n_1 \cdot d_1 \leq 1.30$ and
$\Delta n_1 \cdot d_1 - 0.15 \leq \Delta n_2 \cdot d_2 \leq \Delta n_1 \cdot d_1 + 0.15$.

Claim 9 concerns the reflection type color liquid crystal apparatus according to claim 1, wherein
{$\theta_1$ is −170° to −190°,
$\theta_2$ is +170° to +190°,
$\theta_3$ is (+90°+[+10° to +30°]) and
$\theta_4$ is (+45°+[−20° to +20°] or +135°+[−20° to +20°])}; or
{$\theta_1$ is +170° to +190°,
$\theta_2$ is −170° to −190°,
$\theta_3$ is (−90°+[−10° to −30°]) and
$\theta_4$ is (−45°+[+20° to −20°] or −135°+[+20° to −20°])};
$0.75 \leq \Delta n_1 \cdot d_1 \leq 1.05$ and
$0.75 \leq \Delta n_2 \cdot d_2 \leq 1.05$.

Claim 10 concerns the reflection type color liquid crystal apparatus according to any claim of claims 1–9, wherein a relationship (1) and (2) is satisfied $$(10°)^2 \leq (|\theta_3|-90°)^2+(|\theta_4|-45°)^2 \quad (1)$$

$$(10°)^2 \leq (|\theta_3|-90°)^2+(|\theta_4|-135°)^2 \quad (2).$$

Claim 11 concerns a reflection type liquid crystal display apparatus comprising:
a polarizing plate,
a birefringent plate having not a twist angle,
a liquid crystal layer of a nematic liquid crystal having positive dielectric anisotropy and including a chiral material, which is interposed between two substrates disposed to each other, each provided with an electrode, and
a reflection layer; wherein
said liquid crystal layer has
a twist angle $\theta_1$ from the first orientation direction at its first plane of said liquid crystal layer to the second orientation direction at its second plane of the same; and
the product of $\Delta n_1 \cdot d_1$ of the refractive index anisotropy $\Delta n_1$ of the liquid crystal in the liquid crystal layer and the thickness $d_1$ of the liquid crystal layer is 0.30 to 2.00 $\mu$m;
the product of $\Delta n_2 \cdot d_2$ of the refractive index anisotropy $\Delta n_2$ of the birefringent plate and the thickness $d_2$ of the birefringent plate is 0.30 to 2.00 $\mu$m;
an angle $\theta_5$ formed from said first orientation direction of the liquid crystal layer to the second slow axis of said birefringent plate;
an angle $\theta_6$ formed from said first orientation direction of the liquid crystal layer to the absorbing axis of said polarizing plate;
the angles $\theta_1$, $\theta_5$ and $\theta_6$ in a clockwise (+) or in counterclockwise (−) direction have such a relation that
[($\theta_1$ is −160° to −300°), ($\theta_5$ is +70° to +120°) and ($\theta_6$ is +25° to +80 ° or +115° to +170°]); or
[($\theta_1$ is +160° to +300°, ($\theta_5$ is −70° to −120°) and ($\theta_6$ is −25° to −80° or −115° to −170°)]; and
voltage values of at least 3 values are selected to be applied to said liquid crystal layer.

Claim 12 concerns the reflection type color liquid crystal apparatus according to any claim of claims 1–9, wherein a relationship (3) and (4) is satisfied $$(10°)^2 \leq (|\theta_5|-90°)^2+(|\theta_6|-45°)^2 \quad (3)$$

$$(10°)^2 \leq (|\theta_5|-90°)^2+(|\theta_6|-135°)^2 \quad (4).$$

In the present invention, a reflection layer is arranged at the side of the liquid crystal layer in a backside substrate in other embodiment.

In the present invention, a temperature compensated circuit is arranged in one module with display element in other embodiment.

In the present invention, an adjustment means is arranged in one module with display element in other embodiment.

There is provided a reflection type color liquid crystal display apparatus according to any one of the above-mentioned inventions, wherein an N number of frames are used in one period, and in the N frames, an M number of ON waveforms and an (N−M) number of OFF waveforms are produced in other embodiment.

There is provided a reflection type color liquid crystal display apparatus according to the above-mentioned inventions, wherein a white display is effected when M=0;

a green display is effected when M=N, and a red display or a blue display is effected when M≠O and M≠N in other embodiment.

There is provided a reflection type color liquid crystal display apparatus according to the above-mentioned inventions, wherein M is determined with respect to N to produce a gradation voltage thereby effecting a color display in other embodiment.

There is provided a reflection type color liquid crystal display apparatus according to the above-mentioned inventions, wherein the reflection layer is used as electrodes for driving the liquid crystal layer.

In each of the above-mentioned inventions, the first liquid crystal layer functions as an active optical layer for driving display data. Basically, a liquid crystal cell is used wherein transparent electrodes and an aligning control layer (or orientation layer) are disposed at both sides. In a case that the reflection layer side and the electrode at the back are commonly used, a transparent electrode is only used in the liquid crystal layer at the side of the polarizing plate. Further, although the electrodes generally have a stripe-like matrix structure, it may take various forms or patterns.

The birefringent plate used in the present invention is such a type that the phase of light is largely changed when the light is passed from one plane to another plane. The birefringent plate has a twist angle of 160°–300° in the same manner as the ordinary TN liquid crystal cell. The birefringent plate may be a liquid crystal cell itself or may be twist birefringent plates or a lamination of phase difference films (retardation films). Namely, it is composed of a combination of two optical media comprising a liquid crystal display cell and a compensation cell.

In order to prepare the birefringent plate, a transparent plastic film such as polycarbonate is uniaxially stretched with accuracy. A plurality of transparent plastic films are laminated with their optical anisotropic axes shifted from each other whereby a twist birefringent plate is formed.

The twist birefringent plate has the same optical characteristics as such one that a number of layers having an optical anisotropy are laminated in such a manner that the optical anisotropic axes are arranged to be sequentially twisted. Generally, it is so formed that a liquid crystal material having a twist characteristics is interposed between two substrates each having an aligning control power, and then, the polymer material is cured.

Conventionally, there has been known a method for a monochrome display that two liquid crystal cells are interposed between a pair of polarizing plates wherein a second liquid crystal cell is used for compensating a first liquid crystal cell. As the optimum conditions used in this case, the twist angle and Δn·d of the second liquid crystal layer are substantially equal to the twist angle and Δn·d of the first liquid crystal layer, and the direction of the twist angle of the second liquid crystal layer is opposite to the direction of the twist angle of the first liquid crystal layer. Further, the crossing angle between the orientation of liquid crystal molecules at the front surface of the first liquid crystal layer (at the side of second liquid crystal layer) and the orientation of liquid crystal molecules at the front surface of the second liquid crystal cell (at the side of first liquid crystal layer) is determined to be about 90°. Further, the polarizing axis of the polarizing plate is determined to have a crossing angle of about 45° with respect to the orientation of liquid crystal molecules at the front surface of the first liquid crystal layer or the second liquid crystal layer which is at the side of the polarizing plate and which is adjacent to the polarizing plate.

Under such conditions and when a polarizing plate to be disposed at the side of the reflection layer is omitted, a transparent state having a bright achromatic color can be obtained when an applied voltage is low or no voltage is applied.

However, when the applied voltage is gradually increased, a display of white→yellow→blue→yellow→blue→green can be obtained. Such color change is the same as that obtained in the invention of the conventional technique 8 as described in an example. Namely, it is impossible to effect a color change other than a light color or development of a red color.

In the present invention, however, the crossing angle between the orientation of liquid crystal molecules at the front surface of the first liquid crystal cell (at the side of the second liquid crystal cell) and the orientation of liquid crystal molecules at the front surface of the second liquid crystal cell or twist birefringent plate (at the side of the first liquid crystal cell) is shifted by ±10° to ±40° from ±90° rotated position, preferably, 10° to 30°, 15° to 25°, more preferably about 20°, whereby a transparent state of bright achromatic color can be obtained at a non-voltage application time or a non-selected voltage application time.

More detailed description will be made. Supposing that there is a counterclockwise rotation of the orientation from the first orientation to the second orientation in the liquid crystal layer and there is a clockwise rotation from the optical anisotropic axis in the birefringent plate at the side of the liquid crystal layer to the optical anisotropic axis of the birefringent plate at the side opposite the liquid crystal layer, an angle measured counterclockwisely from the optical anisotropic axis in the plane of the birefringent plate at the side of the liquid crystal layer to the first orientation is 100° to 200°. When an applied voltage is gradually increased, a color display of red, blue and green can be provided. In this case, the achromatic color obtained is bright, and excellent color development of red, blue and green is possible.

Description has been made as to requirement of displaying a monochrome tone by using a conventional compensation cell wherein the crossing angle is shifted. However, the same effect can be provided by changing the twist angle, Δn·d and dispersion of wavelength.

A temperature compensation type birefringent plate wherein Δn·d is changed depending on temperature may be used. In this case, a reflection type color liquid crystal display apparatus capable of providing easy view to a display can be obtained even when an ambient temperature changes. In this case, Δn·d which varies depending on a temperature change should be substantially the same as Δn·d of liquid crystal which is also changed depending on a temperature change. Further, it is preferable to use a twist birefringent plate wherein a change of the optical anisotropy depends on wavelengths. By using the twist birefringent plate, a reflection type color liquid crystal display apparatus which further improves color purity can be provided.

In the present invention, a white display (W) exhibits color development in a region of $0.3 \leq X < 0.33$ and $0.3 < Y < 0.34$ in the chromaticity coordinate; a red display (R) exhibits color development in a region of $0.33 \leq X$; a blue display (B) exhibits color development in a region of $X \leq 0.31$ and $Y \leq 0.3$, and a green display (G) exhibits color development in a region of $X \leq 0.30$ and $0.3 \leq Y$. In the present invention, color development in respective color regions can be effected. Although it is possible to slightly shift the borders of the color regions as long as colors developed in each of the color regions exhibit a high color purity in comparison with those which are out of the borders. Model CR-200 by Minolta was used for measurement of colors.

A further definition about good color development is described as follows. It is supposed that a white display (W) means that coordinate is adjacent to (X=0.31, y=0.316) and a reflectance is more than or equal to 40%, a red display (R) means that coordinate is adjacent to (X=0.5, y=0.3) and a reflectance is more than or equal to 25%, a blue display (B) means that coordinate is adjacent to (X=0.15, y=0.1) and a reflectance is less than or equal to 20%, a green display (G) means that coordinate is adjacent to (X=0.2, y=0.4).

BRIEF DESCRIPTION OF THE DRAWINGS

FIG. 14a is a chromaticity diagram showing a color change to voltages in Example B4;

FIG. 14b is a diagram showing reflectance to voltages in Example B4;

FIG. 15a is a chromaticity diagram showing a color change to voltages in Example B5;

FIG. 15b is a diagram showing reflectance to voltages in Example B5;

FIG. 16a is a chromaticity diagram showing a color change to voltages in Example B6;

FIG. 16b is a diagram showing reflectance to voltages in Example B6;

FIG. 17a is a chromaticity diagram showing a color change to voltages in Example B7;

FIG. 17b is a diagram showing reflectance to voltages in Example B7;

FIG. 18 is a chromaticity diagram showing a color change to voltages in prior art;

FIG. 19a is a chromaticity diagram showing a color change to voltages in comparative example B0;

FIG. 19b is a diagram showing reflectance to voltages in comparative example B0;

BEST MODE OF CARRYING OUT THE INVENTION

Figures 1A, 1B, 1C, 1D:
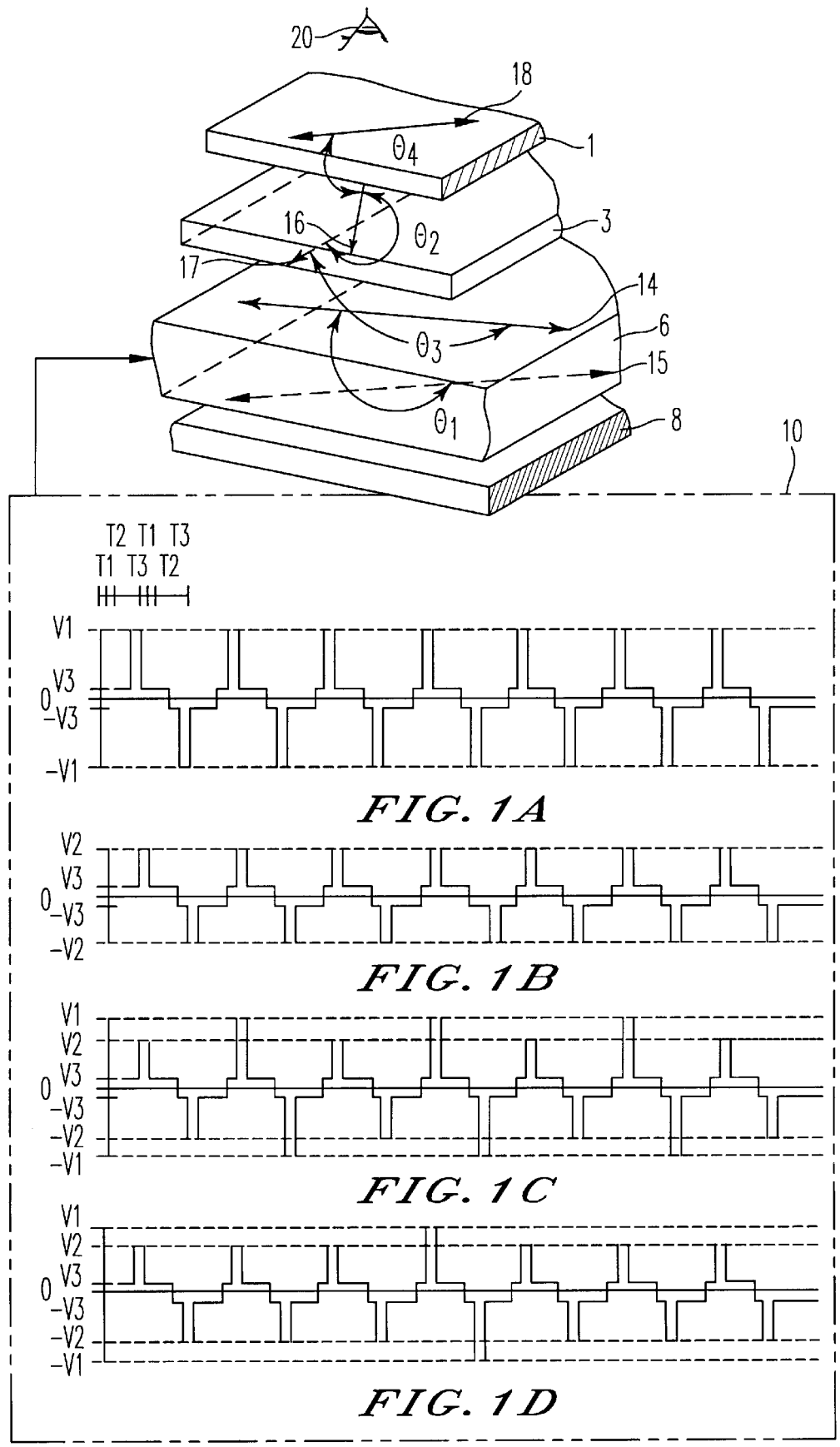
FIG. 1 is a diagram as a model showing the basic construction of the present invention.

The present invention will be described in more detail.

In the present invention, the twist angle of liquid crystal molecules between the electrodes in the first liquid crystal cell is determined to be in a range of 160° to 300°. When the twist angle is less than 160°, there is a small change of state in the liquid crystal caused when the liquid crystal display element is subjected to time sharing driving at a high duty ratio which requires a steep change of transmittance. On the other hand, when the twist angle is more than 300°, there easily causes hysteresis or domain by which light is scattered.

Further, the product $\Delta n_1 \cdot d_1$ of the refractive index anisotropy ($\Delta n_1$) of liquid crystal in the liquid crystal layer and the thickness ($d_1$) of the liquid crystal layer is determined to be 0.30 μm to 2.00 μm. When the product is less than 0.30 μm, the degree of change of the state of liquid crystal to which a voltage is applied is small. On the other hand, when the product is more than 2.00 μm, the viewing angle and the response characteristics become inferior.

In particular, in order to develop an achromatic color and to increase a color change with respect to an applied voltage, it is desirable that the twist angle of the liquid crystal is 170° to 190° or 230° to 250°, in particular, about 180° or 240°. 240° type RC-LCD is better than 180° type in viewpoint of high-duty multiplex driving system.

The range of $\Delta n_1 \cdot d_1$ should be in a range to be satisfied in a temperature range for using the liquid crystal display element, and it is possible to display a beautiful picture in the temperature range of use. However, when the performance of the liquid crystal display element is required for outdoor use, there is a case that the above-mentioned values are satisfied only in a part of the temperature range of use. In this case, if a value of $\Delta n_1 \cdot d_1$ is out of the above-mentioned numerical range even in the temperature range of use, a desired color can not be obtained or there is found reduction in the viewing angle characteristics.

In preparing the first liquid crystal cell, transparent electrodes such as ITO($In_2O_3$—$SnO_2$), $SnO_2$ or the like are formed on the front surfaces of substrates such as plastic, glass or the like, and the transparent electrodes are patterned to have a predetermined pattern each. A film of polyimide, polyamide or the like is formed on the surface of each of the substrates. The front surface of the film is subjected to rubbing or oblique vapor deposition of SiO or the like to thereby form an aligning control layer. Between the substrates with transparent electrodes, a liquid crystal layer including nematic liquid crystal of a positive dielectric anisotropy wherein the liquid crystal has a twisted angle of 160° to 300°, is interposed.

As a typical example of such structure, there is a dot matrix liquid crystal display element having a large number of electrodes in a form of matrix wherein 640 electrodes are formed in a form of stripe on either of the substrates and 400 electrodes are formed in a form of stripe on the other substrate so as to be perpendicular to the former electrodes, whereby a display of 640×400 dots is formed. Generally, the size of a pixel for forming a dot is about 270 $\mu$m×270 $\mu$m, and spaces between pixels are about 30 $\mu$m.

An insulating film such as $TiO_2$, $SiO_2$, $Al_2O_3$ or the like may be formed between the electrodes and the aligning control layer in order to prevent short circuit in each of the substrates, or a lead electrode of low resistance such as Al, Cr, Ti or the like, may be additionally attached to the transparent electrode.

The edge portions of the substrates are secured with a sealing material. Thus, the first liquid crystal cell is formed.

Similarly, a film of polyimide is formed on a surface of a pair of glass substrates. The film is subjected to rubbing to form an aligning control layer. Liquid crystal is introduced in a space between the substrates, and the edge portions of the substrates are secured with a sealing material. Thus, the second liquid crystal cell is formed.

The first and second liquid crystal cells are stacked up and a polarizing plate is disposed at a side of the stacked liquid crystal cell. It is usual that the polarizing plate itself is disposed at the outside of the substrate which forms a liquid crystal cell. In order to simplify the structure and improve producibility within a range of predetermined optical performance, the substrate itself may be constituted by a polarizing plate, or a polarizing plate may be disposed between the substrate and the electrode.

A reflection layer is disposed on a lamination of the first and second liquid crystal cells at a position opposite to the polarizing plate. The reflection layer may be a material having a convex/concave portion in the front surface on which aluminum is vapor-deposited. Metal such as Ag, Cr, Ni, Au, W or the like may be used instead of aluminum. Further, a convex/concave portion may be formed in the front surface of a thin film of Al, Ag, Cr, Ni, Au, W or the like.

When a convex/concave portion is formed in the front surface of a metal film, light is reflected maintaining a state of polarization, which is different from a case of using a paper wherein polarizing light is randomly reflected. Accordingly, light which has passed through the liquid crystal layer is correctly reflected at the reflection layer of metal without changing the state of polarization of light, and is again passed through the liquid crystal layer.

Further, the second liquid crystal cell may not have the structure as mentioned above, and it may be replaced by a birefringent plate having the same optical characteristics as the second liquid crystal cell. A twist birefringent plate which is equal in terms of the characteristics may be used. The words "equal characteristics" means that when light enters into a certain plane, the state of polarization of the light emitting from the opposite plane is the same.

The twist birefringent plate is formed by twisting in the direction of thickness molecules having an optical anisotropy. When a twist angle of the molecule, the magnitude of $\Delta n \cdot d$ of the molecules and the direction of twist are substantially the same as those of the second liquid crystal cell, the twist birefringent plate having substantially the same characteristics as the second liquid crystal cell can be formed. In using the twist birefringent plate, it is unnecessary to dispose the plate at an outer side of the substrate of the first liquid crystal cell in the same manner as the second liquid crystal cell, and it may be interposed between the liquid crystal layer and the substrate of the first liquid crystal cell.

A temperature compensated birefringent plate whose $\Delta n \cdot d$ is changed as Ta may be preferably used. A good RC-LCD apparatus is provided since the $\Delta n \cdot d$ of temperature compensated birefringent plate substantially changes in response to Ta when the $\Delta n \cdot d$ of liquid crystal layer does so. A twist type birefringent plate is also preferably used since a further improved chromaticity will be obtainable.

FIG. 1 shows the basic construction of the reflection type color liquid crystal display apparatus of the present invention.

A first liquid crystal layer 6 and a birefringent plate 3 are disposed between a polarizing plate 1 having an absorbing axis 18 and a reflection layer 8. Voltage values of three values or more are selected and the selected voltage values are applied from a driving circuit 10 to the first liquid crystal layer 6 by multiplex driving. Crossing angles $\theta_1$, $\theta_2$, $\theta_3$ and $\theta_4$ formed among the absorbing axis 18, the first orientation 14 and the second orientation 15 of the first liquid crystal cell and the first orientation 16 and the second orientation 17 of the second liquid crystal layer are respectively set to have predetermined angles. The angles defined in the present applications are indicated according to the direction of the rotation observed from the side of the polarizing plate, wherein positive numerical values indicate angles measured clockwisely and negative values indicate angels measured counterclockwisely.

When voltages are applied to the reflection type color liquid crystal display apparatus constituted as described above, a change of color as shown in FIG. 5 is obtained. Since colors are changed depending on voltage levels for driving, selection of colors is conducted by selecting voltage levels for gradations.

As methods of driving voltages for gradation displays, there have been known various methods such as a frame gradation method, an amplitude gradation method, a pulse width gradation method and so on. Any method may be used as far as the magnitude of effective voltages to be applied to the liquid crystal can be changed. The frame gradation method is generally employed to obtain an excellent display. Further, a false gradation may be used.

A driving method in which a plurality of row electrodes are simultaneously selected may be used. As an example of such driving method (there is a multiple line selection method disclosed in, for instance, U.S. Pat. No. 5,262,881) wherein liquid crystal of fast response is used, and a plurality of row electrode are simultaneously selected for driving the liquid crystal wherein selection pulses are dispersed with a result of preventing the relaxation whereby a display of high contrast ratio and high response speed can be provided. By using such driving technique, a reflection type color display of bright color is obtainable without reducing the contrast ratio even in a high speed display. Further, there is obtainable a liquid crystal display apparatus of low power consumption rate or a reflection type color liquid crystal display apparatus capable of displaying dynamic images without reducing color purity even when a liquid crystal material of fast response type is used.

In order to use the multiplex driving, it is necessary to increase an optical change to a voltage applied. In the present invention, the following points have to be considered to obtain an increased optical change.

First, the twist angle of the liquid crystal has to be increased as pointed out by Sheffer et al. When the twist angle is increased, a change of liquid crystal molecules to an applied voltage can be made large, and an optical change to the voltage can be made large.

Secondary, a polarizing plate to be disposed at a side where the reflection layer is disposed, is eliminated. A change of Δn·d of the liquid crystal layer can be considered to be double even though the change of liquid crystal molecules in the liquid crystal layer to the applied voltage is the same since light passes twice in the same light path. Namely, the optical change is enhanced.

Conventionally, the reflection layer had to be arranged at an outer side of the polarizing plate. In the above-mentioned construction, however, it is unnecessary to dispose the polarizing plate at the side of the reflection layer. The durability of a polarizing plate manufactured under a large scale production is decreased when it is located under conditions of high temperature and high humidity. Accordingly, there is a problem of reliability in practical used when the polarizing plate is arranged at the side of the liquid crystal with respect to the substrate. Since the polarizing plate is arranged at an outer side of the substrate (at the position opposite the liquid crystal cell), the reflection layer is naturally arranged at an outer side of the substrate.

In the above-mentioned construction, since the reflection layer is separated by the thickness of the substrate from the liquid crystal layer, shadows of black color are observed when a reflection type liquid crystal display apparatus which effects a non-transparent (black) display in a transparent (white) background, is looked. This is because a portion which is desired for a black display is bright and a portion which is desired for a white display is dark, and accordingly, visibility is largely reduced.

Further, visibility is improved as the distance from the liquid crystal to the reflection layer is short. The reflection layer should be disposed at the side of the liquid crystal layer with respect to the substrate. For instance, the reflection layer should be disposed at the side of the liquid crystal layer with respect to the substrate and an electrode is disposed on the reflection layer.

For example there is a method to make the substrate at the side for a reflection layer thin. Generally a glass substrate of 1.1 mm or 0.7 mm thickness is used for LCD substrate.

It is preferred to change the thickness of glass substrate to be 0.4 mm. Further it is still preferably good to use a glass substrate of 0.3 mm, or a one less than or equal to 0.1 mm.

A problem in application usage or production process is occurred because a glass substrate of less than 0.4 mm thickness applied for a large display size LCD is apt to be brittle.

So there is a useful countermeasure for resolving this problem that a substrate at the side for the reflection layer is set to be less than or equal to 0.4 mm and a substrate at the side for the polarizing plate is set to be more than or equal to 0.4 mm.

And a plastic film using such as polycarbonate or acrylate polymer may be applied for the substrate in replace of a glass substrate to obtain a thin, lightweight and non-brittle RC-LCD.

More specifically, a convex/concave portion is formed in the front surface of a glass substrate; a thin film of aluminum is formed on the convex/concave surface to form a reflection layer; an insulating layer is formed on the reflection layer; an ITO layer is formed on the insulating layer, and the ITO layer is patterned to have a predetermined pattern. An insulating layer and an aligning layer are successively formed on the patterned ITO layer, and then, a liquid crystal layer is disposed thereon.

Material having a reflecting characteristic, such as aluminum may be used as an electrode, instead of an ITO electrode. Besides aluminum, metal such as Ag, Cr, Ni, Au, W or the like can be considered. Although, silver is most preferable in view of reflectivity, a suitable material can be chosen in consideration of producibility and cost.

Specifically, a convex/concave portion is formed in the front surface of a glass substrate and a thin film of aluminum is formed on the convex/concave surface. The thin film is patterned to have a predetermined pattern. Then, an insulating layer and an aligning layer are successively formed on the patterned film, and then, a liquid crystal layer is disposed thereon. As the method of forming a convex/concave portion in the front surface of the glass substrate, there is a method of forming a convex/concave portion in a glass plate itself by dipping the surface of the glass plate in hydrofluoride acid (HF), or a method of forming a convex/concave portion in a surface of a glass plate by arranging particles having a diameter in a range of several 10 μm to several μm.

When the electrode is used as a reflection layer, e.g., the electrode is patterned to have a stripe form, light irradiating to a space between stripes can not be utilized because the light is not reflected. In order to eliminate a dark state resulted from the above-mentioned structure, an additional reflection layer may be arranged at an outer side of the substrate (at the side opposite the liquid crystal cell).

An arrangement of temperature compensation circuit to change a driving voltage in accordance with Ta change makes this RC-LCD be operative for the driving voltage changes as Ta. If a needful driving voltage changes linearly for Ta change, a linear change of driving voltage for Ta may be arranged.

A RC-LCD has a narrow driving voltage range for color development. So an adjustment volume arranged in an electronic device is useful for a user to adjust a driving voltage by himself.

This RC-LCD is able to provide a bright display for the reason of using only one polarizing plate in its constitution. Then a very bright RC-LCD is operative without having a backlight. Not using a backlight, it is low-power dissipation and useful for many handheld applications and possible to make a RC-LCD thin relatively.

The present invention permits multiplex driving without using color filters to provide a bright white display when a non-selection waveform is applied, and a blue, a green or a red display when a selection waveform or an intermediate voltage between the selection waveform and the non-selection waveform is applied.

In other words, there is obtainable a reflection type color liquid crystal display apparatus capable of displaying an achromatic color when no voltage is applied or a low voltage is applied, and displaying a color display when a voltage is applied.

Since the color liquid crystal display apparatus uses only one polarizing plate, a bright display can be provided. Accordingly, it can be used as a reflection type color liquid crystal display apparatus providing a very bright display without using a back light. Since the back light is unnecessary, power consumption rate is low and it is suitable for carrying. Further, the thickness of the liquid crystal display apparatus can be made thin.

In particular, when the electrode is used as a reflection layer, a display having a high degree of visibility can be provided since there is no shadow and mixing of color. In this case, a further bright color display can be obtained by using silver having a high reflectivity as material for a reflection layer.

Further, detailed explanation will be made on the frame gradation. In the multiplex driving used in the present invention, a waveform for forming a display pixel (an ON pixel) is called an ON waveform, and a waveform for forming a non-display pixel (an OFF pixel) is called an OFF waveform. The shape of the ON waveform or the OFF waveform, and a ratio of effective voltage of the ON waveform or the OFF waveform are determined depending on a duty ratio or a bias voltage.

An effective voltage of ON waveform applied in a frame is referred to as $V_{ON}$, and an effective voltage of the OFF waveform in a frame is referred to as $V_{OFF}$. An optimum bias method is supposed to be used, for instance. Then, $V_{ON}/V_{OFF}$1.07 in a duty ratio of 1/200; $V_{ON}/V_{OFF}$=1.09 in a duty ratio of 1/128; $V_{ON}/V_{OFF}$=1.13 in a duty ratio of 1/64; $V_{ON}/V_{OFF}$=1.20 in a duty ratio of 1/32 and $V_{ON}/V_{OFF}$=1.29 in a duty ratio of 1/16.

Usually, only the effective voltage of $V_{ON}$ is applied to display pixels and the effective voltage of $V_{OFF}$ is applied to non-display pixels. Namely, an effective voltage between $V_{ON}$ and $V_{OFF}$ can not be applied.

However, supposing that 7 frames are used; a frame of ON waveform is applied once and a frame of OFF waveform is applied 6 times, then, an average effective voltage of $(V_{ON}+V_{OFF}\times 6)/7$ is applied to pixels in a frame. It means that an intermediate effective voltage between $V_{ON}$ and $V_{OFF}$ can be applied to the pixels. Also, supposing that 7 frames are used wherein the frame of ON waveform is applied 3 times and the frame of OFF waveform is applied 4 times, an average effective voltage of $(V_{ON}\times 3+V_{OFF}\times 4)/7$ is applied to the pixels in a frame. BY using the above-mentioned technique wherein 7 frames are used, effective voltage levels for 8 gradations can be obtained.

Further explanation will be made with reference to FIG. 1. In FIG. 1, a driving waveform which is fram-modulated is supplied from a driving circuit 10 across electrodes (not shown) which interposes a first liquid crystal layer 6. In the driving waveform, the ordinate represents voltage value and the abscissa represents time. V3, V2 and V1 indicate voltage values with respect to the reference voltage of 0 V, and T1, T2 and T3 indicate time widths. A waveform to be applied to a pixel in multiplex driving is examined. Then, when driving is conducted with a duty of 1/200 and 1/15 bias, for instance, an ON waveform applied to the pixel is shown in FIG. 1a and an OFF waveform applied to a non-display pixel is shown in FIG. 1b.

In the multiplex driving with 1/200 duty and 1/15 bias, V3:V2:V1=15:13:1 and (T1+T2+T3):T2=200:1 where (T1+T2+T3) is referred to as one frame. T2 indicates a scanning time, and T1 or T3 indicates a non-scanning time. V1 indicates the height of a voltage applied to a display pixel in the scanning time; V2 indicates the height of a voltage applied to a non-display pixel in the scanning time, and V3 indicates the height of a voltage applied in the non-scanning time.

In FIG. 1a, it is assumed that an effective voltage applied in one frame is expressed by $V_{ON}$ and in FIG. 1b, an effective voltage applied in one frame is expressed by $V_{OFF}$. Generally, a voltage applied to liquid crystal is in a form of alternating current. It is because when a DC voltage is applied to the liquid crystal, decomposition of the liquid crystal occurs.

FIG. 1a shows a method of forming an alternating current voltage by applying an inversed frame just after the application of a normal frame. When an alternating current form is formed in each two frames, a low frequency component is increased. Accordingly, a line inversion driving method is generally employed to eliminate such disadvantage. Namely, the line inversion driving method is to change polarities every time of driving a predetermined number of lines in a frame. When it is considered to form an alternation waveform for each two frames, 14 frames are needed to obtain a display of 8 gradations.

FIG. 1a shows that in all 14 frames, voltage waveforms exhibit V1 or −V1 at the time of scanning. An averaged effective voltage applied in a frame corresponds to $V_{ON}$. In FIG. 1b, voltage waveforms at the time of scanning have V2 or −V2 in all 14 frames. An averaged effective value applied in a frame corresponds to $V_{OFF}$.

FIG. 1c shows 6 frames among 14 frames have the waveforms of V1 and 8 frames have the waveforms of V2.

In this case, an averaged effective voltage of a frame applied has a value of $(V_{ON}\times 6+V_{OFF}\times 8)/14$. FIG. 1d shows that two frames among 14 frames have the waveforms of V1, and 12 frames have the waveforms of V2. In this case, an averaged effective voltage of one frame applied has a value of $(V_{ON}\times 2+V_{OFF}\times 12)/14$.

As described above, when the frames of ON waveform and the frames of OFF waveform are applied in a mixed state, effective voltages between the effective voltage provided by only the ON waveform and the effective voltages provided by OFF waveform can be selected.

In the following, description will be made as to Examples of group A.

EXAMPLE A1

Figure 2:
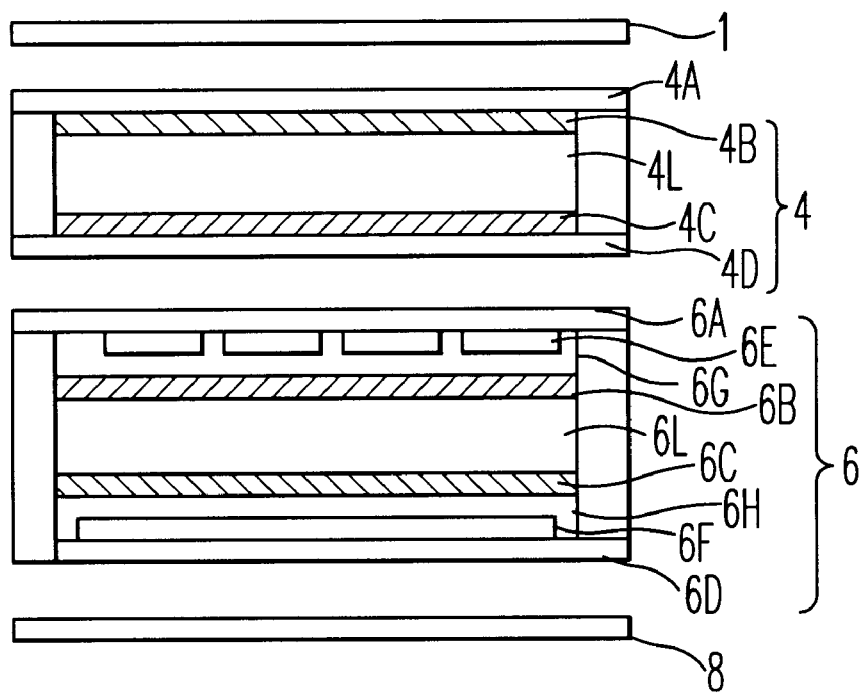
FIG. 2 is a cross-sectional view in a form of model on Example 1.

FIG. 2 is a cross-sectional view in a form of model of an embodiment of the present invention. In FIG. 2, a polarizing plate 1, a second liquid crystal cell 4, a first liquid crystal cell 6 and a reflection layer 8 are successively formed in this order. The second liquid crystal cell has a liquid crystal layer 4, a first substrate 4A of second liquid crystal cell, a second substrate 4D of second liquid crystal cell, a first aligning control layer 4B of second liquid crystal cell and a second aligning control layer 4C of second liquid crystal cell.

The first liquid crystal cell has a liquid crystal layer 6L, a first substrate 6A of first liquid crystal cell, a second substrate 6D of first liquid crystal cell, a first electrode 6E (at the side of the first substrate 6A) of first liquid crystal cell, a first aligning control layer 6B of first liquid crystal cell, a second aligning control layer 6C of first liquid crystal cell and a second electrode 6F (at the side of the second substrate 6D) of first liquid crystal cell. Further, driving voltages are applied to upper and lower electrodes (the first electrode 6E and the second electrode 6F) of the first liquid crystal cell from a driving circuit which is omitted from the drawings. And insulation layer 6E, 6H and so on are formed.

The liquid crystal cells 6 are respectively provided with a peripheral seal for liquid crystal layer, insulating layers disposed between the electrodes and the aligning control layers, a light shielding layer, a drawing terminals for electrodes, an undercoat layer, a protective layer and other structural elements which are used for the ordinary liquid crystal cell.

The liquid crystal cells were formed as described below.

A glass substrate with a transparent electrode (ITO) was prepared. Patterning was conducted to the ITO electrode to form a pattern of stripe-like form whereby the first electrode which constitutes one of the electrodes, was formed. A thin $TiO_2$ and $SiO_2$ layer were formed on the electrode to obtain an insulating layer. Then a thin polyimide layer was formed and rubbing was conducted to the polyimide layer by using cloth to form the first aligning control layer 6B. A substrate was formed in the same manner as described above, and the two substrates were overlaid so that their stripe-like electrodes were crossed. Liquid crystal material was introduced to a gap between the substrates, and the edge portion was fixed with a sealing material. Thus, the first liquid crystal cell was formed.

In the same manner as above, a thin polyimide layer was formed on glass substrates, followed by rubbing with cloth to thereby form the aligning control layer 4B. The substrates were overlaid; liquid crystal material was introduced into a gap between the substrates, and the edge portion was sealed with the sealing material. Thus, the second liquid crystal cell 4 was formed. In FIG. 2, a polarizing plate side is referred to as an upper side and a reflection layer side is referred to as a lower side.

Figure 4:
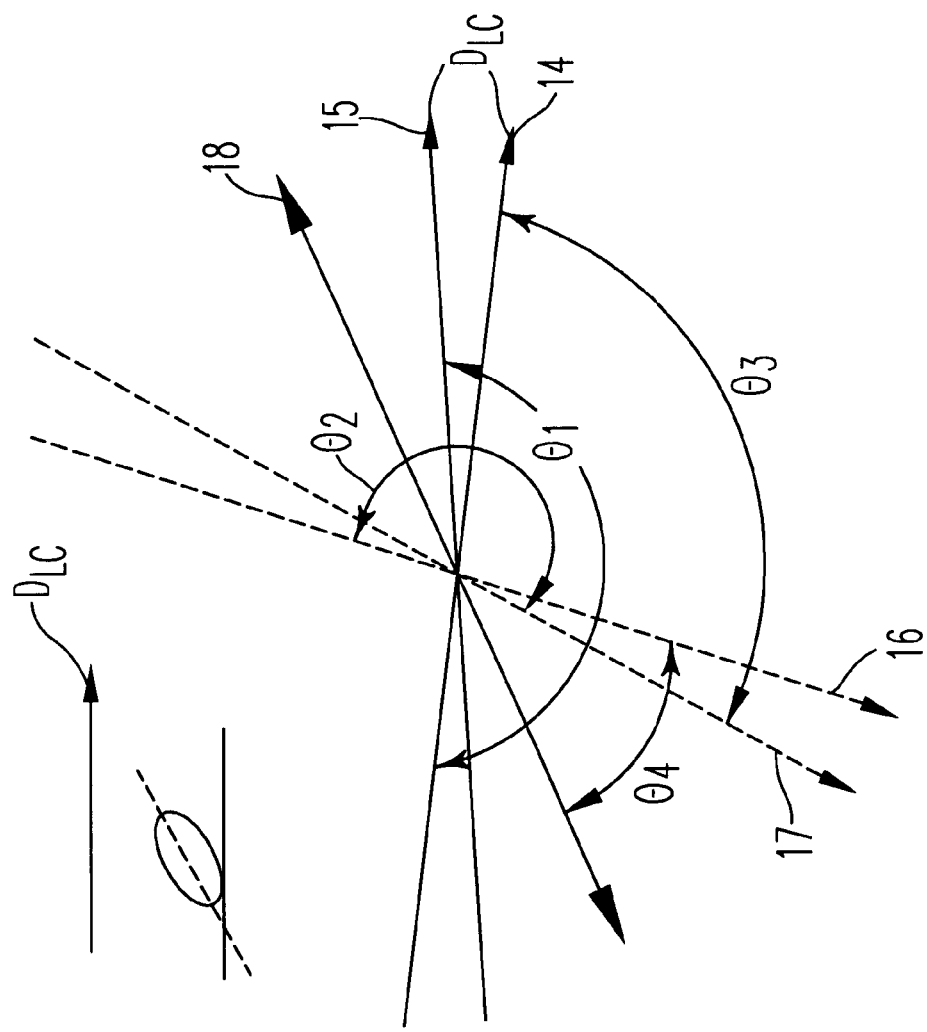
FIG. 4 is a plan view showing angular relations among the absorbing axis of the polarizing plate and the orientations of the first liquid crystal cell and the second liquid crystal cell in Example 1.

In FIG. 4, reference numeral 14 designates the orientation of liquid crystal molecules at the upper side of the first liquid crystal cell; numeral 15 designates the orientation of liquid crystal molecules at a lower side of the first liquid crystal cell; numeral 16 designates the orientation of liquid crystal molecules at the upper side of the second liquid crystal cell; numeral 17 designates the orientation of liquid crystal molecules at a lower side of the second liquid crystal cell, and numeral 18 designates the absorbing axis of the polarizing plate. Further, in FIG. 4, the arrow mark ($D_{LC}$) direction indicating the orientation of liquid crystal molecules indicates the orientation of an inclination of the liquid crystal molecules with respect to the plane of the substrates (the aligning control layers).

Further, $\theta_1$ represents a twist angle of liquid crystal obtained by measuring counterclockwisely from the orientation 14 of liquid crystal molecules at an upper side of the first liquid crystal cell to the orientation 15 of liquid crystal molecules at a lower side of the first liquid crystal cell, and $\theta_2$ represents a twist angle of liquid crystal obtained by measuring clockwisely from the orientation 16 of liquid crystal molecules at an upper side of the second liquid crystal cell to the orientation 17 of liquid crystal molecules at a lower side of the second liquid crystal cell.

$\theta_4$ represents an angle obtained by measuring clockwisely from the absorbing axis 18 of the polarizing plate to the orientation 16 of liquid crystal molecules at an upper side of the second liquid crystal cell, and $\theta_3$ represents an angle obtained by measuring clockwisely from the orientation 17 of liquid crystal molecules at a lower side of the second liquid crystal cell to the orientation 14 of liquid crystal molecules at an upper side of the first liquid crystal cell. In this example, the first liquid crystal cell having a left helical structure and the second liquid crystal cell having a right helical structure were used. However, even when the helical structures are opposite to each other, a color display can easily be obtained in the same manner as above by determining the directions of rotation of $\theta_1$, $\theta_2$, $\theta_3$ and $\theta_4$ so that the relations among the orientations of liquid crystal molecules in the first and second liquid crystal cells and the orientation of the absorbing axis of the polarizing plate are reversed. Basically, $\theta_1$ and $\theta_2$ are interchangeable.

The refractive index anisotropy $\Delta n_1$ and the thickness $d_1$ of the liquid crystal layer in the first liquid crystal cell were adjusted so that $\Delta n_1 \cdot d_1$ of the liquid crystal layer was about 0.95 µm. The refractive index anisotropy $\Delta n_2$ and the thickness $d_2$ of the liquid crystal layer in the second liquid crystal cell were adjusted so that $\Delta n_2 \cdot d_2$ of the liquid crystal layer was about 0.95 µm. Then, $\theta_1=-180°$, $\theta_2=180°$, $\theta_3=110°$ and $\theta_4=45°$ were determined.

Figure 5:
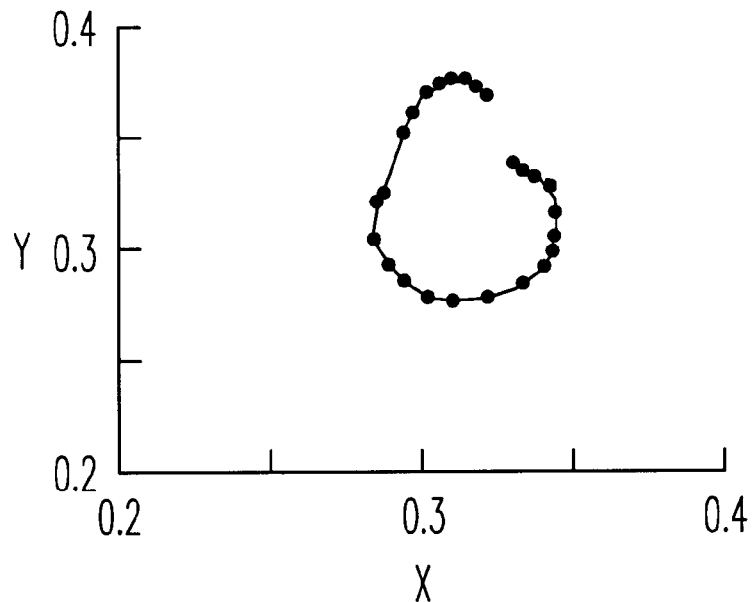
FIG. 5 is a chromaticity diagram showing a color change to voltages in Example 1.
Figure 6:
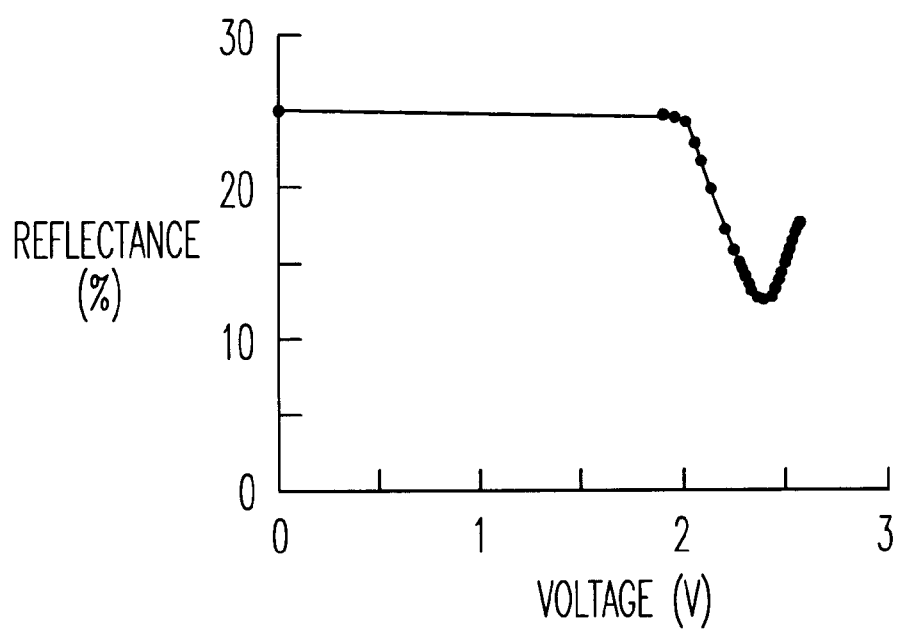
FIG. 6 is a diagram showing reflectance to voltages in Example 1.
Figure 7:
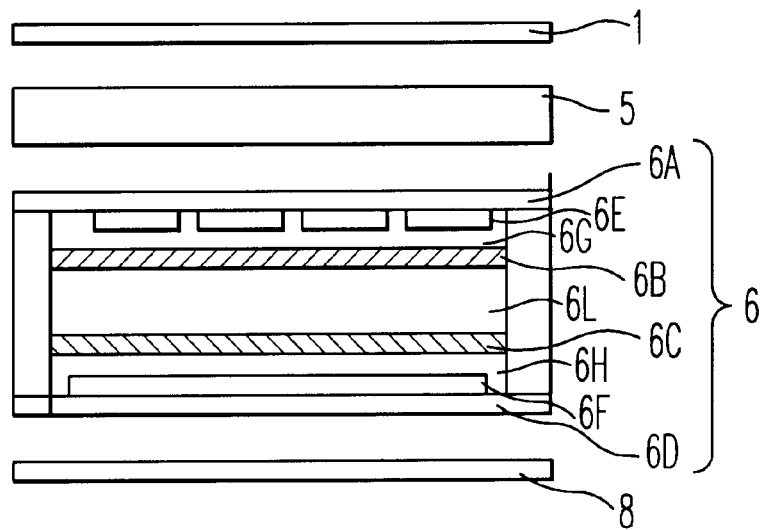
FIG. 7 is a cross sectional view in a form of model on Example in group B and D.

An applied effective voltage was increased in a manner as shown in a chromaticity diagram in FIG. 5 (a partially enlarged view of a CIE 1931 chromaticity diagram) which represents a state of color development. As a result, bright displays of white, red, blue and green were obtained. When gradation voltages in pulse wave were applied, color development was obtained. A color liquid crystal display with good visibility and excellent color purity could be achieved.

For the liquid crystal display element, 8 gradation driving was conduced with a duty ratio of 1/32. As a result, a white display was obtained in 0/7 level; a red display in 3/7 level; a blue display in 5/7 level and a green display in 7/7 level respectively. A static type driving is also possible. In this example, the chromaticity includes noises resulted from portions between lines where there are no pixels, in a dot matrix type display element having an aperture rate of about 80%, and is substantially close to a color actually observed.

A picture having a size of 64×64 dots was displayed. A graph was displayed by using the color liquid crystal display apparatus of the above-mentioned embodiment. In the graph, the background color was white and three colors of red, blue and green were used for displaying bar graphs. The visibility could be remarkably improved.

Further, in a displaying day scheduling, an important meeting was indicated by red to attract attention. Further, in display for calender, Saturday and Sunday were indicated by red, weekdays were indicated by blue, and the day corresponding to today was indicated by green. In this case, white was used as the background color.

Sentences were also displayed. White was used as the background color and characters were indicated by blue. Red-colored marking was used for a block in the sentences. The title was indicated by a green color and underlined portions were indicated by green or red.

Further, as a graphic display, white, red, blue and green were used. Many intermediate voltages were used to display pink, purple and bluish green colors whereby colors for a human face could be expressed and the background could be displayed with several kinds of color.

Thus, the color liquid crystal display apparatus according to this example could present an environment of good visibility and good workability in comparison with a display apparatus capable of exhibiting a simple monochrome display.

EXAMPLE A2

Figure 3:
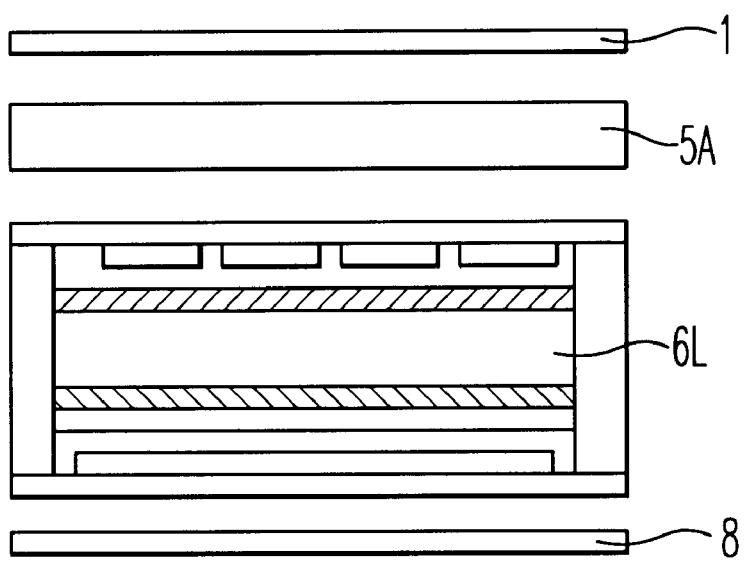
FIG. 3 is a cross-sectional view in a form of model on Example 2.

The second liquid crystal cell in Example 1 was replaced by a twist birefringent plate having substantially the same construction. FIG. 3 shows the construction. There were provided the polarizing plate 1, a birefringent plate 5, the first liquid crystal cell 6 and reflection layer 8. As a result of tests for Example 2, substantially the same effect as in Example A1 was obtained.

In comparison with Example A1 wherein the glass substrate was used for the second liquid crystal cell, the phases difference plate of this example is light because it is made solely of films and is suited for carrying.

EXAMPLE A3

The electrode of lower side was commonly used as the reflection layer which was disposed at a lower side of the first liquid crystal cell in Example A1. Specifically, only a side of the glass substrate used as a substrate was exposed, and the side of the glass substrate was dipped in HF (hydrofluoric acid) to form a convex/concave portion in the glass surface. Then, aluminum was coated on the glass surface by vapor deposition. Then, patterning was conducted to form a stripe-like electrode.

Further, a $SiO_2$ and $TiO_2$ insulating layer was formed on the electrode, followed by forming an aligning control layer of polyimide. The substrate was overlaid by another substrate on which a transparent electrode of ITO of stripe-like pattern was formed, by interposing spacers. The peripheral portion was fixed with a sealing material, and liquid crystal was injected, whereby a first liquid crystal cell was prepared.

With respect to color development by application of voltages, substantially the same effect as in Example A1 was obtained. Since the electrode was commonly used as the reflection layer, a display free from shadows and having good color purity was obtained. In Example A3, silver was used instead of aluminum, and the same effect was obtained.

EXAMPLE A4

The same construction as in Example A3 except that a reflection layer was attached to a lower side of the first liquid crystal cell, was formed. When the electrode was commonly used as the reflection layer, a dark display was effected because there was no reflection from the portion where the reflection layer was removed by patterning. In the construction of this example, however, reflection takes place at the reflection layer at a lower side of the substrate even though there is no reflection by patterning. Thus, a bright display of reflection type was obtained.

EXAMPLE A5

The electrode which functions as the reflection layer in Example 3, was prepared as follows. On a glass substrate used for a substrate, glass balls in a spherical form having a diameter of several $\mu$m were attached, thereby forming a convex/concave surface in the glass substrate. Aluminum was coated by vapor deposition.

Then, patterning was conducted to form a stripe-like electrode. Further, a $SiO_2$ and $TiO_2$ insulating layer was formed on the electrode, and an aligning control layer of polyimide was formed on the insulating layers. The substrate was overlaid by another substrate on which a transparent electrode of ITO of stripe-like pattern was formed, by interposing spacers. The peripheral portion was fixed with a sealing material, and liquid crystal was injected, whereby a first liquid crystal cell was prepared. With the construction, a display free from shadows and having good color purity was obtained in the same manner as described in the previous examples.

When the glass balls in a spherical form having a diameter of several $\mu$m were merely attached to the substrate, a degree of convex/concave is large. Accordingly, the degree of the convex/concave was reduced with a leveling material whereby gap control can be easy and a display having good color purity was possible.

EXAMPLE A6

The electrode which functions as the reflection layer as in Example A3 was prepared as follows.

On a glass substrate used as a substrate, a mirror-surface-like aluminum electrode was formed, followed by patterning whereby a stripe-like electrode was formed. Further, a $SiO_2$ and $TiO_2$ insulating layer was formed on the electrode, and an aligning layer of polyimide was formed on the insulating layers.

The substrate was overlaid by another substrate on which a transparent electrode of ITO of stripe-like form was formed by patterning, by interposing spacers. The peripheral portion was fixed with a sealing material. Liquid crystal was injected into a space between the substrates to prepare a first liquid crystal cell. Since the reflection layer functions as a mirror surface, only light entering therein at a specified angle can be utilized.

An excellent display is obtained in a case that the display element is observed from a specified direction. However, when the viewing angle is slightly changed, a display becomes inferior. For this, a diffusion plate, a prism array or a lenticular lens is disposed at the side of the observer so as to obtain a display having a wide viewing angle.

EXAMPLE A7

The refractive index anisotropy $\Delta n_1$ and the thickness $d_1$ of the liquid crystal layer of the first liquid crystal cell were adjusted so that $\Delta n_1 \cdot d_1$ of the liquid crystal layer was about 0.85 $\mu$m. Similarly, the refractive index anisotropy $\Delta n_2$ and the thickness $d_2$ of the liquid crystal layer of the second liquid crystal cell were adjusted so that $\Delta n_2 \, d_2$ of the liquid crystal layer was about 0.85 $\mu$m.

$\theta_1 = -240°$, $\theta_2 = 240°$, $\theta_3 = 110°$ and $\theta_4 = 45°$ were determined. A driving waveform which was the same as in multiplex driving of 1/200 duty and 8 gradations was used to effect a display. As a result, a white display was obtained in 0/7, a red display in 3/7, a blue display in 5/7 and a green display in 7/7 respectively.

However, the color purity was relatively light in comparison with that in Example A1, and a sufficiently bright color display could not be obtained. However, it was suitable for a display having a light color as the background color. For instance, a display of light pink color could be provided. Further, the liquid crystal cell of this example allows the formation of a display element by using a process for preparing a conventional monochrome STN liquid crystal display element.

Followings are examples of group B of present invention. Angles $\theta_1$ and $\theta_2$ are set at about 240°. A summary is shown in Table 1B. Basic constitutional elements and its process are same as Examples 1–10 mentioned as above.

The result by computer simulation about color development and reflectance characteristic of examples B8, B9 and B10 are shown in Table 2A–2B, 3A–3B and 4A–4B respectively.

Figure 8:
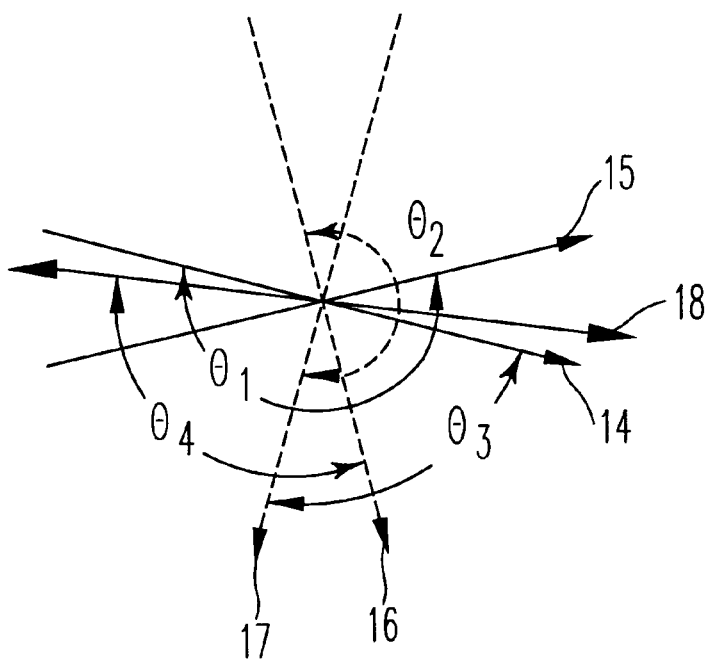
FIG. 8 is a plane view showing angular relations among the absorbing axis of the polarizing plate and the orientations of the first liquid crystal cell and the second liquid crystal cell in Examples in group B, C and D.

If the angles $\theta_3$ and $\theta_4$ have certain relation, it is possible to make a good development of chromaticity. The angle relations is shown in FIG. 8.

Figure 9:
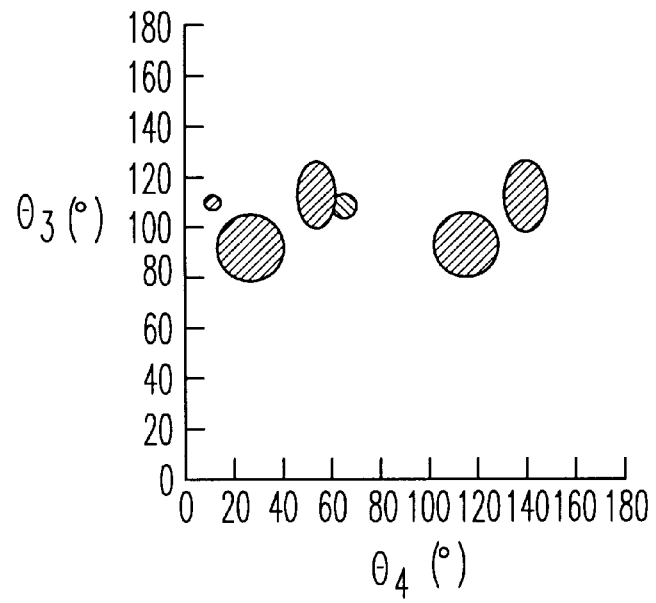
FIG. 9 is a diagram showing $\theta_3$ vs; $\theta_4$ relations for good color development.
Figure 10:
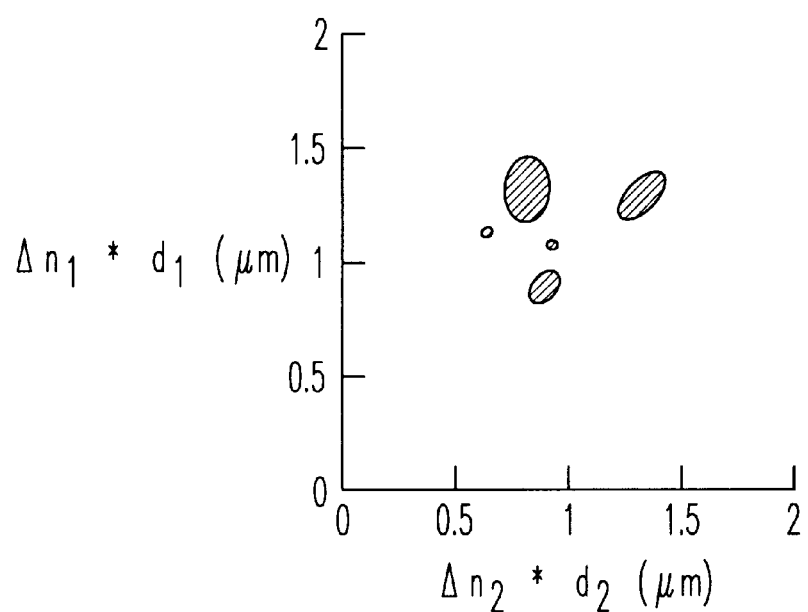
FIG. 10 is a diagram showing $\Delta n_1 \cdot d_1$ vs; $\Delta n_2 \cdot d_2$ relations for good color development.
Figure 11A:
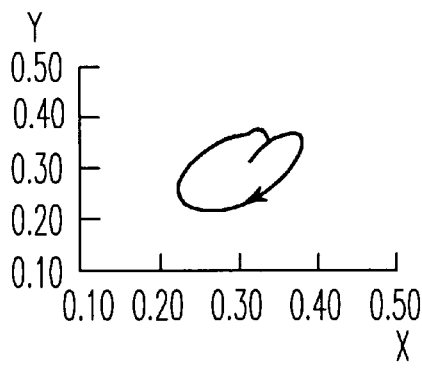
FIG. 11a is a chromaticity diagram showing a color change to voltages in Example B1.
Figure 11B:
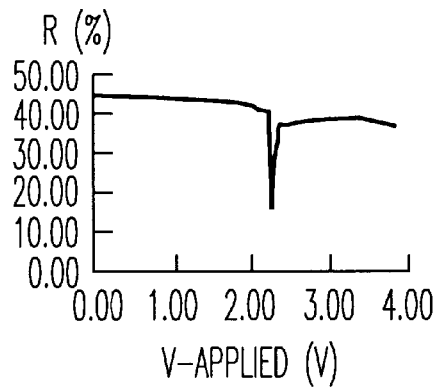
FIG. 11b is a diagram showing reflectance to voltages in Example B1.
Figure 12A:
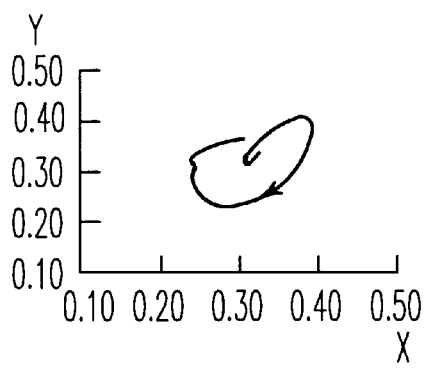
FIG. 12a is a chromaticity diagram showing a color change to voltages in Example B2.
Figure 12B:
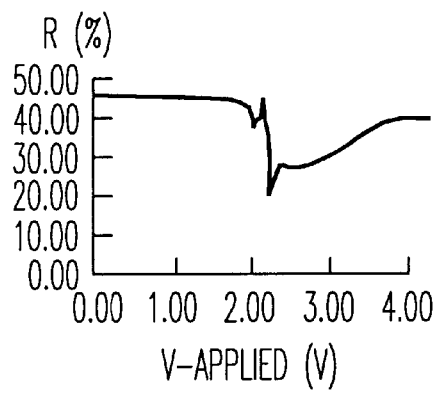
FIG. 12b is a diagram showing reflectance to voltages in Example B2.
Figure 13A:
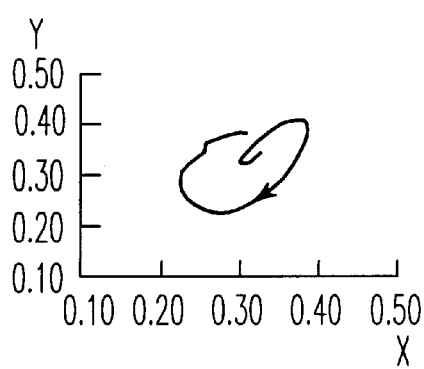
FIG. 13a is a chromaticity diagram showing a color change to voltages in Example B3.
Figure 13B:
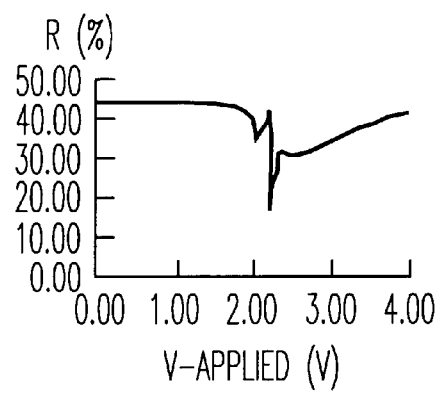
FIG. 13b is a diagram showing reflectance to voltages in Example B3.

Hatching area in FIGS. 9 and 10 shows the region of a good color development.

In FIG. 9, there are 6 hatched regions. Those are a circle having a diameter matched to a length of 5 to 10° and the center coordinate of about (10°, 110°) at the origin in a rectangular coordinate axis with horizontal axis ($\theta_4$) and vertical axis ($\theta_3$), second circle having a diameter matched to a length of 15 to 20° and the center coordinate of about (25°, 95°), third circle having a diameter matched to a length of 15 to 20° and the center coordinate of about (115°, 95°), fourth circle having a diameter matched to a length of about 10° and the center coordinate of about (110°, 60°), a lengthwise first elliptic figure having a major axis matched to a length of 30° and minor axis matched to a length of 25 to 30° and the center coordinate of about (50°, 115°), a lengthwise second elliptic figure having a major axis matched to a length of 30° and minor axis matched to a length of 25 to 30° and the center coordinate of about (140°, 115°).

And a color development of bright and good chromaticity is obtainable in a condition such that there is certain relation between $\Delta n_1 \cdot d_1$ of liquid crystal cell and $\Delta n_2 \cdot d_2$ of twist birefringent layer.

That relation is shown in FIG. 10. The hatched area is the region of good color development.

In FIG. 10, there are 5 hatched regions. Those are a circle having a diameter matched to a length of 0.05 µm and the center coordinate of about (0.6 µm, 1.1 µm) at the origin in a rectangular coordinate axis with horizontal axis ($\Delta n_2 \cdot d_2$) and vertical axis ($\Delta n_1 \cdot d_1$), second circle having a diameter matched to a length of 0.05 µm and the center coordinate of about (0.9 µm, 1.05 µm), a lengthwise first elliptic figure having a major axis matched to a length of 0.3 µm and minor axis matched to a length of 0.2 µm and the center coordinate of about (0.75 µm, 1.35 µm), a second elliptic figure having a major axis in top-right to bottom-left direction matched to a length of 0.15 um and minor axis matched to a length of 0.1 µm and the center coordinate of about (0.85 to 0.9 µm, 0.85 to 0.9 µm), a third elliptic figure having a major axis in top-right to bottom-left direction matched to a length of 0.2 to 0.25 µm and minor axis matched to a length of 0.1 µm and the center coordinate of about (1.3 µm, 1.25 µm).

The Examples B1–B7 in Table 1B are the present inventions.

Followings are examples of group C of present invention. $\theta_1$ and $\theta_2$ are set at about 180°. A summary is shown in Table 1B. Basic constitutional elements and its process are same as previous examples.

And a color development of bright and good chromaticity is obtainable in a condition such that there is certain relation between $\theta_3$ and $\theta_4$.

Figure 20:
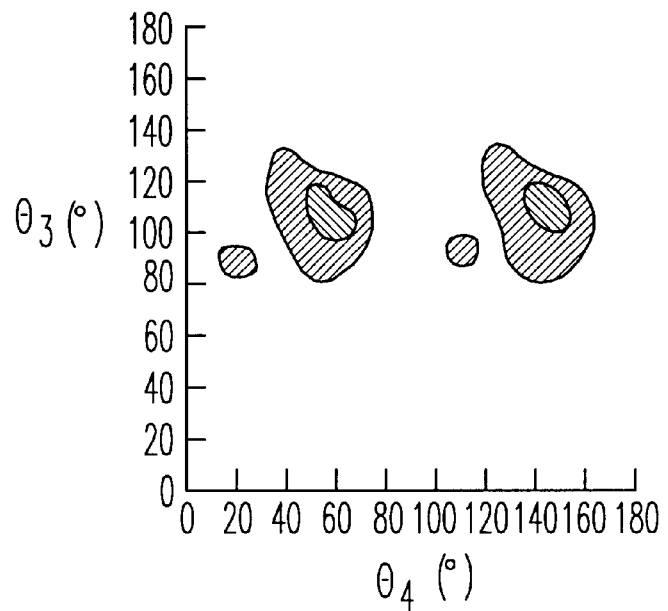
FIG. 20 is a diagram showing $\theta_3$ vs; $\theta_4$ relations for good color development.
Figure 21:
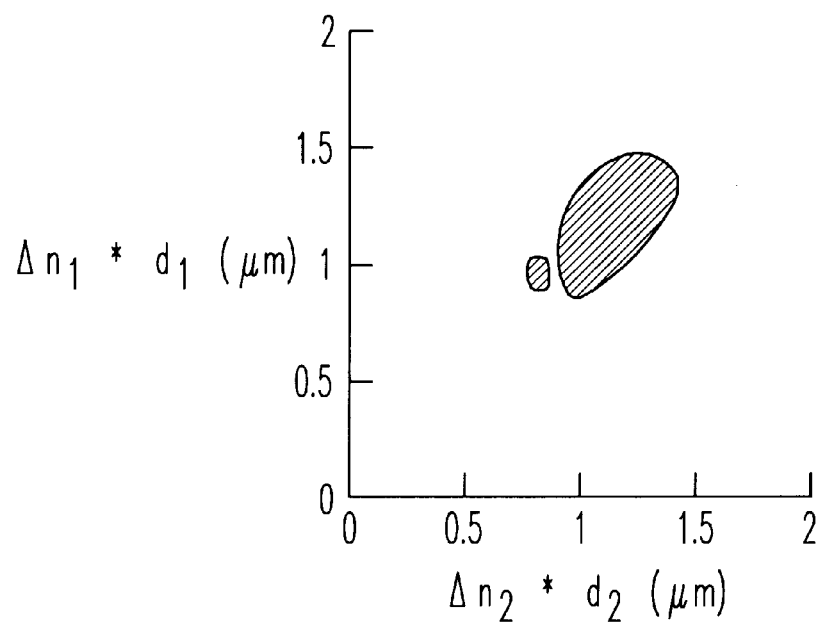
FIG. 21 is a diagram showing $\Delta n_1 \cdot d_1$ vs; $\Delta n_2 \cdot d_2$ relations for good color development.
Figure 22A:
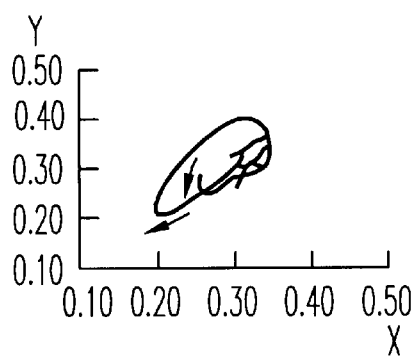
FIG. 22a is a chromaticity diagram showing a color change to voltages in Example C1.
Figure 22B:
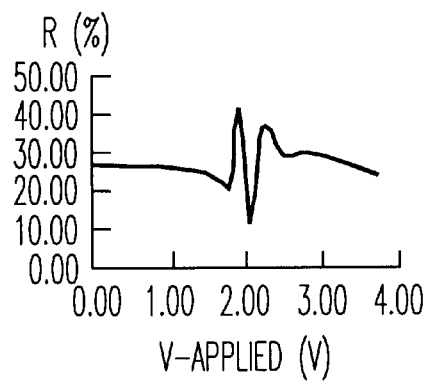
FIG. 22b is a diagram showing reflectance to voltages in Example C1.
Figure 23A:
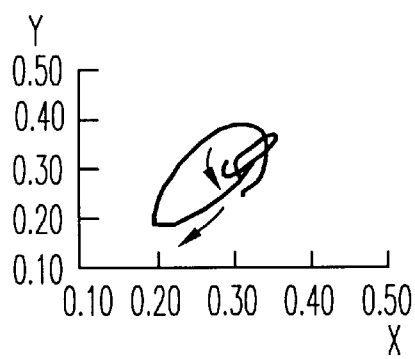
FIG. 23a is a chromaticity diagram showing a color change to voltages in Example C2.
Figure 23B:
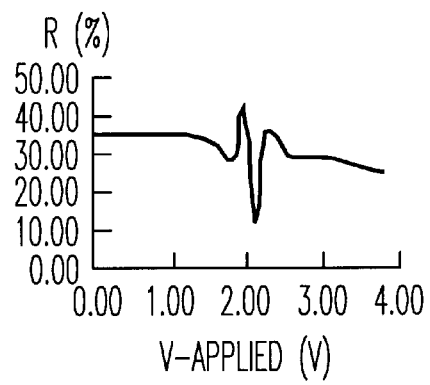
FIG. 23b is a diagram showing reflectance to voltages in Example C2.
Figure 24A:
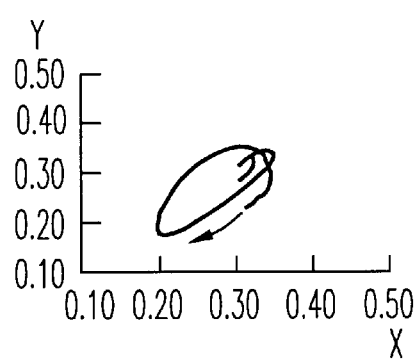
FIG. 24a is a chromaticity diagram showing a color change to voltages in Example C3.
Figure 24B:
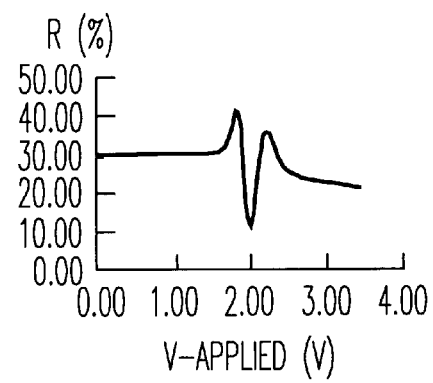
FIG. 24b is a diagram showing reflectance to voltages in Example C3.
Figure 25A:
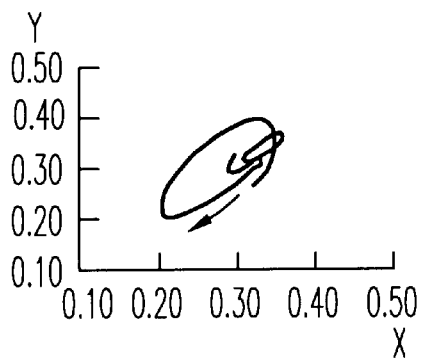
FIG. 25a is a chromaticity diagram showing a color change to voltages in Example C4.
Figure 25B:
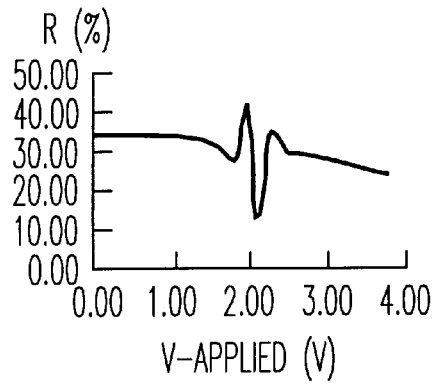
FIG. 25b is a diagram showing reflectance to voltages in Example C4.
Figure 26A:
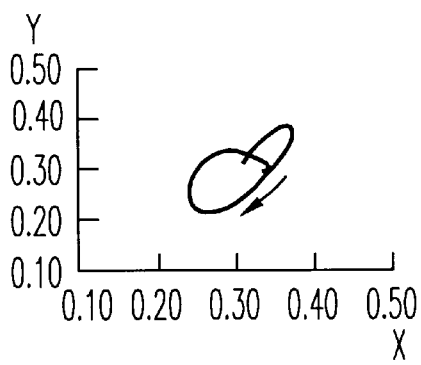
FIG. 26a is a chromaticity diagram showing a color change to voltages in Example C5.
Figure 26B:
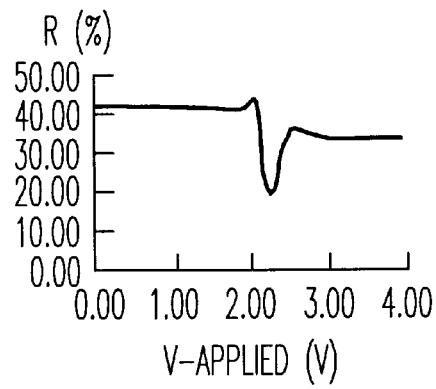
FIG. 26b is a diagram showing reflectance to voltages in Example C5.
Figure 27A:
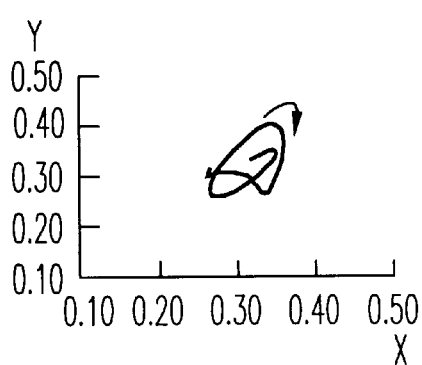
FIG. 27a is a chromaticity diagram showing a color change to voltages in Example C6.
Figure 27B:
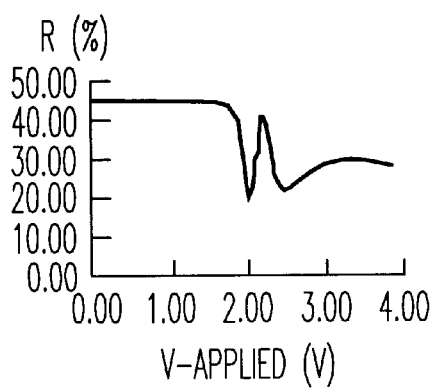
FIG. 27b is a diagram showing reflectance to voltages in Example C6.

That relation is shown in FIGS. 20 and 21. The latticed area is the better region of good color development.

4 hatched regions are shown in FIG. 20.

There are a first circular figures having a diameter of 10° and the center coordinate of about (20°, 90°), and a second circular figures having a diameter of 10° and the center coordinate of about (110°, 90°) in a coordination system of horizontal axis ($\theta_4$) and vertical axis ($\theta_3$), a irregular rectangle having a length located at about 80 to 125° in Y-axis and a width located at about 35 to 70° in X-axis, and a irregular rectangle having a length located at about 80 to 125° in Y-axis and a width located at about 125 to 160° in X-axis.

The regions which shows particularly good color development are located to be surrounded by a rectangle having a length located at about 95 to 110° in Y-axis and a width located at about 45 to 65° in X-axis, and a rectangle having a length located at about 95 to 110° in Y-axis and a width located at about 135 to 155° in X-axis.

And a color development of bright and good chromaticity is obtainable in a condition such that there is certain relation between $\Delta n_1 \cdot d_1$ of liquid crystal cell and $\Delta n_2 \cdot d_2$ of twist birefringent layer.

That relation is shown in FIG. 21. The hatched area is the region of good color development.

In FIG. 21 there are 2 hatched regions. Those are a substantial circle having a diameter of 0.1 µm and the center coordinate of about (0.85 µm, 1.0 µm) at the origin in a rectangular coordination system with horizontal axis ($\Delta n_2 \cdot d_2$) and vertical axis ($\Delta n_1 \cdot d_1$), an nearly elliptic figure located in right-top to left-down surrounded by a rectangle of a length of 0.9 to 1.45 µm in Y-axis and a width of 0.9 to 1.35 µm in X-axis.

The Examples C1–C6 in Table 1C are the present inventions.

Followings are examples of group d of present invention. $\theta_1$ and $\theta_2$ are set at about 240°. A summary is shown in Table 1D. Basic constitutional elements and its process are same as previous examples.

The angle relation among the constitutions in the invention of this group is shown in FIG. 8 which is substantially as same as group B.

In a condition such that the angle $\theta_1$ is 240° twist and $\Delta n_2 \cdot d_2$ is 0.845 µm, if the angle $\theta_2$ and $\Delta n_1 \cdot d_1$ of liquid crystal layer have certain relation, it is possible to make a bright and color development of good chromaticity. The relation is shown in FIGS. 28–31. Hatching is the region of good color development.

Figure 28:
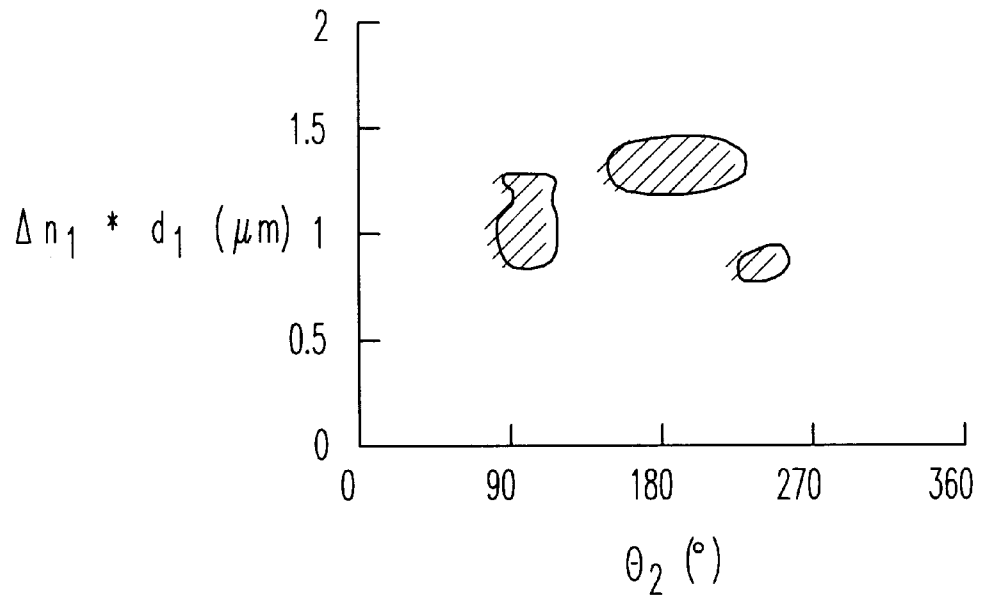
FIG. 28 is a diagram showing $\Delta n_1 \cdot d_1$ vs; $\theta_2$ relations for good color development.

In FIG. 28, there are 3 hatched regions. Those are a bottle ground-like figure surrounded by a lengthwise rectangular region having a major side matched to a length of 0.45 µm and minor side matched to a length of 40° at the center coordinate of about (100°, 1.1 µm) at the origin in a rectangular coordinate axis with horizontal axis ($\theta_2$) and vertical axis ($\Delta n_1 \cdot d_1$), a first elliptic figure surrounded by a rectangle having a major side matched to a length of 80° and minor axis matched to a length of 0.3 µm and the center coordinate of about (190°, 1.35 µm), a second elliptic figure surrounded by a long-sideways rectangle having a major side matched to a length of 30° and minor axis matched to a length of 0.2 µm and the center coordinate of about (240°, 0.9 µm).

And a color development of bright and good chromaticity is obtainable in a condition such that there is certain relation between $\theta_3$ and $\theta_4$ with $\theta_1$ is 240° twist and $\Delta n_2 \cdot d_2$ is 0.845 µm.

Figure 29:
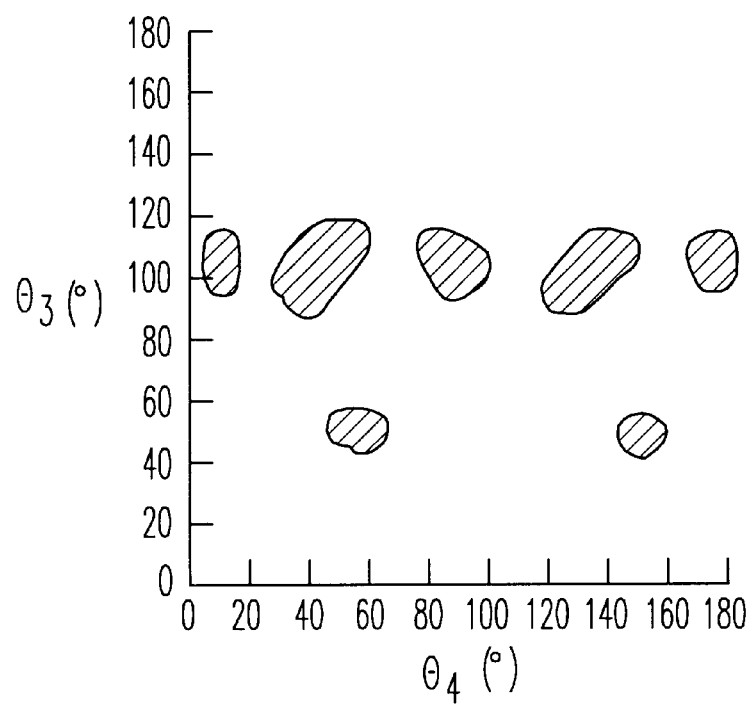
FIG. 29 is a diagram showing $\theta_3$ vs; $\theta_4$ relations for good color development.

That relation is shown in FIG. 29. The hatched area is the region of good color development.

7 hatched regions are shown in FIG. 29. There is a first elliptic figure surrounded by a lengthwise rectangle having a major side matched to a length of 20° and minor axis matched to a length of 10° and the center coordinate of about (10°, 105°) with horizontal axis ($\theta_4$) and vertical axis ($\theta_3$), a trapezoid-like figure located in a top-right to left-down direction surrounded by a rectangle having a length of about 30° and a width of 30° and the center coordinate of about (40°, 105°), a varied elliptic figure located in a top-left to right-down direction surrounded by a rectangle having a length of about 20 to 25° and a width of about 25 to 30° and the center coordinate of about (85°, 105°), a long figure in a top-right to left-down direction surrounded by a rectangle having a length of about 30° and a width of 30° and the center coordinate of about (130°, 105°), a lengthwise elliptic figure surrounded by a rectangle having a major side matched to a length of 20° and minor axis matched to a length of 15° and the center coordinate of about (170°, 105 to 110°), a long-sideways and substantial elliptic figure surrounded by a rectangle having a length of about 15° and a width of 20° and the center coordinate of about (55°, 50°), a first substantial circular figure surrounded by a rectangle having a length of 15° and a width of 15° and the center coordinate of about (150°, 50°).

And a color development of bright and good chromaticity is obtainable in a condition such that there is certain relation between $\theta_2$ of twist birefringent layer and $\Delta n_1 \cdot d_1$ of liquid crystal layer when $\theta_1$ is 240° twist and $\Delta n_2 \cdot d_2$ is 1.04 μm.

Figure 30:
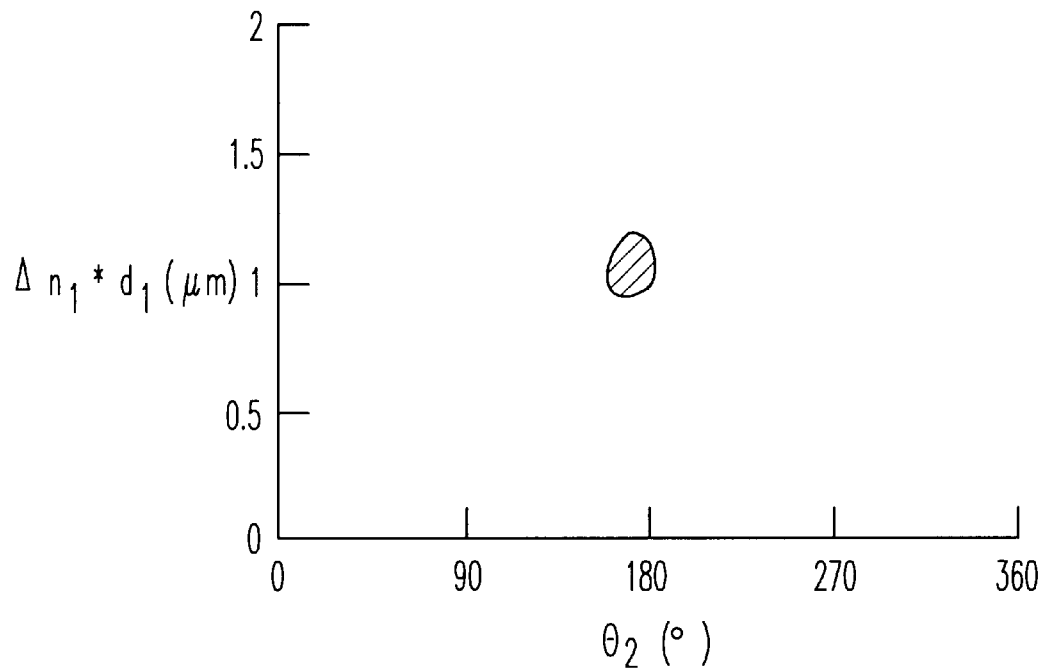
FIG. 30 is a diagram showing $\Delta n_1 \cdot d_1$ vs; $\theta_2$ relations for good color development.

That relation is shown in FIG. 30. The hatched area is the region of good color development.

There are 1 hatched region in FIG. 30. There is a lengthwise elliptic figure surrounded by a rectangle having a length of 0.25 um and width of 25° and the center coordinate of about (170 to 175°, 1.05 μm) in a coordination system of horizontal axis ($\theta_2$) and vertical axis ($\Delta n_1 \cdot d_1$).

And a color development of bright and good chromaticity is obtainable in a condition such that there is certain relation between $\theta_3$ and $\theta_4$ with $\theta_1$ is 240° twist and $\Delta n_2 \cdot d_2$ is 1.04 μm.

Figure 31:
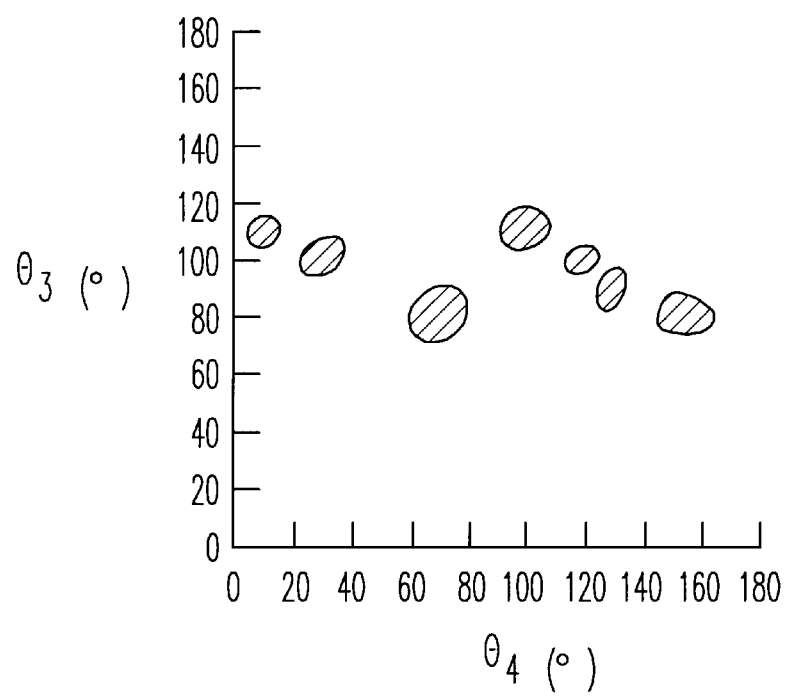
FIG. 31 is a diagram showing $\theta_3$ vs; $\theta_4$ relations for good color development.
Figure 32A:
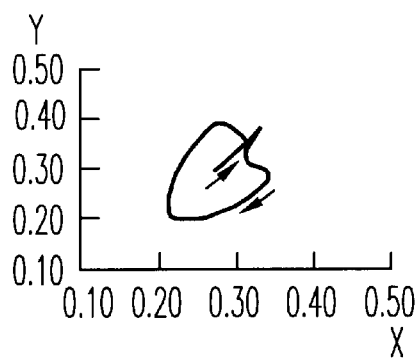
FIG. 32a is a chromaticity diagram showing a color change to voltages in Example D1.
Figure 32B:
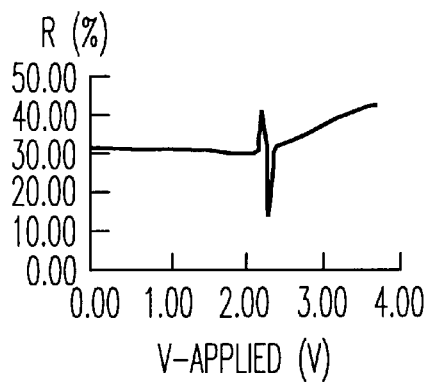
FIG. 32b is a diagram showing reflectance to voltages in Example D1.
Figure 33A:
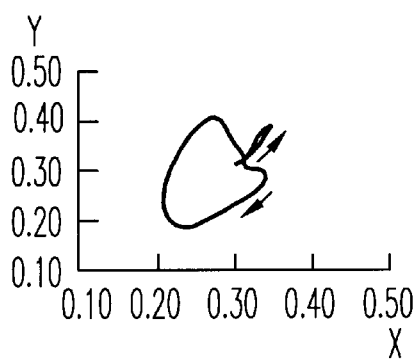
FIG. 33a is a chromaticity diagram showing a color change to voltages in Example D2.
Figure 33B:
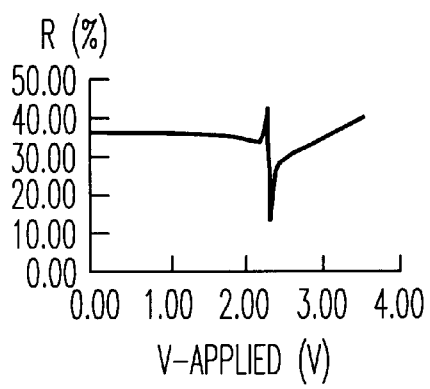
FIG. 33b is a diagram showing reflectance to voltages in Example D2.
Figure 34A:
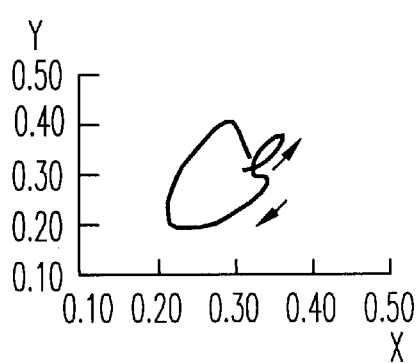
FIG. 34a is a chromaticity diagram showing a color change to voltages in Example D3.
Figure 34B:
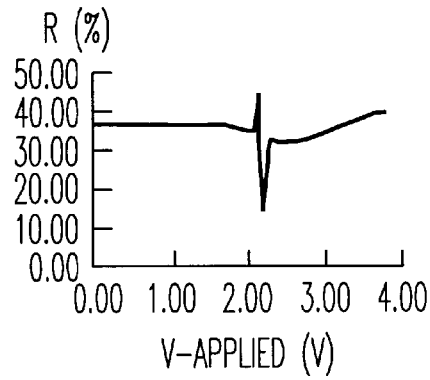
FIG. 34b is a diagram showing reflectance to voltages in Example D3.
Figure 35A:
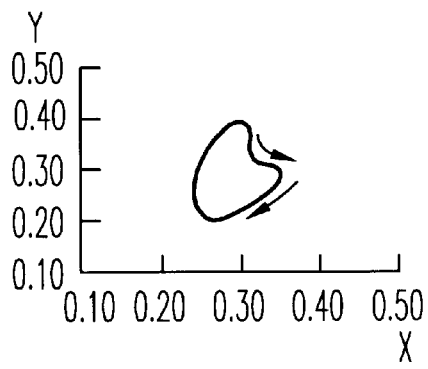
FIG. 35a is a chromaticity diagram showing a color change to voltages in Example D4.
Figure 35B:
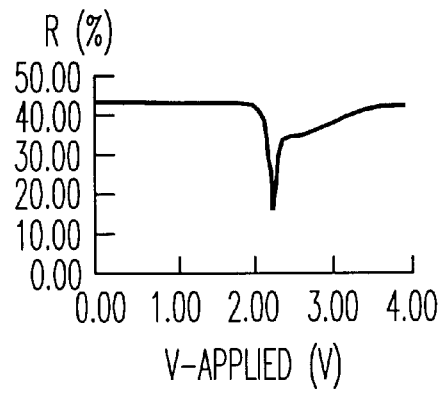
FIG. 35b is a diagram showing reflectance to voltages in Example D4.
Figure 36A:
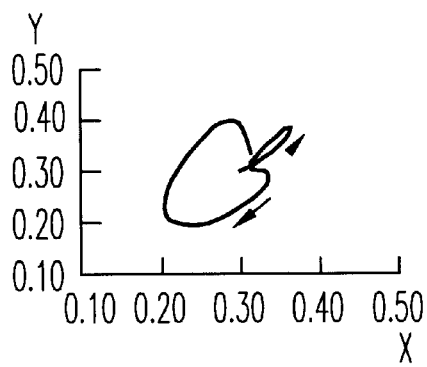
FIG. 36a is a chromaticity diagram showing a color change to voltages in Example D5.
Figure 36B:
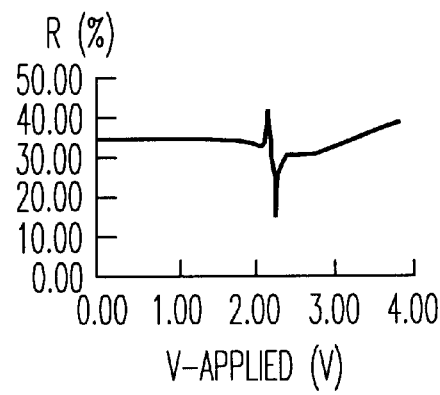
FIG. 36b is a diagram showing reflectance to voltages in Example D5.
Figure 37A:
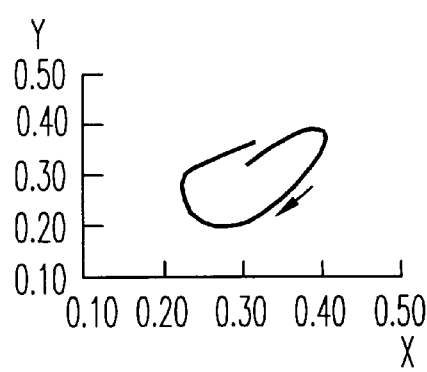
FIG. 37a is a chromaticity diagram showing a color change to voltages in Example D6.
Figure 37B:
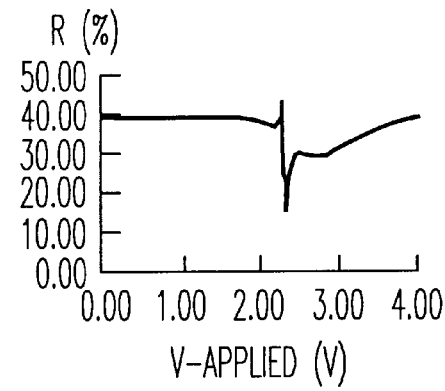
FIG. 37b is a diagram showing reflectance to voltages in Example D6.
Figure 38A:
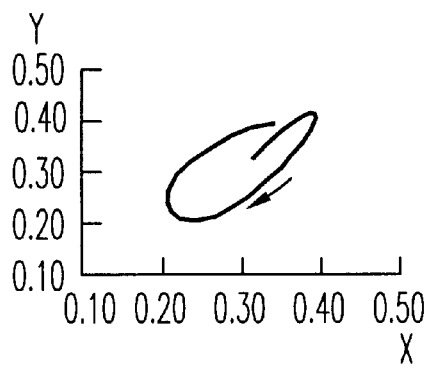
FIG. 38a is a chromaticity diagram showing a color change to voltages in Example D7.
Figure 38B:
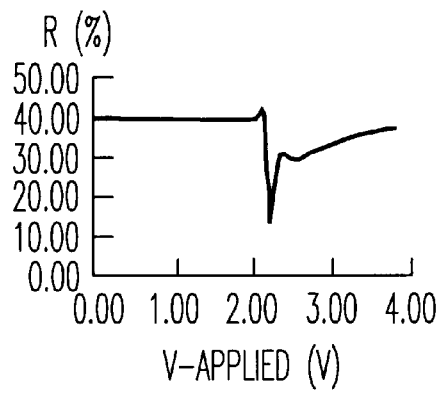
FIG. 38b is a diagram showing reflectance to voltages in Example D7.
Figure 39A:
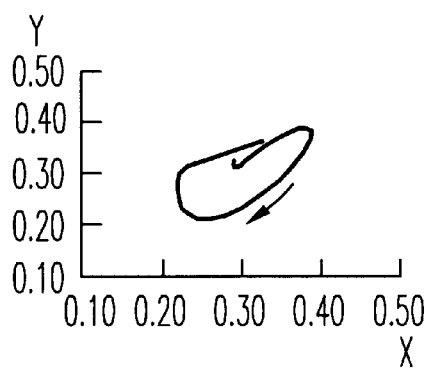
FIG. 39a is a chromaticity diagram showing a color change to voltages in Example D8.
Figure 39B:
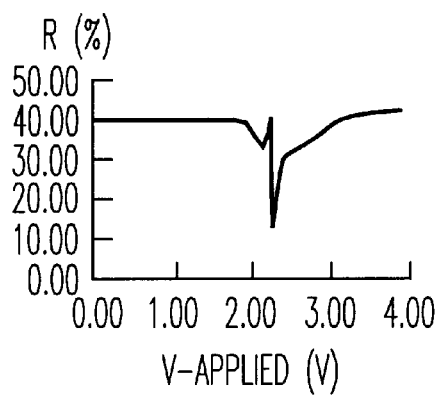
FIG. 39b is a diagram showing reflectance to voltages in Example D8.
Figure 40A:
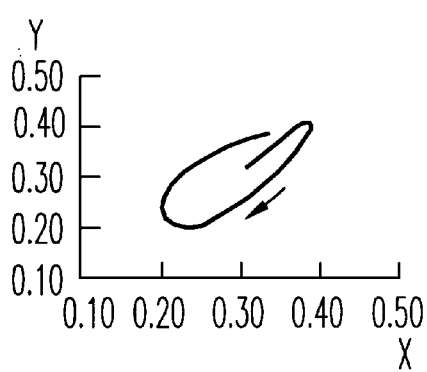
FIG. 40a is a chromaticity diagram showing a color change to voltages in Example D9.
Figure 40B:
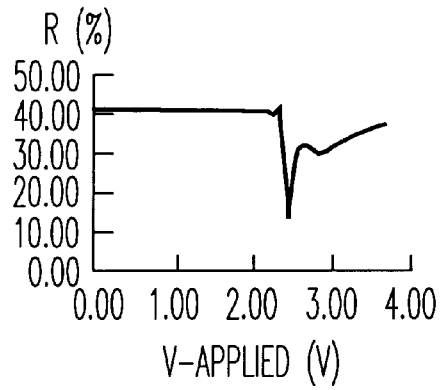
FIG. 40b is a diagram showing reflectance to voltages in Example D9.
Figure 41A:
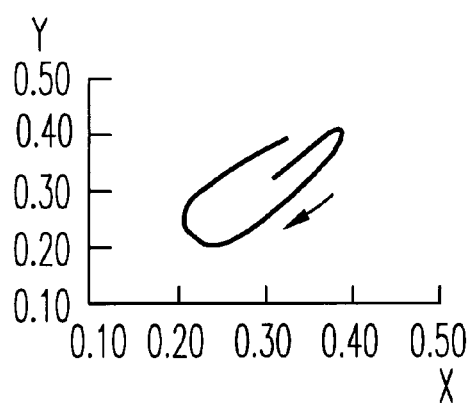
FIG. 41a is a chromaticity diagram showing a color change to voltages in Example D10.
Figure 41B:
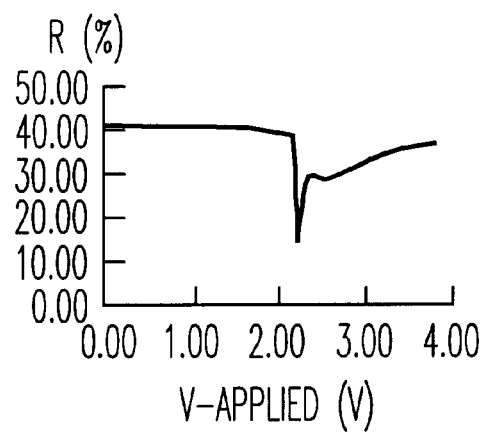
FIG. 41b is a diagram showing reflectance to voltages in Example D10.

That relation is shown in FIG. 31. The hatched area is the region of good color development.

8 hatched regions are shown in FIG. 31.

There is a first circular figure surrounded by a rectangle having a length of 10° and a width of 10° and the center coordinate of about (10°, 110°) in a coordination system of horizontal axis ($\theta_4$) and vertical axis ($\theta_3$), a first elliptic figure located in a top-right to left-down direction surrounded by a rectangle having a length of about 15° and a width of 15° and the center coordinate of about (30°, 100 to 105°), a circular or elliptic figure located in a top-right to left-down direction surrounded by a rectangle having a length of about 20° and a width of about 20° and the center coordinate of about (40°, 90°), a circular or elliptic figure in a top-right to left-down direction surrounded by a rectangular having a length of about 20° and a width of 20° and the center coordinate of about (70°, 80°), a substantial circle surrounded by a rectangle having a length of about 15° and a width of 15 to 20° and the center coordinate of about (100°, 110°), a substantial circle surrounded by a rectangle having a length of about 10° and a width of 10° and the center coordinate of about (120°, 100°), a lengthwise elliptic figure surrounded by a rectangle having a length of about 15° and a width of 10° and the center coordinate of about (125 to 130°, 90°), and a long-sideways and varied elliptic figure located surrounded by a rectangle having a length of about 15° and a width of 20° and the center coordinate of about (150°, 80°).

The angle $\theta_2$ of twist birefringent layer is preferred to be less than the angle $\theta_1$ of liquid crystal layer. The angle $\theta_2$ has different optimum value in conditions. For example in case of $\theta_1=240°$ twist and $\Delta n_2 \cdot d_2$ is 0.845 μm, the angle $\theta_2$ of twist birefringent is preferably 80 to 120°. And in case of $\theta_1=240°$ twist and $\Delta n_2 \cdot d_2$ is 1.04 μm, the angle $\theta_2$ of twist birefringent is preferably 160 to 190°.

Examples D1–D10 are shown in Table 1D.

Followings are examples of group E of present invention. This group E and F employ a birefringent plate without twist angle, that is normal type birefringent plate. So there is no $\theta_2$, in other words $\theta_2$ is supposed to be 0° in this group.

In group E $\theta_1$ is set at about 240°. A summary is shown in Table 1E.

Basic constitutional elements and its process are same as previous examples, except $\theta_5$, $\theta_6$ and a birefringent plate.

Figure 42:
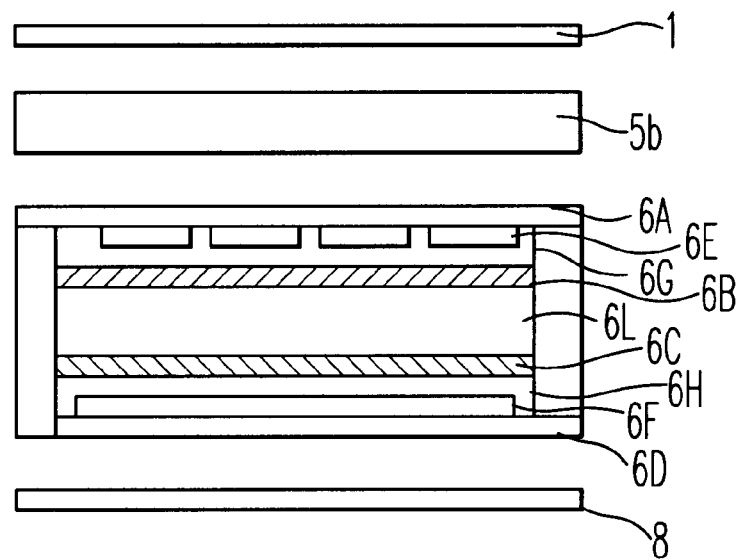
FIG. 42 is a cross sectional view in a form of model on Example X.
Figure 43:
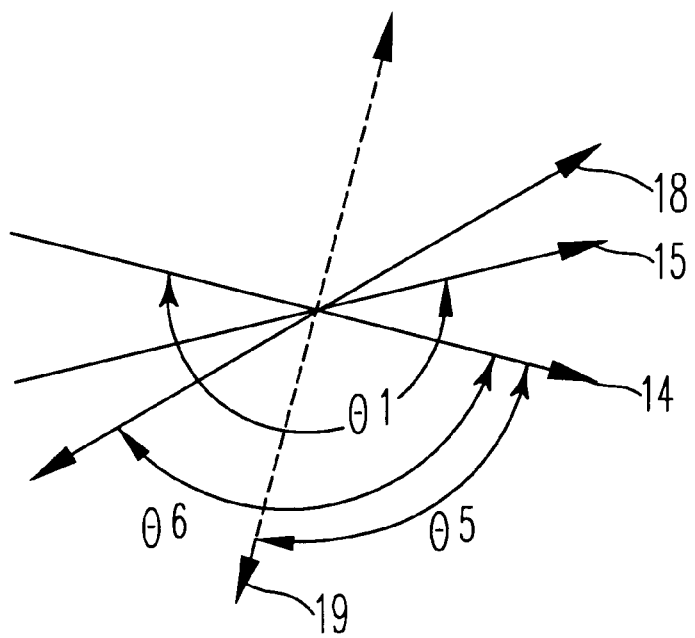
FIG. 43 is a plane view showing angular relations among the absorbing axis of the polarizing plate and the orientations of the first liquid crystal cell and the birefringent plate in Examples in group E and F.

The angle relation among the constitutions in the invention of this group is shown in FIG. 43 and cross-section view is shown in FIG. 42. A birefringent plate 5b is employed in replace of twist type.

Figure 44:
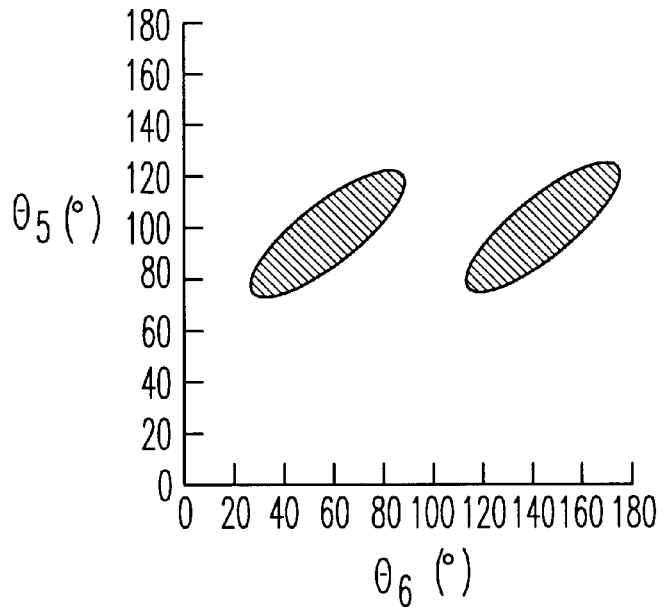
FIG. 44 is a diagram showing $\theta_5$ vs; $\theta_6$ relations for good color development.
Figure 45:
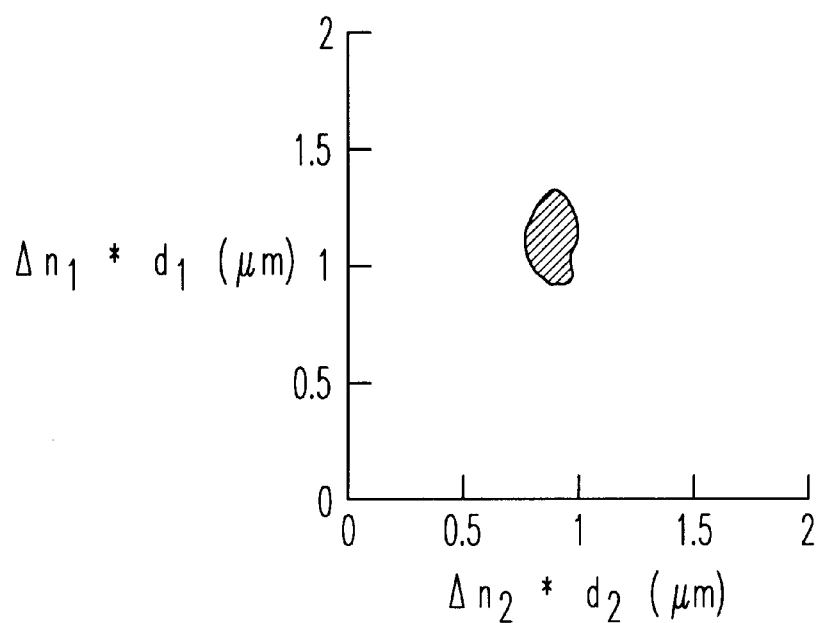
FIG. 45 is a diagram showing $\Delta n \cdot d_1$ vs; $\Delta n_2 \cdot d_2$ relations for good color development.
Figure 46A:
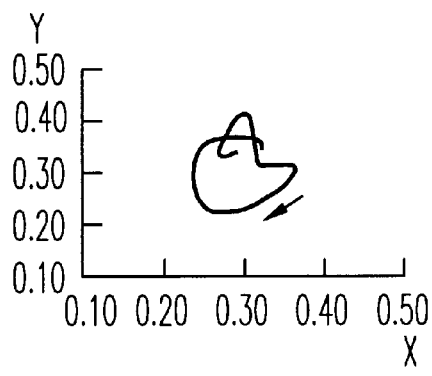
FIG. 46a is a chromaticity diagram showing a color change to voltages in Example E1.
Figure 46B:
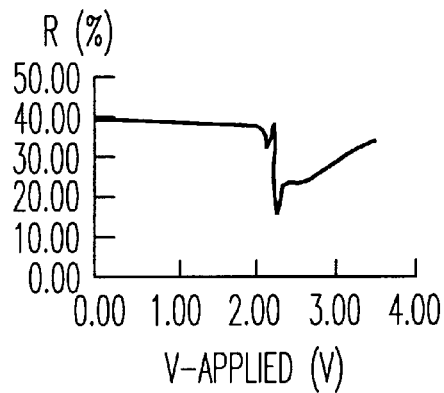
FIG. 46b is a diagram showing reflectance to voltages in Example E1.
Figure 47A:
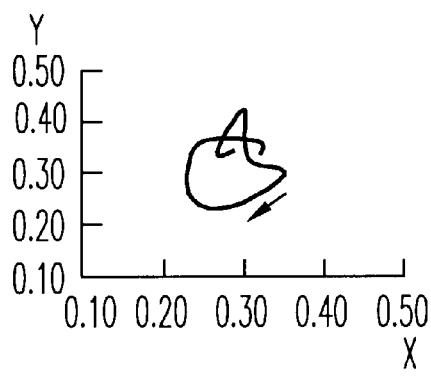
FIG. 47a is a chromaticity diagram showing a color change to voltages in Example E2.
Figure 47B:
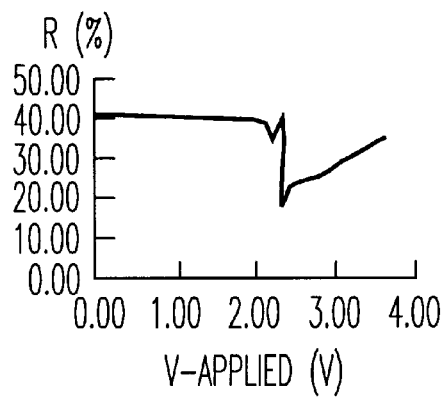
FIG. 47b is a diagram showing reflectance to voltages in Example E2.
Figure 48A:
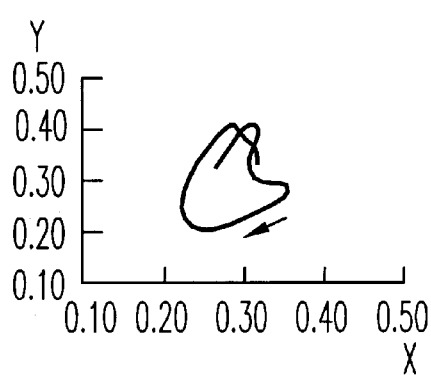
FIG. 48a is a chromaticity diagram showing a color change to voltages in Example E3.
Figure 48B:
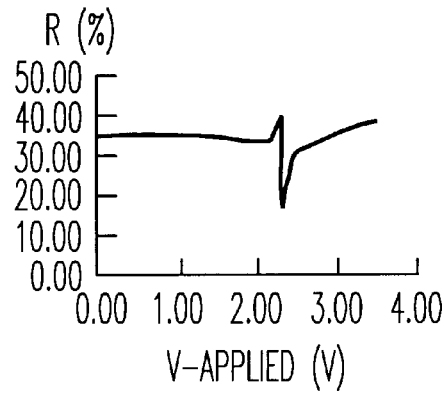
FIG. 48b is a diagram showing reflectance to voltages in Example E3.
Figure 49A:
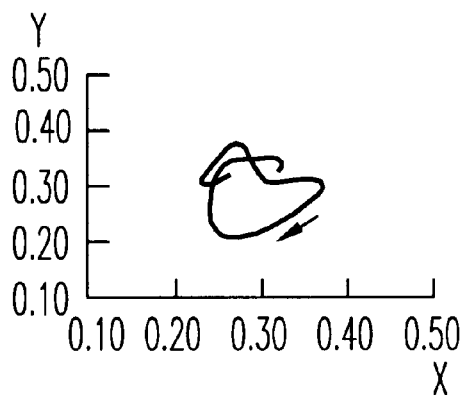
FIG. 49a is a chromaticity diagram showing a color change to voltages in Example E4.
Figure 49B:
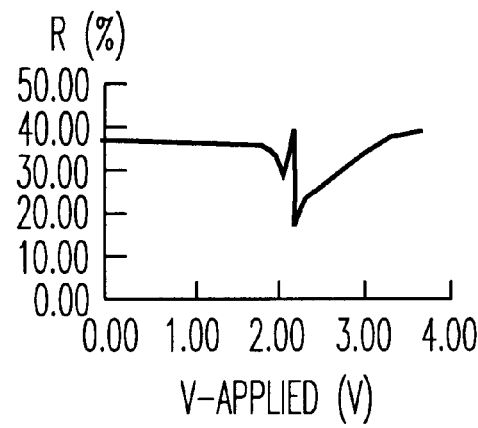
FIG. 49b is a diagram showing reflectance to voltages in Example E4.
Figure 50A:
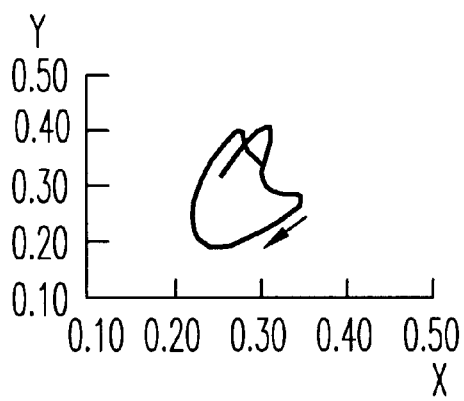
FIG. 50a is a chromaticity diagram showing a color change to voltages in Example E5.
Figure 50B:
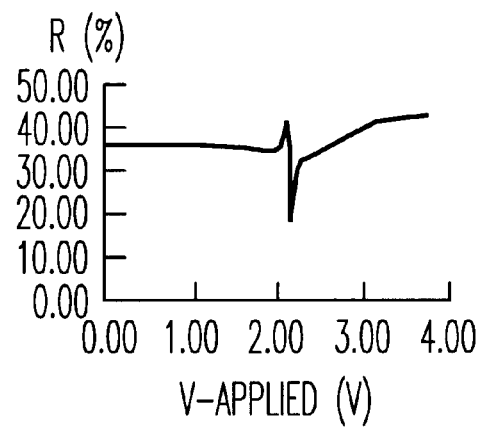
FIG. 50b is a diagram showing reflectance to voltages in Example E5.

A color development of bright and good chromaticity is obtainable in a condition such that there is certain relation between $\theta_5$ and $\theta_6$. That relation is shown in FIGS. 44 and 45. The hatched area is the region of good color development.

2 hatched regions are shown in FIG. 44. There is a first ellipse inclined in top-right to bottom-left direction having a major axis matched to the length of 60° and minor axis matched to the length of 20° and the center coordinate of about (50°, 95 to 100°) in a coordination system of horizontal axis ($\theta_5$) and vertical axis ($\theta_6$), a second ellipse inclined in top-right to bottom-left direction having a major axis matched to the length of 60° and minor axis matched to the length of 20° and the center coordinate of about (140 to 145°, 95 to 100°).

And a color development of bright and good chromaticity is obtainable in a condition such that there is certain relation between $\Delta n_1 \cdot d_1$ of liquid crystal cell and $\Delta n_2 \cdot d_2$ of twist birefringent layer.

That relation is shown in FIG. 45. The hatched area is the region of good color development.

In FIG. 45, there are 1 hatched region. There is an ellipse or an nearly elliptic figure inscribed in a lengthwise rectangle having a major side of about 0.35 to 0.4 μm and a minor side of about 0.2 μm and the center coordinate of about (0.9, 1.1), at the origin in a rectangular coordination system with horizontal axis ($\Delta n_2 \cdot d_2$) and vertical axis ($\Delta n_1 \cdot d_1$).

Examples E1–E5 and prior art are shown in Table 1E.

The angles $\theta_1$, $\theta_5$ and $\theta_6$ are possibly to use by setting at being clockwise or counterclockwise.

In replace of one axial birefringent plate, biaxial birefringent plate may be used. $N_z$ is preferably selected to be 0.5. In this case the view angle is widened because a significant color change is less.

In perpendicular direction a same color development was obtained in using one axial or biaxial type birefringent plate.

Followings are description about examples of group F of present invention.

A color development of bright and good chromaticity is obtainable in a condition such that there is certain relation between $\theta_5$ and $\theta_6$.

Figure 51:
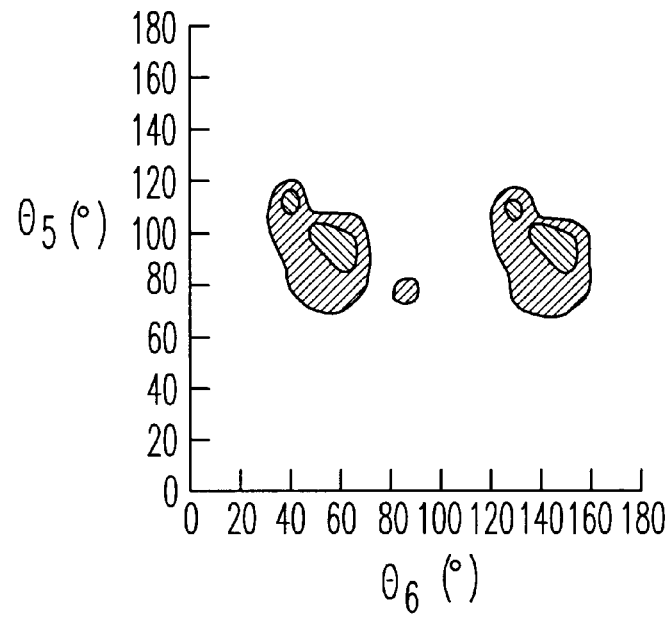
FIG. 51 is a diagram showing $\theta_5$ vs; $\theta_6$ relations for good color development.

That relation is shown in FIG. 51. The hatched area is the region of good color development.

3 hatched regions which are 2 large hatched areas and 1 small hatched area are shown in FIG. 51.

There is a region surrounded by a rectangle having a major side located in the range from 70° to 120° and minor side located in the range of from 30° to 70° in X-axis, a region surrounded by a rectangle having a major side located in the range from 70° to 120° in Y-axis and minor side located in the range of from 120° to 160° in a coordination system of horizontal axis ($\theta_5$) and vertical axis ($\theta_6$), a substantial circle having a diameter matched to the length of 5 to 10° and the center coordinate of about (80°, 80°).

And there are regions which shows a particularly good color development where first substantial circles having a diameter matched to the length of 5° and the center coordinate of about (40°, 110°), second substantial circles having a diameter matched to the length of 5° and the center coordinate of about (130°, 110°), a region surrounded by a rectangle located in the range from 85° to 105° in Y-axis and in the range of from 45° to 65° in X-axis, a region surrounded by a rectangle located in the range from 85° to 105° in Y-axis and in the range of from 135° to 155° in X-axis.

And a color development of bright and good chromaticity is obtainable in a condition such that there is certain relation between $\Delta n_1 \cdot d_1$ of liquid crystal cell and $\Delta n_2 \cdot d_2$ of twist birefringent layer.

Figure 52:
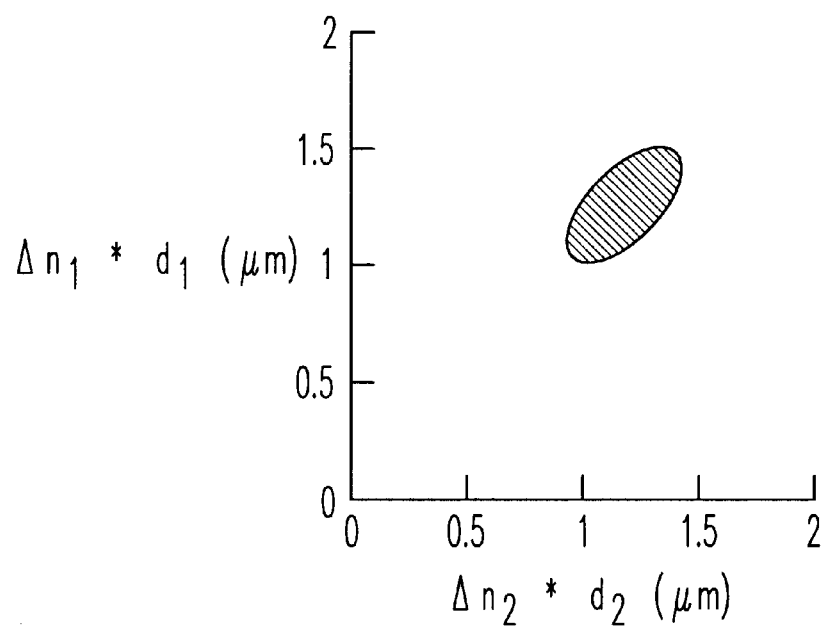
FIG. 52 is a diagram showing $\Delta n_1 \cdot d_1$ vs; $\Delta n_2 \cdot d_2$ relations for good color development.
Figure 53A:
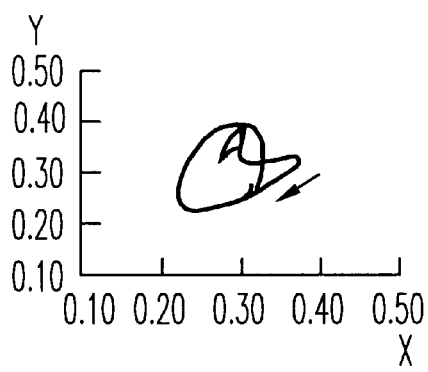
FIG. 53a is a chromaticity diagram showing a color change to voltages in Example F1.
Figure 53B:
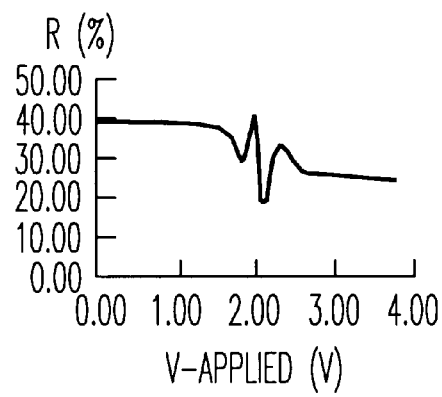
FIG. 53b is a diagram showing reflectance to voltages in Example F1.
Figure 54A:
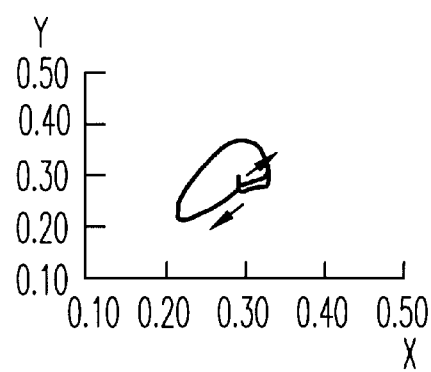
FIG. 54a is a chromaticity diagram showing a color change to voltages in Example F2.
Figure 54B:
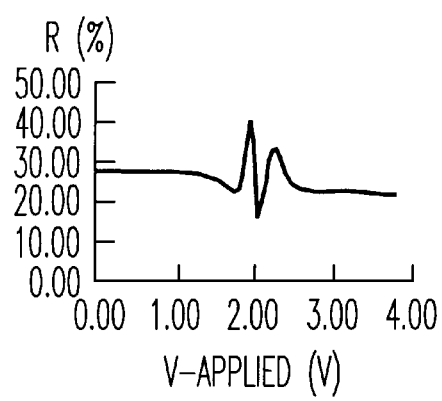
FIG. 54b is a diagram showing reflectance to voltages in Example F2.
Figure 55A:
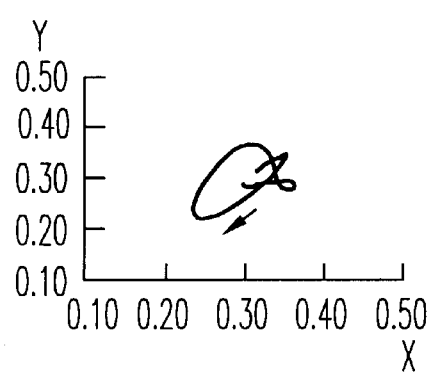
FIG. 55a is a chromaticity diagram showing a color change to voltages in Example F3.
Figure 55B:
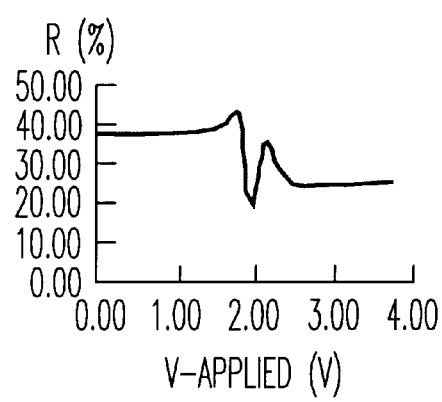
FIG. 55b is a diagram showing reflectance to voltages in Example F3.
Figure 56A:
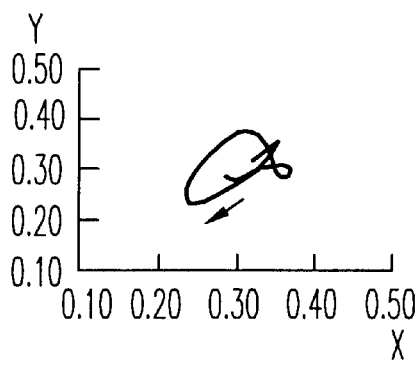
FIG. 56a is a chromaticity diagram showing a color change to voltages in Example F4.
Figure 56B:
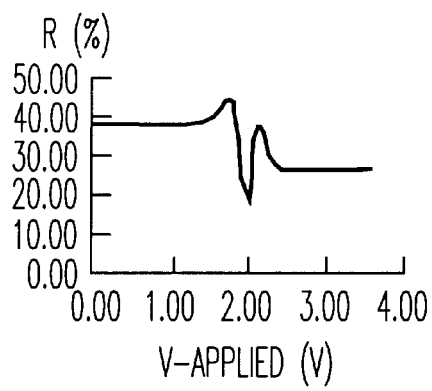
FIG. 56b is a diagram showing reflectance to voltages in Example F4.
Figure 57A:
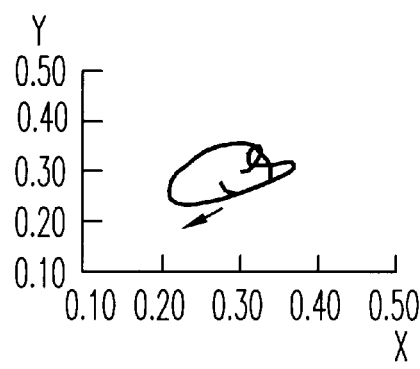
FIG. 57a is a chromaticity diagram showing a color change to voltages in Example F5.
Figure 57B:
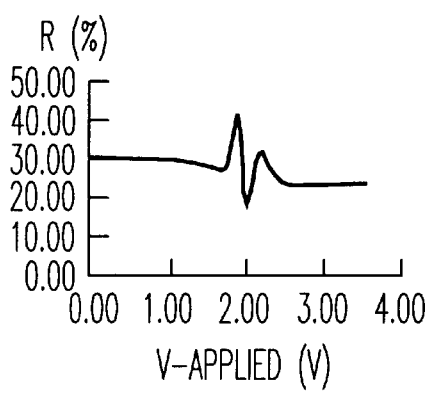
FIG. 57b is a diagram showing reflectance to voltages in Example F5.
Figure 58A:
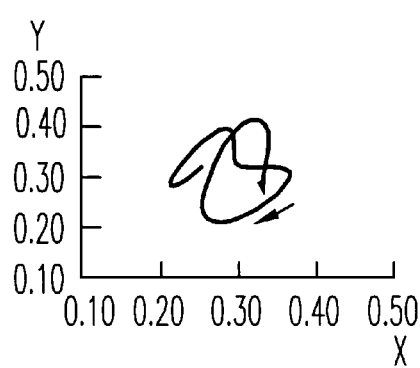
FIG. 58a is a chromaticity diagram showing a color change to voltages in Example F6.
Figure 58B:
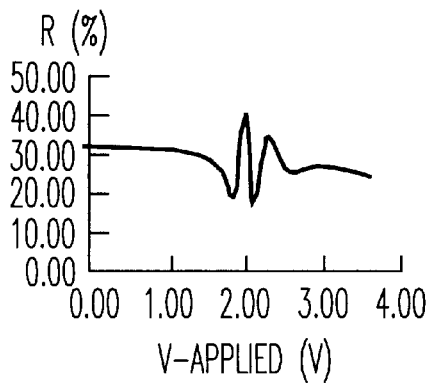
FIG. 58b is a diagram showing reflectance to voltages in Example F6.
Figure 59A:
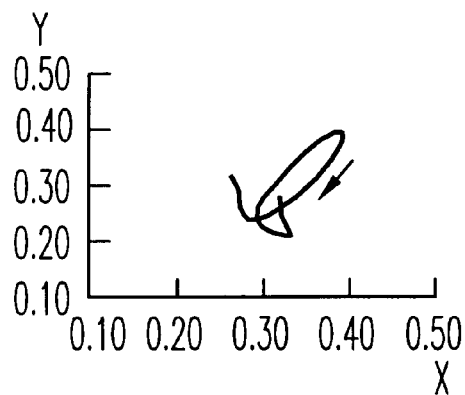
FIG. 59a is a chromaticity diagram showing a color change to voltages in Example F7.
Figure 59B:
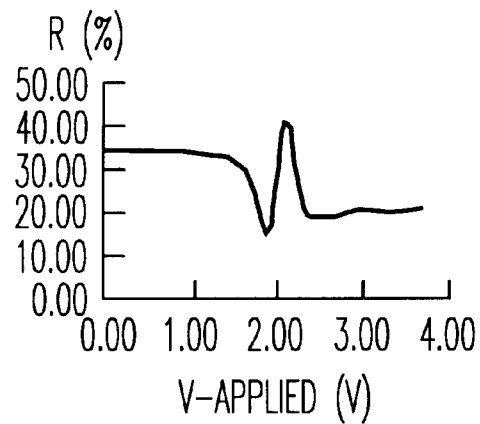
FIG. 59b is a diagram showing reflectance to voltages in Example F7.

That relation is shown in FIG. 52. The hatched area is the region of good color development.

In FIG. 52 there is an ellipse or an nearly elliptic figure located in a top-right to bottom-left direction having a major axis matched to the length of about 0.6 μm and a minor axis matched to the length of about 0.3 μm and the center coordinate of about (1.2, 1.25) at the origin in a rectangular coordination system with horizontal axis ($\Delta n_2 \cdot d_2$) and vertical axis ($\Delta n_1 \cdot d_1$).

It is preferably to use a birefringent plate having a refractive index dispersion for light wavelength. This will make a RC-LCD improved on chromaticity characteristic.

Examples F1–F7 are shown in Table 1F.

In the group B–F invention above-mentioned, the pixel size was set to be 400×400 μm by constituted by the matrix.

And the thickness of the substrate at the side of the reflection layer was arranged to be 0.4 mm. In the next paragraph a relation between a pixel size and a thickness of the transparent substrate is explained in present invention which utilize a reflection of light to obtain a color display.

Figure 60:
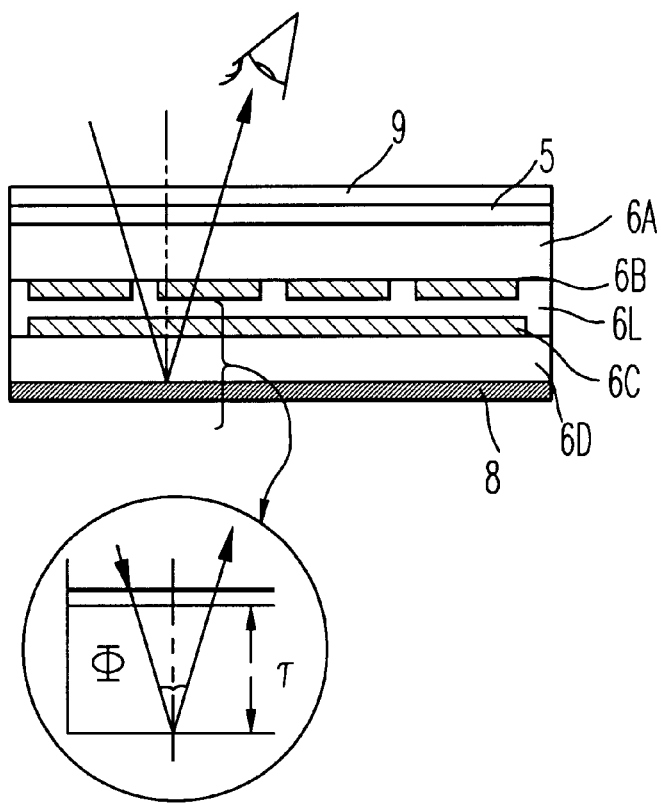
FIG. 60 is a diagram showing a light path in a cross-sectional view.
Figure 61:
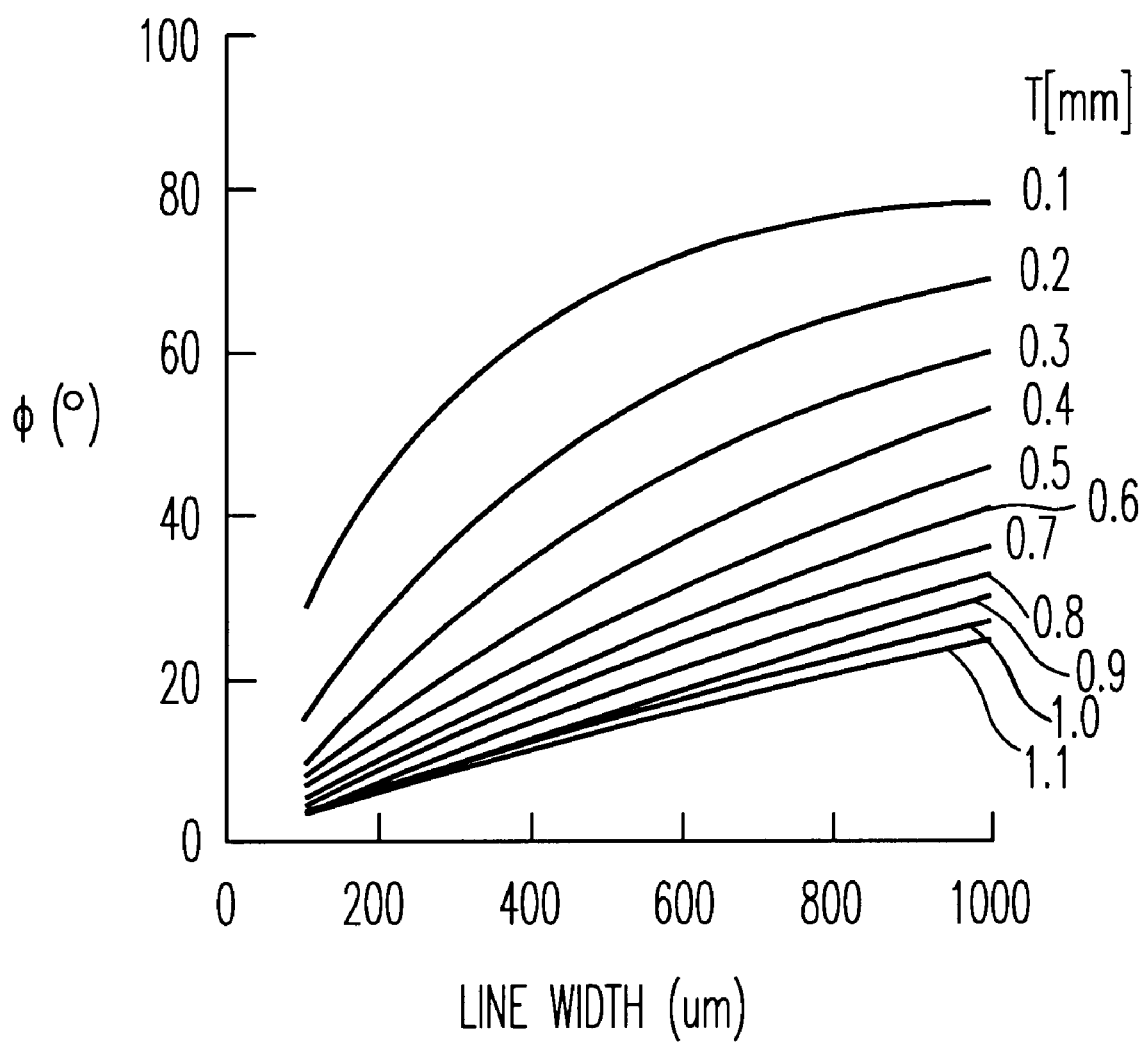
FIG. 61 is a diagram showing $\phi$ and line width of electrode and substrate thickness T.

A cross-sectional view with a light-path is shown in FIG. 60. φ marked in this figure indicates a range of an open angle to provide a substantially preferable color development to be seen. This φ is preferable to be wider effectively. In present invention an open angle φ of at least 20° is to be obtained. And FIG. 61 shows a relation among an open angle φ, an electrode width and a thickness of transparent substrate which is generally a glass substrate arranged at the backside of the light progressing direction.

A good color display is obtained in the range of this open angle φ. There is a tendency to show a degradation of color chromaticity in a range beyond said open angle φ.

Approximately, a good color development is obtained in a condition that (a thickness T of transparent-substrate at the side of a reflection layer)≦1.4*(pixel size).

It is further preferable to be satisfied with a condition such as T≦1.2*(pixel size).

Higher color chromaticity is obtained in a condition such as T≦1.0*(pixel size), where a thinner thickness of substrate is used.

TABLE 1B (Group B)

| example | $\theta_1$ (°) | $\theta_2$ (°) | $\theta_3$ (°) | $\theta_4$ (°) | $\Delta n_1 \cdot d_1$ (μm) | $\Delta n_2 \cdot d_2$ (μm) | matrix size | duty ratio | gray scale | COLOR 0/7 | 3/7 | 5/7 | 7/7 |
|---|---|---|---|---|---|---|---|---|---|---|---|---|---|
| B1 | −240 | +240 | +90 | +20 | 1.30 | 1.30 (film) | 320 × 200 | 1/200 | 8 | W | R | B | G |
| Comparative B0 | −240 | +240 | +90 | +45 | 1.30 | 1.30 | | | | worse color chromaticity | | | |
| B1 | −240 | +240 | +90 | +20 | 1.30 | 1.30 (LCD) | 320 × 200 | 1/200 | 8 | W | R | B | G |
| B2 | −240 | +240 | +90 | +120 | 1.17 | 1.17 | ↑ | ↑ | ↑ | W | <u>R</u> | B | G |
| B3 | −240 | +240 | +90 | +120 | 1.24 | 1.24 | ↑ | 1/240 | ↑ | W | <u>R</u> | B | G |
| B4 | −240 | +240 | +100 | +150 | 1.30 | 1.30 | ↑ | 1/200 | ↑ | W | R | <u>B</u> | G |
| B5 | −240 | +240 | +90 | +30 | 1.24 | 1.24 | ↑ | ↑ | ↑ | W | <u>R</u> | B | G |
| B6 | −240 | +240 | +110 | +50 | 0.846 | 0.846 | ↑ | 1/128 | ↑ | W | R ! | B | G |
| B7 | −240 | +240 | +140 | +60 | 1.30 | 0.781 | ↑ | ↑ | ↑ | W | R * | <u>B</u> | G |
| B8 | −240 | +240 | +90 | +22 | 1.24 | 1.36 | ↑ | 1/200 | ↑ | W | R | B | G |
| B9 | −240 | +240 | +110 | +60 | 0.85 | 0.85 | ↑ | ↑ | ↑ | W | <u>R</u> | <u>B</u> | <u>G</u> |
| B10 | −240 | +240 | +90 | +30 | 1.30 | 1.30 | ↑ | ↑ | ↑ | W | <u>R</u> | <u>B</u> | <u>G</u> |

Note
(1) Underlined R: Orange red is good for improving total color expression and color balance.
(2) R ! is pinkish red.
(3) R * is birght red.
(4) Underlined B: Dark blue is good for contrast improvement.
(5) Underlined RGB are good chromaticity.

TABLE 1C (Group C)

| example | $\theta_1$ (°) | $\theta_2$ (°) | $\theta_3$ (°) | $\theta_4$ (°) | $\Delta n_1 \cdot d_1$ (μm) | $\Delta n_2 \cdot d_2$ (μm) | matrix size | duty ratio | gray scale | COLOR 0/7 | 3/7 | 5/7 | 7/7 |
|---|---|---|---|---|---|---|---|---|---|---|---|---|---|
| C1 | −180 | +180 | +90 | +140 | 1.17 | film/LCD 0.976 | 128 × 64 | 1/32 | 8 | W | B | G | R |
| C2 | −180 | +180 | +100 | +140 | 1.17 | film 0.976 | 128 × 64 | 1/32 | ↑ | W | B | G | R |
| C3 | −180 | +180 | +90 | +60 | 1.11 | film 0.976 | 128 × 64 | 1/16 | ↑ | W | B | G | R |
| C4 | −180 | +180 | +100 | +50 | 1.17 | film 0.976 | 128 × 64 | 1/32 | ↑ | W | B | G | R |
| C5 | −180 | +180 | +90 | +110 | 1.11 | film 1.04 | 128 × 64 | 1/16 | ↑ | W | R | B | G |
| C6 | −180 | +180 | +90 | +45 | 1.04 | 1.04 | 128 × 64 | 1/16 | ↑ | W | B | G | R |
| prior art C0 | −90 | +90 | +90 | +45 | 0.90 | 0.90 | — | — | — | W→Y→B→Y→B→G (by other driv.) | | | |

TABLE 1D (Group D)

| example | $\theta_1$ (°) | $\theta_2$ (°) | $\theta_3$ (°) | $\theta_4$ (°) | $\Delta n_1 \cdot d_1$ (μm) | $\Delta n_2 \cdot d_2$ (μm) | matrix size | duty ratio | gray scale | COLOR 0/7 | 3/7 | 5/7 | 7/7 |
|---|---|---|---|---|---|---|---|---|---|---|---|---|---|
| D1 | −240 | +90 | +90 | +40 | 1.11 | 0.845 | 320 × 200 | 1/200 | 8 | W | R | B | G |
| D2 | −240 | +90 | +100 | +130 | 1.11 | 0.845 | ↑ | ↑ | ↑ | W | <u>R</u> | B | <u>G</u> |
| D3 | −240 | +100 | +100 | +130 | 1.11 | 0.845 | ↑ | ↑ | ↑ | W | <u>R</u> | B | <u>G</u> |
| D4 | −240 | +90 | +100 | +130 | 0.911 | 0.845 | ↑ | ↑ | ↑ | W | R | B | G |
| D5 | −240 | +100 | +100 | +40 | 1.11 | 0.845 | ↑ | ↑ | ↑ | W | R | B | G |
| D6 | −240 | +170 | +90 | +150 | 1.11 | 1.04 | ↑ | ↑ | ↑ | W | <u>R</u> | B | G |
| D7 | −240 | +170 | +80 | +70 | 1.04 | 1.04 | ↑ | ↑ | ↑ | W | G | B | R |
| D8 | −240 | +180 | +80 | +150 | 1.17 | 1.04 | ↑ | ↑ | ↑ | W | G | B | R |
| D9 | −240 | +180 | +80 | +70 | 1.11 | 1.04 | ↑ | ↑ | ↑ | W | G | B | R |
| D10 | −240 | +180 | +80 | +160 | 1.11 | 1.04 | ↑ | ↑ | ↑ | W | G | B | R |

Note
(1) Underlined R: Orange is good for improving total color expression and color balance.
(2) Underlined G: Chromaticity is improved than example 1.

TABLE 1E (Group E)

| example | $\theta_1$ (°) | $\theta_5$ (°) | $\theta_6$ (°) | $\Delta n_1 \cdot d_1$ (μm) | $\Delta n_2 \cdot d_2$ (μm) | other constitution | matrix size | duty ratio | gray scale | COLOR 0/7 | 3/7 | 5/7 | 7/7 |
|---|---|---|---|---|---|---|---|---|---|---|---|---|---|
| E1 | −240 | +100 | +50 | 1.11 | 0.85 | Birefringent film = uniaxial or biaxial | 320 × 200 | 1/200 | 8 | W | R | B | G |
| E2 | −240 | +100 | +140 | 1.11 | 0.85 | ↑ | ↑ | ↑ | ↑ | W | R | B | G |
| E3 | −240 | +90 | +130 | 1.11 | 0.90 | ↑ | ↑ | ↑ | ↑ | W | <u>R</u> | B | G |
| E4 | −240 | +90 | +130 | 1.11 | 0.85 | ↑ | ↑ | ↑ | ↑ | W | <u>R</u> | B | G |
| E5 | −240 | +90 | +40 | 1.11 | 0.90 | ↑ | ↑ | ↑ | ↑ | W | R | <u>B</u> | G |
| E6 (prior art) | −90 | 0 | +45 | 0.30 | 0.40 | | — | — | — | B→ | Y→ | B→ | W |

Note
(1) Underlined R: Chromaticity is improved than exmaple 1.
(2) Underlined B: Dark blue is good for contrast improvement.

TABLE 1F (Group F)

| example | $\theta_1$ (°) | $\theta_5$ (°) | $\theta_6$ (°) | $\Delta n_1 \cdot d_1$ (μm) | $\Delta n_2 \cdot d_2$ (μm) | other constitution | matrix size | duty ratio | gray scale | COLOR 0/7 | 3/7 | 5/7 | 7/7 |
|---|---|---|---|---|---|---|---|---|---|---|---|---|---|
| F1 | −180 | +100 | +50 | 1.24 | 1.15 | one axial or biaxial (Nz = 0.5) | 128 × 64 | 1/32 static | 8 | W | R | B | G |
| F2 | −180 | +110 | +40 | 1.24 | 1.20 | ↑ | ↑ | ↑ | ↑ | W | B | G | R |
| F3 | −180 | +110 | +130 | 1.11 | 1.20 | ↑ | ↑ | ↑ | ↑ | W | B | G | R |
| F4 | −180 | +110 | +40 | 1.11 | 1.20 | ↑ | ↑ | ↑ | ↑ | W | B | G | R |
| F5 | −180 | +100 | +50 | 1.24 | 1.20 | ↑ | ↑ | ↑ | ↑ | W | R | B | G |
| F6 | −180 | +90 | +45 | 1.24 | 1.15 | ↑ | ↑ | ↑ | ↑ | W | R (dark display) | B | G |
| F7 | −180 | +90 | +45 | 0.98 | 0.90 | ↑ | ↑ | ↑ | ↑ | W | R (2nd level coloring) | B | G |

TABLE 2A (Group B: example B8)

| V | T (%) | X | Y |
|---|---|---|---|
| 0 | 41.3 | 0.31 | 0.32 |
| 0.07 | 41.3 | 0.31 | 0.32 |
| 0.15 | 41.3 | 0.31 | 0.32 |
| 0.22 | 41.3 | 0.31 | 0.32 |
| 0.29 | 41.3 | 0.31 | 0.32 |
| 0.37 | 41.3 | 0.31 | 0.32 |
| 0.44 | 41.3 | 0.31 | 0.32 |
| 0.51 | 41.3 | 0.31 | 0.32 |
| 0.59 | 41.3 | 0.31 | 0.32 |
| 0.66 | 41.3 | 0.31 | 0.32 |
| 0.73 | 41.3 | 0.31 | 0.32 |
| 0.81 | 41.3 | 0.31 | 0.32 |
| 0.88 | 41.3 | 0.31 | 0.32 |
| 0.95 | 41.3 | 0.31 | 0.32 |
| 1.03 | 41.3 | 0.31 | 0.32 |
| 1.1 | 41.4 | 0.31 | 0.32 |
| 1.17 | 41.4 | 0.31 | 0.32 |
| 1.25 | 41.4 | 0.31 | 0.32 |
| 1.32 | 41.4 | 0.31 | 0.32 |
| 1.39 | 41.4 | 0.31 | 0.32 |
| 1.46 | 41.4 | 0.31 | 0.32 |
| 1.53 | 41.4 | 0.31 | 0.32 |
| 1.6 | 41.5 | 0.31 | 0.32 |
| 1.67 | 41.5 | 0.31 | 0.32 |
| 1.74 | 41.6 | 0.31 | 0.32 |
| 1.8 | 41.8 | 0.31 | 0.32 |
| 1.85 | 42 | 0.31 | 0.32 |
| 1.9 | 42.4 | 0.31 | 0.33 |
| 1.94 | 42.9 | 0.31 | 0.33 |
| 1.96 | 43.4 | 0.32 | 0.34 |
| 1.99 | 43.5 | 0.33 | 0.35 |
| 2 | 43 | 0.34 | 0.37 |
| 2.02 | 41.7 | 0.36 | 0.38 |
| 2.03 | 39.6 | 0.37 | 0.39 |
| 2.04 | 36.8 | 0.38 | 0.38 |
| 2.05 | 33.4 | 0.38 | 0.36 |
| 2.06 | 29.7 | 0.38 | 0.33 |
| 2.07 | 26.1 | 0.37 | 0.3 |
| 2.07 | 22.8 | 0.35 | 0.26 |
| 2.08 | 20.3 | 0.32 | 0.24 |
| 2.09 | 19.1 | 0.29 | 0.22 |
| 2.09 | 18.9 | 0.27 | 0.22 |
| 2.1 | 19.6 | 0.24 | 0.22 |
| 2.1 | 21 | 0.23 | 0.24 |
| 2.1 | 23 | 0.22 | 0.25 |
| 2.11 | 25.2 | 0.21 | 0.27 |
| 2.11 | 27.5 | 0.22 | 0.29 |
| 2.12 | 29.6 | 0.23 | 0.31 |
| 2.12 | 31.7 | 0.24 | 0.33 |

TABLE 2A-continued (Group B: example B8)

| V | T (%) | X | Y |
|---|---|---|---|
| 2.13 | 33.6 | 0.26 | 0.35 |
| 2.13 | 35.3 | 0.27 | 0.36 |
| 2.14 | 36.8 | 0.29 | 0.37 |
| 2.14 | 38 | 0.3 | 0.38 |
| 2.15 | 38.8 | 0.31 | 0.38 |
| 2.15 | 39.3 | 0.32 | 0.38 |
| 2.16 | 39.6 | 0.32 | 0.37 |
| 2.17 | 39.6 | 0.32 | 0.37 |
| 2.18 | 39.6 | 0.33 | 0.37 |
| 2.18 | 39.5 | 0.33 | 0.36 |
| 2.19 | 39.3 | 0.33 | 0.36 |
| 2.2 | 39.1 | 0.33 | 0.36 |
| 2.21 | 39 | 0.33 | 0.35 |
| 2.23 | 38.9 | 0.33 | 0.35 |
| 2.24 | 38.9 | 0.33 | 0.35 |

TABLE 2B (Group B: example B8)

| V | T (%) | X | Y |
|---|---|---|---|
| 2.25 | 38.9 | 0.33 | 0.35 |
| 2.27 | 39 | 0.33 | 0.35 |
| 2.28 | 39.1 | 0.33 | 0.34 |
| 2.3 | 39.2 | 0.33 | 0.34 |
| 2.32 | 39.3 | 0.33 | 0.34 |
| 2.33 | 39.5 | 0.33 | 0.34 |
| 2.35 | 39.7 | 0.33 | 0.34 |
| 2.37 | 39.8 | 0.33 | 0.34 |
| 2.39 | 40 | 0.33 | 0.34 |
| 2.41 | 40.2 | 0.33 | 0.34 |
| 2.43 | 40.3 | 0.33 | 0.35 |
| 2.45 | 40.5 | 0.33 | 0.35 |
| 2.48 | 40.6 | 0.33 | 0.35 |
| 2.5 | 40.8 | 0.33 | 0.35 |
| 2.52 | 40.9 | 0.33 | 0.35 |
| 2.54 | 41 | 0.33 | 0.35 |
| 2.56 | 41.1 | 0.33 | 0.35 |
| 2.59 | 41.1 | 0.33 | 0.35 |
| 2.61 | 41.2 | 0.33 | 0.35 |
| 2.63 | 41.2 | 0.33 | 0.35 |
| 2.66 | 41.3 | 0.33 | 0.35 |
| 2.68 | 41.3 | 0.33 | 0.35 |
| 2.7 | 41.3 | 0.33 | 0.35 |
| 2.72 | 41.3 | 0.33 | 0.35 |
| 2.75 | 41.2 | 0.33 | 0.34 |

TABLE 2B-continued (Group B: example B8)

| V | T (%) | X | Y |
|---|---|---|---|
| 2.77 | 41.2 | 0.33 | 0.34 |
| 2.79 | 41.1 | 0.33 | 0.34 |
| 2.82 | 41 | 0.33 | 0.34 |
| 2.84 | 41 | 0.33 | 0.34 |
| 2.86 | 40.9 | 0.33 | 0.34 |
| 2.89 | 40.7 | 0.33 | 0.34 |
| 2.91 | 40.6 | 0.33 | 0.34 |
| 2.93 | 40.5 | 0.34 | 0.34 |
| 2.96 | 40.3 | 0.34 | 0.34 |
| 2.98 | 40.2 | 0.34 | 0.34 |
| 3 | 40 | 0.34 | 0.34 |
| 3.03 | 39.9 | 0.34 | 0.33 |
| 3.05 | 39.7 | 0.34 | 0.33 |
| 3.07 | 39.5 | 0.34 | 0.33 |
| 3.1 | 39.3 | 0.34 | 0.33 |
| 3.12 | 39.1 | 0.34 | 0.33 |
| 3.14 | 39 | 0.34 | 0.33 |
| 3.17 | 38.8 | 0.34 | 0.33 |
| 3.19 | 38.6 | 0.34 | 0.33 |
| 3.21 | 38.4 | 0.34 | 0.33 |
| 3.24 | 38.2 | 0.34 | 0.32 |
| 3.26 | 38 | 0.34 | 0.32 |
| 3.28 | 37.8 | 0.34 | 0.32 |
| 3.31 | 37.5 | 0.34 | 0.32 |
| 3.33 | 37.3 | 0.34 | 0.32 |
| 3.35 | 37.1 | 0.34 | 0.32 |
| 3.38 | 36.9 | 0.34 | 0.32 |
| 3.4 | 36.7 | 0.34 | 0.32 |
| 3.42 | 36.5 | 0.34 | 0.32 |
| 3.45 | 36.3 | 0.34 | 0.32 |
| 3.47 | 36.1 | 0.34 | 0.31 |
| 3.49 | 35.9 | 0.34 | 0.31 |
| 3.52 | 35.7 | 0.34 | 0.31 |
| 3.54 | 35.6 | 0.34 | 0.31 |
| 3.56 | 35.4 | 0.34 | 0.31 |
| 3.59 | 35.2 | 0.34 | 0.31 |
| 3.61 | 35 | 0.34 | 0.31 |

TABLE 3A (Group B: example B9)

| V | T (%) | X | Y |
|---|---|---|---|
| 0 | 43.8 | 0.32 | 0.35 |
| 0.07 | 43.8 | 0.32 | 0.35 |
| 0.15 | 43.8 | 0.32 | 0.35 |
| 0.22 | 43.8 | 0.32 | 0.35 |
| 0.29 | 43.8 | 0.32 | 0.35 |
| 0.37 | 43.8 | 0.32 | 0.35 |
| 0.44 | 43.8 | 0.32 | 0.35 |
| 0.51 | 43.8 | 0.32 | 0.35 |
| 0.59 | 43.8 | 0.32 | 0.35 |
| 0.66 | 43.8 | 0.32 | 0.35 |
| 0.73 | 43.8 | 0.32 | 0.35 |
| 0.81 | 43.8 | 0.32 | 0.35 |
| 0.88 | 43.8 | 0.32 | 0.35 |
| 0.95 | 43.8 | 0.32 | 0.35 |
| 1.03 | 43.8 | 0.32 | 0.35 |
| 1.1 | 43.8 | 0.32 | 0.35 |
| 1.17 | 43.8 | 0.32 | 0.35 |
| 1.25 | 43.8 | 0.32 | 0.35 |
| 1.32 | 43.8 | 0.32 | 0.35 |
| 1.39 | 43.8 | 0.32 | 0.35 |
| 1.46 | 43.8 | 0.32 | 0.35 |
| 1.53 | 43.8 | 0.32 | 0.35 |
| 1.6 | 43.8 | 0.32 | 0.35 |
| 1.67 | 43.8 | 0.32 | 0.35 |
| 1.74 | 43.7 | 0.32 | 0.35 |
| 1.8 | 43.7 | 0.32 | 0.34 |
| 1.85 | 43.7 | 0.32 | 0.34 |
| 1.9 | 43.6 | 0.32 | 0.34 |

TABLE 3A-continued (Group B: example B9)

| V | T (%) | X | Y |
|---|---|---|---|
| 1.94 | 43.4 | 0.32 | 0.33 |
| 1.96 | 43 | 0.32 | 0.33 |
| 1.99 | 42.5 | 0.32 | 0.32 |
| 2 | 41.8 | 0.32 | 0.32 |
| 2.02 | 40.8 | 0.33 | 0.32 |
| 2.03 | 39.6 | 0.33 | 0.32 |
| 2.04 | 38.2 | 0.34 | 0.33 |
| 2.05 | 36.5 | 0.35 | 0.33 |
| 2.06 | 34.7 | 0.36 | 0.34 |
| 2.07 | 32.7 | 0.37 | 0.34 |
| 2.07 | 30.7 | 0.38 | 0.34 |
| 2.08 | 28.7 | 0.38 | 0.34 |
| 2.09 | 26.8 | 0.38 | 0.33 |
| 2.09 | 25 | 0.38 | 0.31 |
| 2.1 | 23.4 | 0.37 | 0.3 |
| 2.1 | 22 | 0.35 | 0.28 |
| 2.1 | 20.9 | 0.34 | 0.26 |
| 2.11 | 20.1 | 0.32 | 0.24 |
| 2.11 | 19.5 | 0.3 | 0.23 |
| 2.12 | 19.2 | 0.29 | 0.22 |
| 2.12 | 19.1 | 0.28 | 0.22 |
| 2.13 | 19.2 | 0.26 | 0.23 |
| 2.13 | 19.4 | 0.26 | 0.23 |
| 2.14 | 19.8 | 0.25 | 0.24 |
| 2.14 | 20.3 | 0.24 | 0.26 |
| 2.15 | 20.8 | 0.24 | 0.27 |
| 2.15 | 21.4 | 0.24 | 0.28 |
| 2.16 | 21.9 | 0.24 | 0.3 |
| 2.17 | 22.5 | 0.24 | 0.31 |
| 2.18 | 23 | 0.24 | 0.32 |
| 2.18 | 23.5 | 0.24 | 0.33 |
| 2.19 | 23.9 | 0.24 | 0.34 |
| 2.2 | 24.2 | 0.24 | 0.34 |
| 2.21 | 24.4 | 0.24 | 0.35 |
| 2.23 | 24.6 | 0.24 | 0.35 |
| 2.24 | 24.7 | 0.24 | 0.36 |

TABLE 3B (Group B: example B9)

| V | T (%) | X | Y |
|---|---|---|---|
| 2.25 | 24.7 | 0.24 | 0.36 |
| 2.27 | 24.7 | 0.24 | 0.36 |
| 2.28 | 24.6 | 0.24 | 0.36 |
| 2.3 | 24.5 | 0.24 | 0.36 |
| 2.32 | 24.3 | 0.24 | 0.36 |
| 2.33 | 24.1 | 0.24 | 0.36 |
| 2.35 | 23.9 | 0.24 | 0.36 |
| 2.37 | 23.7 | 0.24 | 0.36 |
| 2.39 | 23.5 | 0.24 | 0.36 |
| 2.41 | 23.3 | 0.24 | 0.36 |
| 2.43 | 23.1 | 0.24 | 0.36 |
| 2.45 | 22.9 | 0.23 | 0.36 |
| 2.48 | 22.8 | 0.23 | 0.35 |
| 2.5 | 22.7 | 0.23 | 0.35 |
| 2.52 | 22.5 | 0.23 | 0.35 |
| 2.54 | 22.5 | 0.23 | 0.35 |
| 2.56 | 22.4 | 0.23 | 0.35 |
| 2.59 | 22.3 | 0.23 | 0.35 |
| 2.61 | 22.3 | 0.23 | 0.34 |
| 2.63 | 22.3 | 0.23 | 0.34 |
| 2.66 | 22.3 | 0.23 | 0.34 |
| 2.68 | 22.3 | 0.23 | 0.34 |
| 2.7 | 22.4 | 0.23 | 0.34 |
| 2.72 | 22.5 | 0.24 | 0.34 |
| 2.75 | 22.5 | 0.24 | 0.33 |
| 2.77 | 22.6 | 0.24 | 0.33 |
| 2.79 | 22.7 | 0.24 | 0.33 |
| 2.82 | 22.8 | 0.24 | 0.33 |
| 2.84 | 23 | 0.24 | 0.33 |

TABLE 3B-continued (Group B: example B9)

| V | T (%) | X | Y |
|---|---|---|---|
| 2.86 | 23.1 | 0.24 | 0.32 |
| 2.89 | 23.2 | 0.24 | 0.32 |
| 2.91 | 23.4 | 0.24 | 0.32 |
| 2.93 | 23.5 | 0.24 | 0.32 |
| 2.96 | 23.7 | 0.24 | 0.32 |
| 2.98 | 23.9 | 0.25 | 0.32 |
| 3 | 24 | 0.25 | 0.31 |
| 3.03 | 24.2 | 0.25 | 0.31 |
| 3.05 | 24.4 | 0.25 | 0.31 |
| 3.07 | 24.6 | 0.25 | 0.31 |
| 3.1 | 24.7 | 0.25 | 0.31 |
| 3.12 | 24.9 | 0.25 | 0.31 |
| 3.14 | 25.1 | 0.25 | 0.31 |
| 3.17 | 25.3 | 0.25 | 0.31 |
| 3.19 | 25.5 | 0.25 | 0.3 |
| 3.21 | 25.7 | 0.26 | 0.3 |
| 3.24 | 25.9 | 0.26 | 0.3 |
| 3.26 | 26.1 | 0.26 | 0.3 |
| 3.28 | 26.3 | 0.26 | 0.3 |
| 3.31 | 26.5 | 0.26 | 0.3 |
| 3.33 | 26.7 | 0.26 | 0.3 |
| 3.35 | 26.9 | 0.26 | 0.3 |
| 3.38 | 27.1 | 0.26 | 0.3 |
| 3.4 | 27.2 | 0.26 | 0.3 |
| 3.42 | 27.4 | 0.26 | 0.3 |
| 3.45 | 27.6 | 0.27 | 0.3 |
| 3.47 | 27.8 | 0.27 | 0.3 |
| 3.49 | 28 | 0.27 | 0.3 |
| 3.52 | 28.2 | 0.27 | 0.3 |
| 3.54 | 28.4 | 0.27 | 0.29 |
| 3.56 | 28.5 | 0.27 | 0.29 |
| 3.59 | 28.7 | 0.27 | 0.29 |
| 3.61 | 28.9 | 0.27 | 0.29 |

TABLE 4A (Group B: example B10)

| V | T (%) | X | Y |
|---|---|---|---|
| 0 | 44.9 | 0.32 | 0.33 |
| 0.07 | 44.9 | 0.32 | 0.33 |
| 0.15 | 44.9 | 0.32 | 0.33 |
| 0.22 | 44.9 | 0.32 | 0.33 |
| 0.29 | 44.9 | 0.32 | 0.33 |
| 0.37 | 44.9 | 0.32 | 0.33 |
| 0.44 | 44.9 | 0.32 | 0.33 |
| 0.51 | 44.9 | 0.32 | 0.33 |
| 0.59 | 44.9 | 0.32 | 0.33 |
| 0.66 | 44.9 | 0.32 | 0.33 |
| 0.73 | 44.9 | 0.32 | 0.33 |
| 0.81 | 44.9 | 0.32 | 0.33 |
| 0.88 | 44.9 | 0.32 | 0.33 |
| 0.95 | 44.9 | 0.32 | 0.33 |
| 1.03 | 44.9 | 0.32 | 0.33 |
| 1.1 | 44.9 | 0.32 | 0.33 |
| 1.17 | 44.9 | 0.32 | 0.33 |
| 1.25 | 44.9 | 0.32 | 0.33 |
| 1.32 | 44.9 | 0.32 | 0.33 |
| 1.39 | 44.9 | 0.32 | 0.33 |
| 1.46 | 44.9 | 0.32 | 0.33 |
| 1.53 | 44.9 | 0.32 | 0.33 |
| 1.6 | 44.9 | 0.32 | 0.33 |
| 1.67 | 44.8 | 0.32 | 0.33 |
| 1.74 | 44.8 | 0.32 | 0.33 |
| 1.8 | 44.6 | 0.32 | 0.33 |
| 1.85 | 44.2 | 0.32 | 0.33 |
| 1.9 | 43.5 | 0.32 | 0.33 |
| 1.94 | 42.3 | 0.32 | 0.33 |
| 1.96 | 40.6 | 0.33 | 0.34 |
| 1.99 | 38.6 | 0.33 | 0.34 |
| 2 | 36.9 | 0.33 | 0.33 |

TABLE 4A-continued (Group B: example B10)

| V | T (%) | X | Y |
|---|---|---|---|
| 2.02 | 35.9 | 0.32 | 0.32 |
| 2.03 | 35.9 | 0.31 | 0.31 |
| 2.04 | 37 | 0.3 | 0.31 |
| 2.05 | 38.9 | 0.3 | 0.32 |
| 2.06 | 41 | 0.31 | 0.33 |
| 2.07 | 42.7 | 0.32 | 0.36 |
| 2.07 | 43.3 | 0.34 | 0.38 |
| 2.08 | 42.6 | 0.36 | 0.4 |
| 2.09 | 40.3 | 0.38 | 0.4 |
| 2.09 | 36.9 | 0.39 | 0.38 |
| 2.1 | 32.7 | 0.38 | 0.34 |
| 2.1 | 28.6 | 0.37 | 0.3 |
| 2.1 | 24.8 | 0.34 | 0.27 |
| 2.11 | 22 | 0.32 | 0.24 |
| 2.11 | 20.1 | 0.3 | 0.23 |
| 2.12 | 19.4 | 0.27 | 0.22 |
| 2.12 | 19.5 | 0.25 | 0.23 |
| 2.13 | 20.5 | 0.24 | 0.24 |
| 2.13 | 22 | 0.22 | 0.25 |
| 2.14 | 23.9 | 0.22 | 0.27 |
| 2.14 | 25.8 | 0.22 | 0.29 |
| 2.15 | 27.8 | 0.22 | 0.3 |
| 2.15 | 29.5 | 0.23 | 0.32 |
| 2.16 | 30.9 | 0.24 | 0.33 |
| 2.17 | 32.1 | 0.25 | 0.34 |
| 2.18 | 33 | 0.26 | 0.35 |
| 2.18 | 33.6 | 0.27 | 0.35 |
| 2.19 | 34 | 0.28 | 0.35 |
| 2.2 | 34.3 | 0.28 | 0.35 |
| 2.21 | 34.5 | 0.28 | 0.35 |
| 2.23 | 34.6 | 0.29 | 0.35 |
| 2.24 | 34.6 | 0.29 | 0.35 |

TABLE 4B (Group B: example B10)

| V | T (%) | X | Y |
|---|---|---|---|
| 2.25 | 34.7 | 0.29 | 0.35 |
| 2.27 | 34.7 | 0.29 | 0.36 |
| 2.28 | 34.7 | 0.29 | 0.36 |
| 2.3 | 34.7 | 0.29 | 0.36 |
| 2.32 | 34.8 | 0.29 | 0.36 |
| 2.33 | 34.8 | 0.29 | 0.36 |
| 2.35 | 34.9 | 0.29 | 0.36 |
| 2.37 | 34.9 | 0.29 | 0.36 |
| 2.39 | 35 | 0.29 | 0.37 |
| 2.41 | 35.1 | 0.29 | 0.37 |
| 2.43 | 35.2 | 0.29 | 0.37 |
| 2.45 | 35.3 | 0.29 | 0.37 |
| 2.48 | 35.5 | 0.29 | 0.37 |
| 2.5 | 35.6 | 0.3 | 0.37 |
| 2.52 | 35.8 | 0.3 | 0.37 |
| 2.54 | 36 | 0.3 | 0.37 |
| 2.56 | 36.1 | 0.3 | 0.37 |
| 2.59 | 36.3 | 0.3 | 0.37 |
| 2.61 | 36.5 | 0.3 | 0.37 |
| 2.63 | 36.7 | 0.3 | 0.37 |
| 2.66 | 36.9 | 0.3 | 0.37 |
| 2.68 | 37.1 | 0.3 | 0.37 |
| 2.7 | 37.3 | 0.3 | 0.37 |
| 2.72 | 37.5 | 0.3 | 0.37 |
| 2.75 | 37.7 | 0.3 | 0.37 |
| 2.77 | 37.9 | 0.31 | 0.37 |
| 2.79 | 38.2 | 0.31 | 0.37 |
| 2.82 | 38.4 | 0.31 | 0.37 |
| 2.84 | 38.6 | 0.31 | 0.37 |
| 2.86 | 38.8 | 0.31 | 0.37 |
| 2.89 | 39 | 0.31 | 0.37 |
| 2.91 | 39.1 | 0.31 | 0.37 |
| 2.93 | 39.3 | 0.31 | 0.37 |

TABLE 4B-continued (Group B: example B10)

| V | T (%) | X | Y |
|---|---|---|---|
| 2.96 | 39.5 | 0.32 | 0.37 |
| 2.98 | 39.7 | 0.32 | 0.37 |
| 3 | 39.9 | 0.32 | 0.38 |
| 3.03 | 40 | 0.32 | 0.38 |
| 3.05 | 40.2 | 0.32 | 0.38 |
| 3.07 | 40.4 | 0.32 | 0.38 |
| 3.1 | 40.5 | 0.32 | 0.38 |
| 3.12 | 40.6 | 0.32 | 0.38 |
| 3.14 | 40.8 | 0.32 | 0.38 |
| 3.17 | 40.9 | 0.32 | 0.38 |
| 3.19 | 41 | 0.32 | 0.38 |
| 3.21 | 41.2 | 0.33 | 0.38 |
| 3.24 | 41.3 | 0.33 | 0.38 |
| 3.26 | 41.4 | 0.33 | 0.38 |
| 3.28 | 41.5 | 0.33 | 0.38 |
| 3.31 | 41.6 | 0.33 | 0.38 |
| 3.33 | 41.7 | 0.33 | 0.37 |
| 3.35 | 41.8 | 0.33 | 0.37 |
| 3.38 | 41.8 | 0.33 | 0.37 |
| 3.4 | 41.9 | 0.33 | 0.37 |
| 3.42 | 42 | 0.33 | 0.37 |
| 3.45 | 42 | 0.33 | 0.37 |
| 3.47 | 42.1 | 0.33 | 0.37 |
| 3.49 | 42.2 | 0.33 | 0.37 |
| 3.52 | 42.2 | 0.33 | 0.37 |
| 3.54 | 42.2 | 0.33 | 0.37 |
| 3.56 | 42.3 | 0.33 | 0.37 |
| 3.59 | 42.3 | 0.33 | 0.37 |
| 3.61 | 42.3 | 0.33 | 0.37 |

INDUSTRIAL APPLICABILITY

In accordance with the present invention, a reflection type color liquid crystal display apparatus could be realized wherein an achromatic display could be provided in a pixel without using color filters when no voltage is applied or a low voltage is applied, and a color display of red, blue or green could be provided when a voltage is applied. Further, since it is unnecessary to form a color filter in the liquid crystal cell, control of the cell gap in the liquid crystal cell could be easy. Further, yield was improved and producibility could be improved.

A reflection type color display apparatus of low power consumption rate, capable of providing a bright display and suitable for carrying was possible. Since only one polarizing plate was used, loss of light was small and a light quantity for contributing a display was greatly increased.

Further, when a reflection layer of silver is used, efficiency of utilization of light can be further improved since the reflectance of the layer is about 20% better than aluminum. Wavelength dependence of light reflected by silver is different from that by aluminum. Generally, silver provides a low reflectance in a wavelength region of blue, and the color of reflected light is yellowish. By shifting a display of the liquid crystal cell to a blue color side on the chromaticity diagram, the display characteristics can be improved as a whole. Further, a display of bright and good color purity can be obtained.

The liquid crystal display element of the present invention can be utilized as a functioning element for a display device such as a personal computer, a word processor, a fish finder, an instrumental panel for automobile, a display for public telephone, a display device for public, a destination display, a data accessing terminal, an information display device for industrial use (for instance, to display an operation mode in the operation panel of a copy machine (when a copy is in a red tone, the number of pages is indicated by green, lines are indicated by blue and the background is indicated by white) or to display an operation mode for a power machine (the background color is indicated by white, a state of operation is indicated by green and a display of emergency is indicated by red)), a dot matrix display device for domestic use (e.g. an audio device, a watch, a game device, amusement device, a telecommunication device, a navigator for automobile, a camera, a telephone with TV, an electronic calculator etc.).

In particular, the color liquid crystal display apparatus of the present invention can be of a low power consumption rate. Accordingly, when it is used for a portable electronic devices such as a portable telephone, an electronic note, an electronic book, an electronic dictionary, a PDA (a portable data accessing terminal), a pager (pocket bell), it provides high performance as well as high visibility and representation. The present invention can be applied to various purposes of use as far as the effect of the present invention is not reduced.

I claim:

1. A reflection type liquid crystal display apparatus comprising:

a polarizing plate, a birefringent plate having a twist angle, a liquid crystal layer of a nematic liquid crystal having positive dielectric anisotropy and including a chiral material, which is interposed between two substrates disposed to each other, each provided with an electrode, and a reflection layer arranged in successive order; wherein said liquid crystal layer has a twist angle $\theta_1$ from the first orientation direction at its first plane of said liquid crystal layer to the second orientation direction at its second plane of said liquid crystal layer;

said birefringent plate has a twist angle $\theta_2$ from a first slow axis of optical anisotropic axes in a plane at the side next to the polarizing plate to a second slow axis of optical anisotropic axes in opposite plane in a direction from the first slow axis to the second slow axis, and the product of $\Delta n_1 \cdot d_1$ of the refractive index anisotropy $\Delta n_1$ of the liquid crystal in the liquid crystal layer and the thickness $d_1$ of the liquid crystal layer is 0.30 to 2.00 $\mu$m;

the product of $\Delta n_2 \cdot d_2$ of the refractive index anisotropy $\Delta n_2$ of the birefringent plate and the thickness $d_2$ of the birefringent plate is 0.30 to 2.00 $\mu$m;

an angle $\theta_3$ is formed from said first orientation direction of the liquid crystal layer to the second slow axis of said birefringent plate;

an angle $\theta_4$ is formed from said first slow axis of said birefringent plate to an absorbing axis of said polarizing plate;

the angles $\theta_1$, $\theta_2$, $\theta_3$ and $\theta_4$ in a clockwise (+) or in counterclockwise (−) direction have the following first conditions:

{$\theta_1$ is −160° to −300°, $\theta_2$ is +160° to +300°, $\theta_3$ is (+90°+[−10° to +40°]) and $\theta_4$ is (+45°+[−30° to +25°] or +135°+[−30° to +25°])}; or the following second conditions:

{$\theta_1$ is +160° to +300°, $\theta_2$ is −160° to −300°, $\theta_3$ is (−90°+[+10° to −40°]) and θ₄ is (−45°+[+30° to −25°] or −135°+[+30° to −25°])};
and voltage values of at least 3 values are selected to be applied to said liquid crystal layer.

2. The reflection type color liquid crystal apparatus according to claim 1, wherein
|θ₁| is 230° to 250°,
|θ₂| is 230° to 250°,
$0.8 \leq \Delta n_1 \cdot d_1 \leq 1.5$ and
$\Delta n_1 \cdot d_1 - 0.15 \leq \Delta n_2 \cdot d_2 \leq \Delta n_1 \cdot d_1 + 0.15$.

3. The reflection type color liquid crystal apparatus according to claim 1, wherein said first conditions satisfy:
{θ₁ is −230° to −250°,
θ₂ is +230° to +250°,
θ₃ is (+90°+[−10° to +10°]) and
θ₄ is (+45°+[−20° to −10°] or +135°+[−20° to −10°])}; or said second conditions satisfy:
{θ₁ is +230° to +250°,
θ₂ is −230° to −250°,
θ₃ is (−90°+[+10° to −10°]) and
θ₄ is (−45°+[+20° to +10°] or −135°+[+20° to +10°])};
$1.25 \leq \Delta n_1 \cdot d_1 \leq 1.35$ and
$1.25 \leq \Delta n_2 \cdot d_2 \leq 1.35$.

4. The reflection type color liquid crystal apparatus according to claim 1, wherein said first conditions satisfy:
{θ₁ is −230° to −250°,
θ₂ is +230° to +250°,
θ₃ is (+90°+[+10° to +30°]) and
θ₄ is (+45°+[+50 to +25°] or +135°+[+5° to +25°])}; or said second conditions satisfy:
{θ₁ is +230° to +250°,
θ₂ is −230° to −250°,
θ₃ is (−90°+[−10° to −30°]) and
θ₄ is (−45°+[−5° to −25°] or −135°+[−5° to −25°])};
$0.80 \leq \Delta n_1 \cdot d_1 \leq 0.90$ and
$0.80 \leq \Delta n_2 \cdot d_2 \leq 0.90$.

5. The reflection type color liquid crystal apparatus according to claim 1, wherein said first conditions satisfy:
{θ₁ is −230° to −250°,
θ₂ is +230° to +250°,
θ₃ is (+90°+[−10° to +10°]) and
θ₄ is (+45°+[−30° to −10°] or +135°+[−30° to −10°])}; or said second conditions satisfy:
{θ₁ is +230° to +250°,
θ₂ is −230° to −250°,
θ₃ is (−90°+[+10° to −10°]) and
θ₄ is (−45°+[+30° to +10°] or −135°+[+30° to +10°])};
$1.2 \leq \Delta n_1 \cdot d_1 \leq 1.30$ and
$1.30 \leq \Delta n_2 \cdot d_2 \leq 1.40$.

6. The reflection type color liquid crystal apparatus according to claim 1, wherein said first conditions satisfy:
{θ₁ is 230° to 250°,
θ₂ is +230° to +250°,
θ₃ is (+90°+[−10° to +40°]) and
θ₄ is (+45°+[−30° to +25°] or +135°+[−30° to +250°])}; or said second conditions satisfy:
{θ₁ is +230° to +250°,
θ₂ is −230° to −250°,
θ₃ is (−90°+[+10° to −40°]) and
θ₄ is (−45°+[+30° to −25°] or −135°+[+30° to −25°])};
$1.20 \leq \Delta n_1 \cdot d_1 \leq 1.50$ and
$0.70 \leq \Delta n_2 \cdot d_2 \leq 0.90$.

7. The reflection type color liquid crystal apparatus according to claim 1, wherein said first conditions satisfy:
{θ₁ is −170° to −190°,
θ₂ is +170° to +190°,
θ₃ is (+90°+[−10° to +40°]) and
θ₄ is (+45°+[−30° to +25°] or +135+[−30° to +25°])}; or said second conditions satisfy:
{θ₁ is +170° to +190°,
θ₂ is −170° to −190°,
θ₃ is (−90°+[+10° to −40°]) and
θ₄ is (−45°+[+30° to −25°] or −135°+[+30° to −25°])};
$0.30 \leq \Delta n_1 \cdot d_1 \leq 2.00$, and
$0.30 \leq \Delta n_2 \cdot d_2 \leq 2.00$.

8. The reflection type color liquid crystal apparatus according to claim 1, wherein said first conditions satisfy:
{θ₁ is −170° to −190°,
θ₂ is +170° to +190°,
θ₃ is (+90°+[−10° to +40°]) and
θ₄ is (+45°+[−30° to +25°] or +135°+[−30° to +25°])}; or said second conditions satisfy:
{θ₁ is +170° to +190°,
θ₂ is 170° to −190°,
θ₃ is (−90°+[+10° to −40°]) and
θ₄ is (−45°+[+30° to −25°] or −135°+[+30° to −25°])};
$0.90 \leq \Delta n_1 \cdot d \leq 1.30$ and
$\Delta n_1 \cdot d_1 - 0.15 \leq \Delta n_2 \cdot d_2 \leq \Delta n_1 \cdot d_1 + 0.15$.

9. The reflection type color liquid crystal apparatus according to claim 1, wherein said first conditions satisfy:
{θ₁ is −170° to −190°,
θ₂ is +170° to +190°,
θ₃ is (+90°+[+10° to +30°]) and
θ₄ is (+45°+[−20° to +20°] or +135°+[−20° to +20°])}; or said second conditions satisfy:
{θ₁ is +170° to +190°,
θ₂ is −170° to −190°,
θ₃ is (−90°+[−10° to −30°]) and
θ₄ is (−45°+[+20° to −20°] or −135°+[+20° to −20°])};
$0.75 \leq \Delta n_1 \cdot d_1 \leq 1.05$ and
$0.75 \leq \Delta n_2 \cdot d_2 \leq 1.05$.

10. The reflection type color liquid crystal apparatus according claim 1, wherein
a relationship (1) and (2) is satisfied $$(10°)^2 \leq (|\theta_3|-90°)^2+(|\theta_4|-45°)^2 \quad (1)$$

$$(10°)^2 \leq (|\theta_3|-90°)^2+(|\theta_4|-135°)^2 \quad (2).$$

11. The reflection type color liquid crystal apparatus according to claim 1, wherein
a relationship (3) and (4) is satisfied $$(10°)^2 \leq (|\theta_5|-90°)^2+(|\theta_6|-45°)^2 \quad (3)$$

$$(10°)^2 \leq (|\theta_5|-90°)^2+(|\theta_6|-135°)^2 \quad (4).$$

12. A reflection type liquid crystal display apparatus comprising:
a polarizing plate, a birefringent plate having not a twist angle, a liquid crystal layer of a nematic liquid crystal having positive dielectric anisotropy and including a chiral material, which is interposed between two substrates disposed to each other, each provided with an electrode, and a reflection layer arranged in successive order; wherein said liquid crystal layer has a twist angle $\theta_1$ from the first orientation direction at its first plane of said liquid crystal layer to the second orientation direction at its second plane of said liquid crystal layer; and the product of $\Delta n_1 \cdot d_1$ of the refractive index anisotropy $\Delta n_1$ of the liquid crystal in the liquid crystal layer and the thickness $d_1$ of the liquid crystal layer is 0.30 to 2.00 μm;

the product of $\Delta n_2 \cdot d_2$ of the refractive index anisotropy $\Delta n_2$ of the birefringent plate and the thickness $d_2$ of the birefringent plate is 0.30 to 2.00 μm;

an angle $\theta_5$ formed from said first orientation direction of the liquid crystal layer to a slow axis of said birefringent plate;

an angle $\theta_6$ formed from said first orientation direction of the liquid crystal layer to an absorbing axis of said polarizing plate;

the angles $\theta_1$, $\theta_5$ and $\theta_6$ in a clockwise (+) or in counterclockwise (−) direction have such a relation that

[($\theta_1$ is −160° to −300°), ($\theta_5$ is +70° to +120°) and ($\theta_6$ is +25° to +80° or +115° to +170°)]; or

[($\theta_1$ is +160° to +300°, ($\theta_5$ is −70° to −120°) and ($\theta_6$ is −25° to −80° or −115° to −170°)]; and voltage values of at least 3 values are selected to be applied to said liquid crystal layer.

* * * * *